US012538068B2

(12) United States Patent
Sato et al.

(10) Patent No.: US 12,538,068 B2
(45) Date of Patent: Jan. 27, 2026

(54) ACOUSTIC OUTPUT DEVICE AND METHOD OF CONTROLLING ACOUSTIC OUTPUT DEVICE

(71) Applicant: SONY GROUP CORPORATION, Tokyo (JP)

(72) Inventors: Koya Sato, Tokyo (JP); Kohei Asada, Tokyo (JP); Tetsunori Itabashi, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 306 days.

(21) Appl. No.: 18/003,539

(22) PCT Filed: Jun. 28, 2021

(86) PCT No.: PCT/JP2021/024400

§ 371 (c)(1),
(2) Date: Dec. 28, 2022

(87) PCT Pub. No.: WO2022/009722

PCT Pub. Date: Jan. 13, 2022

(65) Prior Publication Data

US 2023/0254630 A1 Aug. 10, 2023

(30) Foreign Application Priority Data

Jul. 9, 2020 (JP) ................................ 2020-118656

(51) Int. Cl.
*H04R 1/10* (2006.01)
*G10K 11/178* (2006.01)

(52) U.S. Cl.
CPC ..... *H04R 1/1083* (2013.01); *G10K 11/17857* (2018.01); *G10K 11/17881* (2018.01); *G10K 2210/1081* (2013.01); *H04R 2460/01* (2013.01)

(58) Field of Classification Search
CPC .............. H04R 1/1083; H04R 2460/01; G10K 11/17857; G10K 11/17881; G10K 2210/1081

(Continued)

(56) References Cited

U.S. PATENT DOCUMENTS

| | | | | | |
|---|---|---|---|---|---|
| 5,761,314 | A * | 6/1998 | Inanaga | H04S 3/004 | 381/17 |
| 6,990,211 | B2 * | 1/2006 | Parker | H04S 7/303 | 381/310 |

(Continued)

FOREIGN PATENT DOCUMENTS

| | | | |
|---|---|---|---|
| CA | 3056488 | A1 | 9/2018 |
| CN | 109691126 | A | 4/2019 |

(Continued)

OTHER PUBLICATIONS

International Search Report and Written Opinion of PCT Application No. PCT/JP2021/024400, issued on Aug. 31, 2021, 09 pages of ISRWO.

*Primary Examiner* — Carolyn R Edwards
*Assistant Examiner* — Friedrich Fahnert
(74) *Attorney, Agent, or Firm* — CHIP LAW GROUP

(57) ABSTRACT

Provided is an acoustic output device that includes a housing, one or more outward microphones in the housing toward an outside of the housing, and two or more drivers that are provided inside the housing. Each of the two or more drivers generates an acoustic control sound based on an acoustic control signal.

17 Claims, 54 Drawing Sheets

(58) Field of Classification Search
USPC .......................................................... 381/74
See application file for complete search history.

(56) References Cited

U.S. PATENT DOCUMENTS

| | | | | |
|---|---|---|---|---|
| 2004/0032964 | A1* | 2/2004 | Liang | H04R 5/0335 381/376 |
| 2005/0117754 | A1 | 6/2005 | Sakawaki | |
| 2018/0027917 | A1 | 2/2018 | Zukowski | |
| 2018/0190259 | A1* | 7/2018 | Woelfl | G10K 11/17815 |
| 2018/0192228 | A1 | 7/2018 | Woelfl | |
| 2018/0366099 | A1 | 12/2018 | Unruh | |
| 2019/0362738 | A1* | 11/2019 | Mei | G06F 3/165 |

FOREIGN PATENT DOCUMENTS

| | | | | | |
|---|---|---|---|---|---|
| JP | 2007036608 | A | | 2/2007 | |
| JP | 2008-116782 | A | | 5/2008 | |
| JP | 2009017485 | A | * | 1/2009 | |
| JP | 2009141880 | A | | 6/2009 | |
| JP | 2011199697 | A | * | 10/2011 | |
| JP | 2012-178748 | A | | 9/2012 | |
| WO | WO-2017163572 | A1 | * | 9/2017 | H04S 1/00 |
| WO | WO-2019145023 | A1 | | 8/2019 | |

* cited by examiner

ACOUSTIC OUTPUT DEVICE AND METHOD OF CONTROLLING ACOUSTIC OUTPUT DEVICE

CROSS REFERENCE TO RELATED APPLICATIONS

This application is a U.S. National Phase of International Patent Application No. PCT/JP2021/024400 filed on Jun. 28, 2021, which claims priority benefit of Japanese Patent Application No. JP 2020-118656 filed in the Japan Patent Office on Jul. 9, 2020. Each of the above-referenced applications is hereby incorporated herein by reference in its entirety.

FIELD

The present disclosure relates to an acoustic output device and a method of controlling the acoustic output device.

BACKGROUND

A noise canceling system is known in which a microphone that collects the external sound is provided in a housing of an acoustic output device (hereinafter, appropriately referred to as a head-mounted acoustic output device.) used by being worn on a head or an outer ear portion such as a headphone or an earphone, and a signal process is performed based on the sound collected by the microphone to remove the sound (external noise) arriving at an auricle from the outside. In this noise canceling system, for example, external noise removal is realized by adding a sound signal having a phase opposite to a phase of a sound signal of a sound collected by a microphone to a sound signal originally output by a head-mounted acoustic output device.

Patent Literature 1 discloses a headphone in which a speaker array in which a plurality of speakers is disposed inside a headphone housing is mounted inside the housing. With such a configuration, it is possible to improve sound image localization when listening to voice signals of two channels of an L (left) channel and an R (right) channel by the headphone.

In addition, Patent Literature 2 discloses a headphone in which a plurality of microphones (referred to as FF microphones) for feed-forward noise canceling is mounted on the outside of a headphone housing. In Patent Literature 2, in such a configuration, control is implemented in which the external sound or noise from a specific direction is not canceled while noise canceling is performed.

CITATION LIST

Patent Literature

Patent Literature 1: JP 2012-178748 A
Patent Literature 2: JP 2008-116782 A

SUMMARY

Technical Problem

Meanwhile, considering a recent scene of listening to music and the like, there are many users who listen to music using headphone outdoors due to the spread of portable small music players and smartphones. Considering such a situation, Patent Literature 1 does not consider outdoor use, and there is a possibility that sound image localization is unclear due to leakage of surrounding noise into the headphone housing. Further, in Patent Literature 2, an external sound or the like from a specific direction can be canceled, but there is a possibility that sound image localization is unclear due to leakage of an external sound or the like from a direction other than the specific direction.

An object of the present disclosure is to provide an acoustic output device capable of outputting a clearer reproduction sound and a method of controlling the acoustic output device.

Solution to Problem

For solving the problem described above, an acoustic output device according to one aspect of the present disclosure has a housing; one or more outward microphones provided on the housing toward an outside of the housing; and two or more drivers that are provided inside the housing and each of which generates an acoustic control sound based on an acoustic control signal.

DESCRIPTION OF EMBODIMENTS

Figure 1:
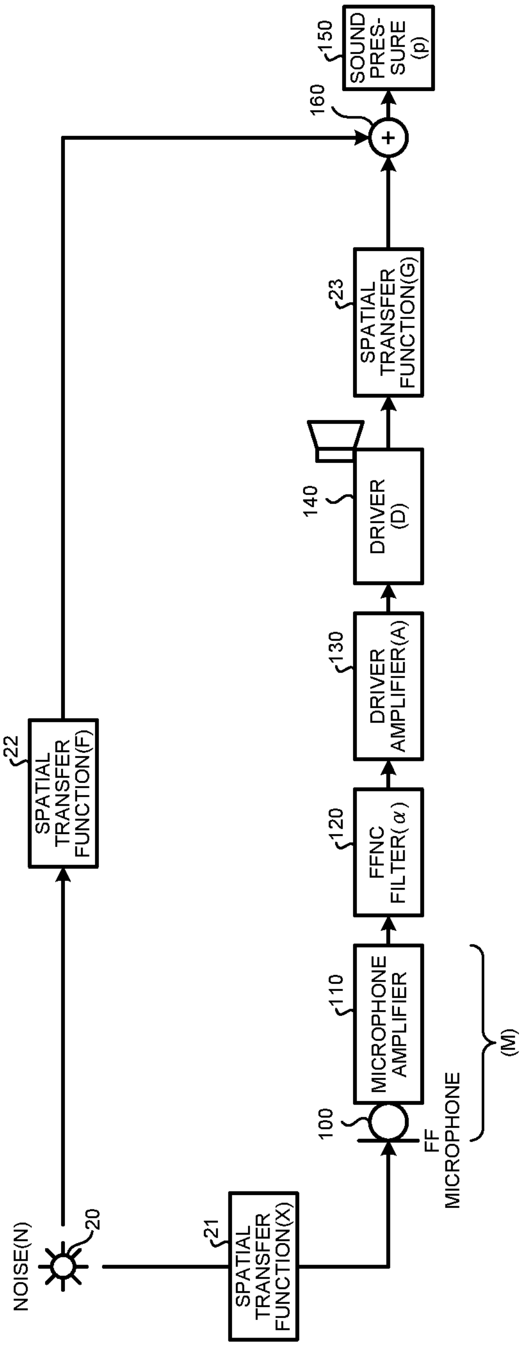
FIG. 1 is a diagram illustrating a configuration of a single microphone/single driver FF method noise canceling headphone according to an existing technology using a transfer function.

Hereinafter, the embodiments of the present disclosure will be described in detail with reference to the drawings. In the following embodiments, the same parts are designated by the same reference numerals, so that duplicate description will be omitted.

Hereinafter, embodiments of the present disclosure will be described in the following order.

1. Summary of embodiments
2. First Embodiment
2-1. Existing technology
2-2. Configuration according to first embodiment
2-3. Effects according to first embodiment
2-4. Modification of first embodiment
3. Second Embodiment
3-1. Configuration according to second embodiment
3-2. Effects according to second embodiment
4. Third Embodiment
4-1. Existing technology
4-2. Configuration according to third embodiment
5. Fourth Embodiment
6. Fifth Embodiment
6-1. Modification of fifth embodiment
7. Sixth Embodiment
7-1. Modification of sixth embodiment
8. Seventh Embodiment
8-1. First modification of seventh embodiment
8-2. Second modification of seventh embodiment
8-3. Third modification of seventh embodiment
9. Eighth Embodiment
10. Ninth Embodiment

1. Summary of Embodiments

First, an outline of an embodiment of the present disclosure will be described. The present disclosure relates to an acoustic output device worn by a user on the head and used by the user, and the acoustic output device applicable to the present disclosure includes an overear (or on-ear) type headphone (hereinafter, headphone) that supplies a sound generated when a diaphragm is vibrated according to a sound signal in a driver unit from close to an auricle of a listener.

In the related art, there has been known a headphone having a noise cancellation function of a feed-forward method (hereinafter, an FF method) in which a microphone is provided in a housing of the headphone toward the outside of the housing, and a signal for canceling noise leaking from the outside into the headphone is generated based on a sound collected by the microphone. Hereinafter, the headphone having the noise cancellation function of the FF method is appropriately referred to as an FF method noise canceling headphone.

In addition, a headphone having a noise cancellation function of a feedback method (hereinafter, an FB method) in which a microphone is provided toward the inside of a housing and a leakage noise into the housing is canceled based on a sound collected by the microphone, and a headphone having a noise cancellation function of a Dual method in which the FF method and the FB method are combined are also known.

Hereinafter, the headphone having the noise cancellation function is appropriately referred to as a noise canceling headphone. In addition, hereinafter, the headphone having the noise cancellation function of the FF method is referred to as an FF method noise canceling headphone, the headphone having the noise cancellation function of the FB method is referred to as an FB method noise canceling headphone, and the headphone having the noise cancellation function of the Dual method is referred to as a Dual method noise canceling headphone as appropriate. In addition, hereinafter, a microphone used to implement the noise cancellation function of the FF method is appropriately referred to as an FF microphone, and a microphone used to implement the noise cancellation function of the FB method is appropriately referred to as an FB microphone.

In all of the FF method noise canceling headphone, the FB method noise canceling headphone, and the Dual method noise canceling headphone according to the existing technology, only one driver unit (speaker) for generating the noise cancellation sound based on the noise canceling signal is provided in one housing.

A noise canceling headphone as an acoustic output device according to the present disclosure has a configuration in which a plurality of driver units each of which generates the sound according to a sound signal is provided in respective housings that cover left and right ear portions of a user. Hereinafter, providing a plurality of driver units in each of the left and right housings in this manner is referred to as a multi-driver.

In a multi-driver noise canceling headphone as an acoustic output device according to the present disclosure, a plurality of driver units provided in the housing each generates a noise cancellation sound based on a sound collected by a microphone provided in each housing. As described above, in the acoustic output device in which the plurality of driver units is provided in each of the left and right housings, the noise cancellation sound is generated from each of the plurality of driver units, so that a higher noise cancellation effect can be obtained.

Note that the acoustic output device of the present disclosure is basically configured to generate a noise canceling signal for performing noise cancellation by observing (collecting) surrounding noise with an FF microphone provided outward in a housing of a headphone. Therefore, the following patterns are conceivable as respective patterns assuming that one or more FF microphones are mounted on each of the left and right housings.

(1) The first pattern is a multi-driver noise canceling headphone in which one FF microphone is mounted in each housing. Hereinafter, this configuration is appropriately referred to as a single microphone/multi-driver FF method noise canceling headphone.

(2) The second pattern is a multi-driver noise canceling headphone in which two or more FF microphones are mounted in each housing. Hereinafter, this configuration is appropriately referred to as a multi-microphone/multi-driver FF method noise canceling headphone.

2. First Embodiment

The first embodiment according to the present disclosure will be described.

(2-1. Existing Technology)

First, in order to facilitate understanding, the FF method noise canceling by a single microphone/single driver according to the existing technology will be described. FIG. 1 is a diagram illustrating a configuration of a single microphone/ single driver FF method noise canceling headphone according to an existing technology using a transfer function.

In FIG. 1, an FF microphone 100 is an outward microphone provided toward the outside of a housing of a headphone (not illustrated). For example, the FF microphone 100 is non-directional, is provided on the outer portion of the housing of the headphone, and collects a sound from the outside of the housing. A noise 20 with the characteristic "N" generated outside the housing is collected by the FF microphone 100 via a space 21 of a spatial transfer function X. The sound signal output from the FF microphone 100 is supplied to a microphone amplifier 110 and amplified. A transfer function including the FF microphone 100 and the microphone amplifier 110 is set to "M". The output of the microphone amplifier 110 is passed to an FF noise canceling (FFNC) filter 120 with a filter coefficient α for performing noise canceling (NC) of the FF method.

The FFNC filter 120 generates a noise canceling signal for generating a noise canceling sound that cancels noise based on the input signal. The noise canceling signal generated by the FFNC filter 120 is passed to a driver amplifier 130 of a transfer function A. The driver amplifier 130 drives a driver unit 140 (described as a driver 140 in the figure) of a transfer function D according to the passed noise canceling signal. The driver 140 generates a noise canceling sound by air vibration according to the noise canceling signal. The noise canceling sound is transmitted from the driver 140 to a control point (for example, the eardrum of the user wearing the headphone) via a space 23 of a spatial transfer function G.

Here, it can be considered that the noise canceling sound is an acoustic control sound for controlling the audio in the housing (space 23) of the headphone, and the noise canceling signal is an acoustic control signal for the driver 140 to reproduce the acoustic control sound.

In the following description, the driver unit 140 will be described as the driver 140 unless otherwise specified.

On the other hand, the noise 20 propagates through a space 22 of a spatial transfer function F and leaks into the headphone via the housing of the headphone. The noise 20 leaking into the headphone is added to the noise canceling sound generated by the driver 140 in the space in the housing as an addition unit 160, and the noise 20 is canceled. The sound in which the noise 20 is canceled by the noise canceling sound reaches the eardrum of the user as a sound pressure 150 of the sound pressure (p).

At this time, in the FFNC filter 120, the sound pressure (p) at the eardrum position is only required to be "0", and the filter coefficient α can be obtained by the following Expression (1).

$$p=NF+NXM\alpha ADG=0 \quad (1)$$

When Expression (1) is solved for the filter coefficient α, the following Expression (2) is obtained.

$$p = NF + NXM\alpha ADG = 0 \quad (1)$$

$$\alpha = -\frac{F}{XMADG} \quad (2)$$

By determining the filter coefficient α of the FFNC filter 120 in this manner, the user wearing the headphone can listen to the sound in which the noise 20 generated outside the housing of the headphone is canceled.

(2-2. Configuration According to First Embodiment)

Next, a configuration according to the first embodiment of the present disclosure will be described. A first embodiment relates to the above-described single microphone/multi-driver FF method noise canceling headphone.

Figure 2:
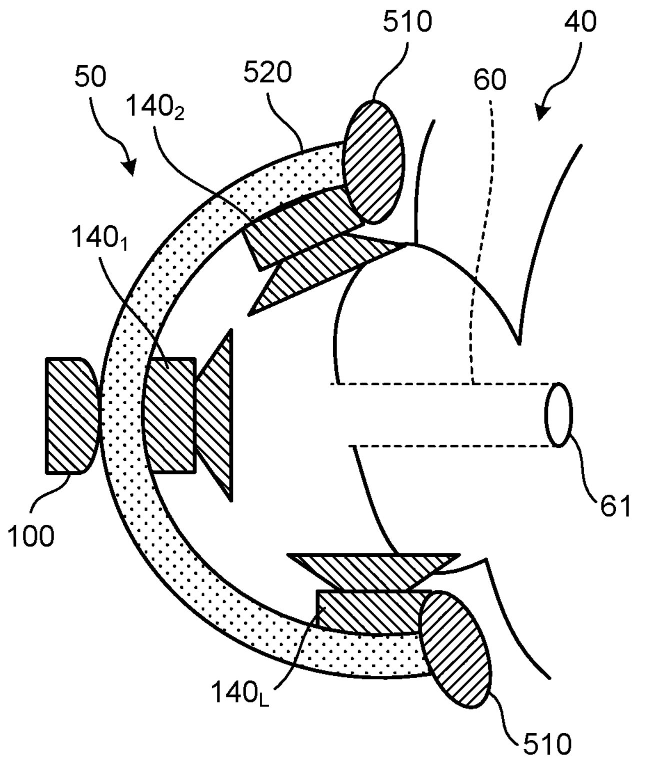
FIG. 2 is a schematic diagram schematically illustrating a vertical cross section of an appearance of a single microphone/multi-driver FF method noise canceling headphone applicable to the first embodiment.

FIG. 2 is a schematic diagram schematically illustrating a vertical cross section of an appearance of an example of a single microphone/multi-driver FF method noise canceling headphone 50 applicable to the first embodiment. Hereinafter, the "single microphone/multi-driver FF method noise canceling headphone 50" will be simply described as the "headphone 50". Note that FIG. 2 illustrates the right housing of the left and right housings of the headphone 50.

In FIG. 2, a housing 520 of the headphone 50 is connected to an opposite housing 520 (the right side in the figure in this example) by a headband (not illustrated). Furthermore, ear pads 510 are provided at the peripheral portion of the housing 520, and the ear pads 510 of the left and right housings 520 are pressed against the head 40 of the user wearing the headphone 50.

Inside the housing 520, L drivers $\mathbf{140}_1$, $\mathbf{140}_2$, . . . , and $\mathbf{140}_L$ are provided. In the example of FIG. 2, assuming that L=3, three drivers $\mathbf{140}_1$, $\mathbf{140}_2$, and $\mathbf{140}_L$ are provided on the housing 520. For example, the L drivers $\mathbf{140}_1$, $\mathbf{140}_2$, . . . , and $\mathbf{140}_L$ are disposed on the housing 520 so that emitted sound waves travel in different directions.

In the example of FIG. 2, the drivers $\mathbf{140}_1$, $\mathbf{140}_2$, and $\mathbf{140}_L$ are illustrated to be disposed in the substantially vertical direction when the user wears the headphone 50 in the normal state, but this is not limited to this example. For example, the drivers $\mathbf{140}_1$, $\mathbf{140}_2$, and $\mathbf{140}_L$ may be disposed so as to be arranged in a horizontal direction or an oblique direction, or may be disposed at respective vertexes of a triangle.

In the example of FIG. 2, among these, the driver $\mathbf{140}_1$ is disposed in a position and an orientation in which emitted sound (aerial vibration) can be directly transmitted to the eardrum 61 of the user via the ear canal 60. In other words, the driver $\mathbf{140}_1$ is disposed in a substantially center portion inside the housing 520 so as to be able to output sound in the direction of the eardrum 61.

Each of the drivers $\mathbf{140}_2$ and $\mathbf{140}_L$ is disposed at a position from the center portion of the housing 520 toward the peripheral portion. More specifically, the driver $\mathbf{140}_2$ is disposed on the upper portion of the housing 520 in an oblique direction with respect to the ear canal 60. The driver $\mathbf{140}_L$ is disposed on the lower portion of the housing 520 toward the upper portion.

Further, the FF microphone 100 is disposed on the outer portion of the housing 520 of the headphone 50. In the example of FIG. 2, the FF microphone 100 is disposed at a position facing the driver $\mathbf{140}_1$ via the housing 520 with the sound collection unit facing the outside of the housing 520.

Note that, in FIG. 2, the driver $\mathbf{140}_1$ is disposed on the housing 520 so that the output sound (sound wave) travels with a wavefront substantially perpendicular to the direction of the eardrum 61, but the arrangement of the driver $\mathbf{140}_1$ on the housing 520 is not limited to this example. For example, the driver $\mathbf{140}_1$ may be disposed on the housing 520 so that the output sound wavefront travels with a wavefront oblique to the direction of the eardrum 61 schematically illustrated by the ear canal 60 and the eardrum 61 in the figure. Furthermore, for example, in FIG. 2, the driver $\mathbf{140}_1$ is disposed on the axis by the schematically illustrated eardrum 61 and ear canal 60, but the driver $\mathbf{140}_1$ may be disposed at a position shifted from the axis of the housing 520. Furthermore, it is also conceivable to arrange the driver $\mathbf{140}_1$ on a peripheral edge portion of the housing 520. The position of the FF microphone 100 is not limited to the position facing the driver $\mathbf{140}_1$ via the housing 520.

Figure 3A:
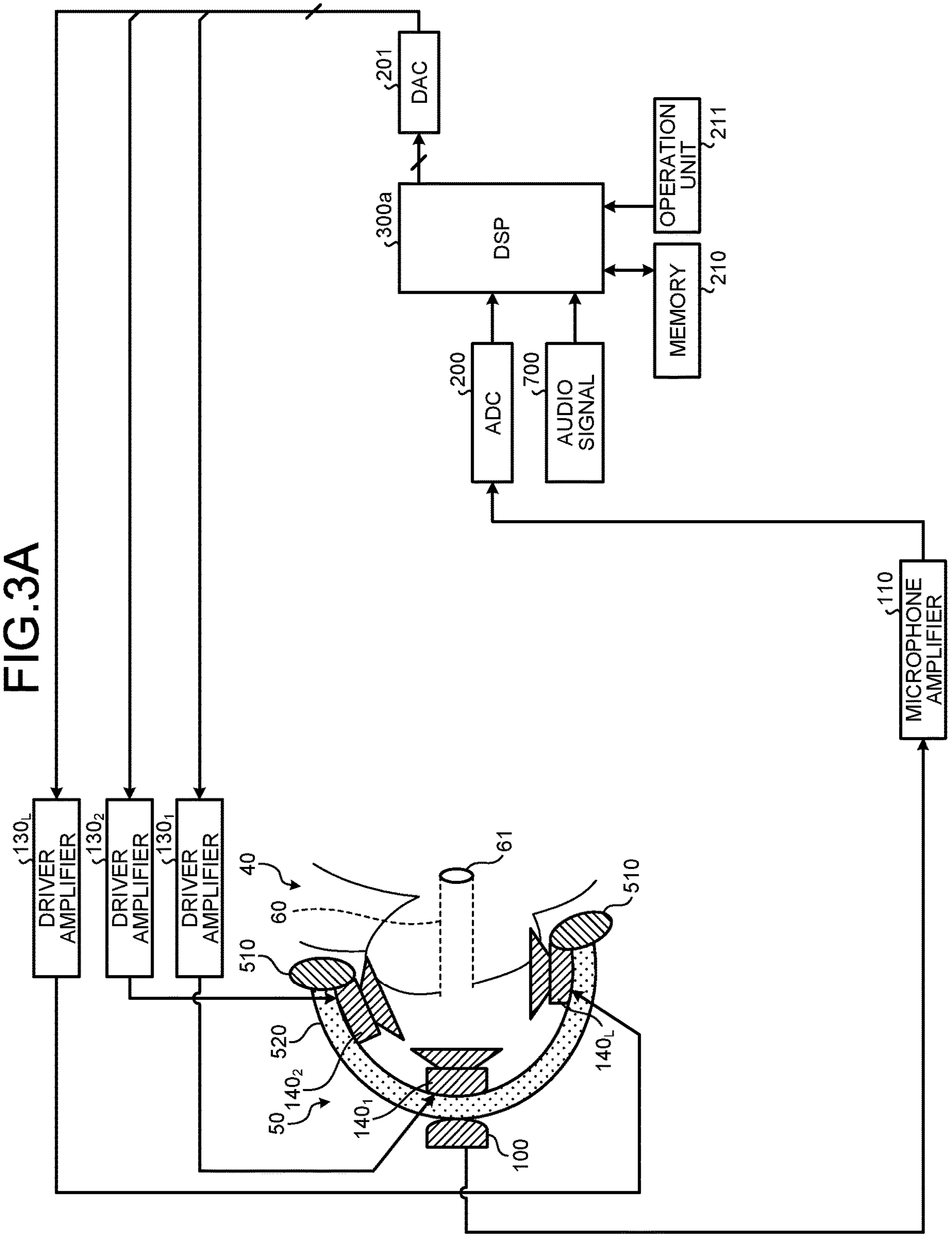
FIG. 3A is a schematic diagram schematically illustrating a configuration of an example of an acoustic output device according to the first embodiment.

FIG. 3A is a schematic diagram schematically illustrating a configuration of an example of an acoustic output device according to the first embodiment. In the example of FIG. 3A, the acoustic output device includes a headphone 50, a microphone amplifier 110, driver amplifiers $\mathbf{130}_1$, $\mathbf{130}_2$, . . . , and $\mathbf{130}_L$, an ADC 200, a DAC 201, a memory 210, an operation unit 211, and a DSP 300*a*. An operator for receiving a user operation is disposed in the operation unit 211. The DSP 300*a* executes control according to a user operation on the operation unit 211 according to the program.

In FIG. 3A, since the configuration of the headphone 50 is the same as that in FIG. 2, the description thereof will be omitted here. In this example in which the headphone 50 include the three drivers $\mathbf{140}_1$, $\mathbf{140}_2$, and $\mathbf{140}_L$, the headphone has three driver amplifiers $\mathbf{130}_1$, $\mathbf{130}_2$, and $\mathbf{130}_L$ corresponding to the drivers $\mathbf{140}_1$, $\mathbf{140}_2$, and $\mathbf{140}_L$, respectively.

The analog to digital converter (ADC) 200 converts an analog sound signal based on the sound collected by the FF microphone into a digital sound signal. The digital signal processor (DSP) 300*a* receives a sound signal converted into a digital signal by the ADC 200 and an audio signal 700 mainly listened to with the headphone 50.

In FIG. 3A and subsequent figures, a symbol "/ (slash)" or a symbol "\ (backlash)" attached to a signal line indicates that the signal line includes a plurality of signal lines or transmits signals of a plurality of channels.

Figure 3B:
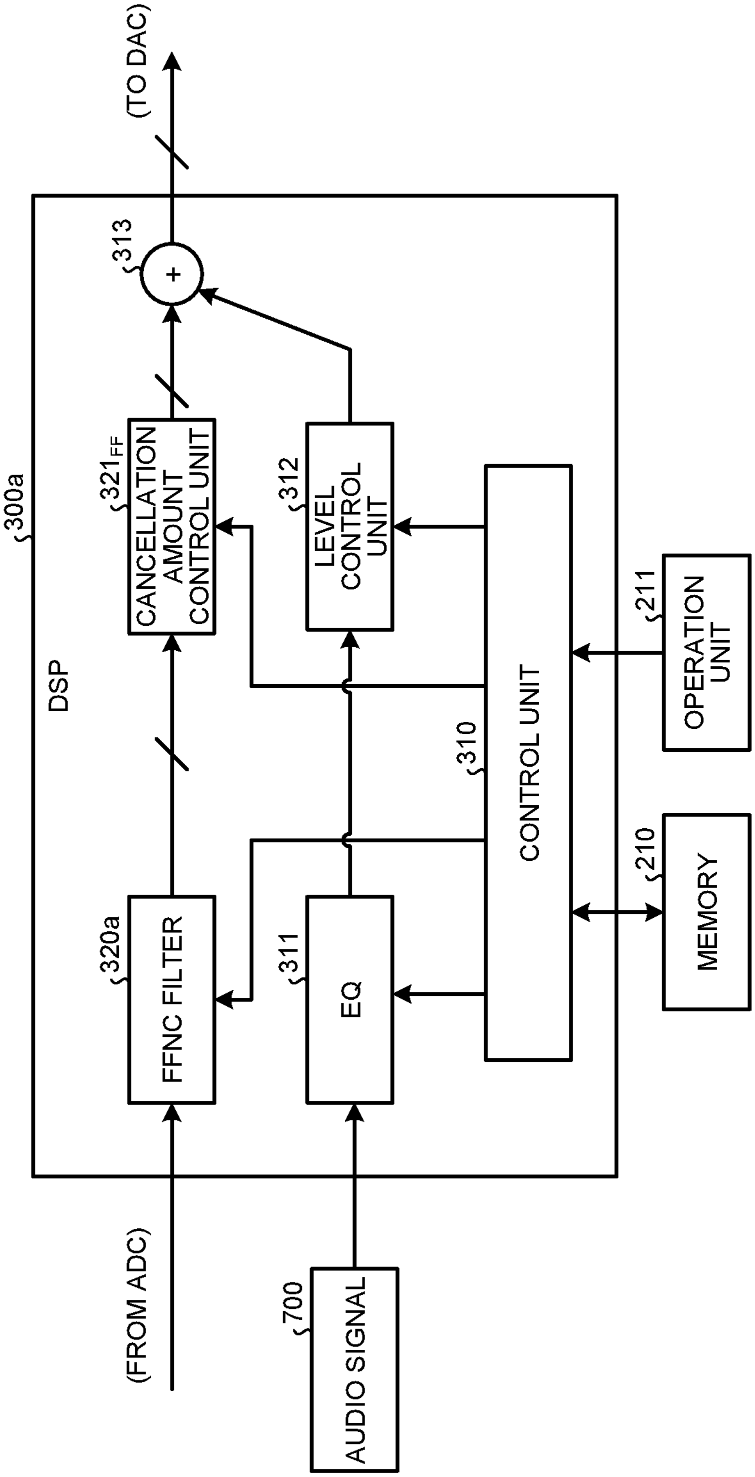
FIG. 3B is a functional block diagram of an example for explaining functions of the DSP according to the first embodiment.

FIG. 3B is a functional block diagram of an example for explaining functions of the DSP 300*a* according to the first embodiment. In FIG. 3B, the DSP 300*a* includes a control unit 310, an equalizer (EQ) 311, a level control unit 312, an adder 313, an FFNC filter 320*a*, and a cancellation amount control unit $\mathbf{321}_{FF}$.

The control unit 310, the EQ 311, the level control unit 312, the adder 313, the FFNC filter 320*a*, and the cancellation amount control unit $\mathbf{321}_{FF}$ are realized by executing an acoustic output control program on the DSP 300*a*. Not limited to this, part or all of the control unit 310, the EQ 311, the level control unit 312, the adder 313, the FFNC filter 320*a*, and the cancellation amount control unit $\mathbf{321}_{FF}$ may be configured using hardware circuits that cooperate with each other.

For example, when the acoustic output control program is executed, the DSP 300*a* configures the control unit 310, the EQ 311, the level control unit 312, the adder 313, the FFNC filter 320*a*, and the cancellation amount control unit $\mathbf{321}_{FF}$ as, for example, modules in a memory region (not illustrated) as a main storage region included in, for example, the DSP 300*a*. Note that the acoustic output control program is stored in advance in the memory 210, for example, and is brought into an executable state by the DSP 300*a* reading from the memory 210 at the time of activation. Furthermore, the acoustic output control program may be provided from the outside via a communication means (not illustrated) and stored in the memory 210 or the like.

In the DSP 300*a*, the control unit 310 controls each unit of the DSP 300*a* according to, for example, a program stored in the memory 210. Furthermore, the control unit 310 controls each unit of the DSP 300*a* according to a program in accordance with an operation on the operation unit 211.

The audio signal 700 input from the outside is supplied to the EQ 311 and subjected to EQ processing, and the level (volume) is adjusted in the level control unit 312. The audio signal 700 whose level has been adjusted by the level control unit 312 is passed to the adder 313. Note that various parameters in the EQ 311 and the level control unit 312 can be changed, for example, by control of the control unit 310 according to a user operation on the operation unit 211.

The sound signal supplied from the ADC 200 is input to the FFNC filter 320*a* with the filter coefficient α. The FFNC filter 320*a* includes the functions of the L FFNC drivers corresponding to the L drivers $\mathbf{140}_1$, $\mathbf{140}_2$, . . . , and $\mathbf{140}_L$, and generates a noise canceling signal for each of the drivers $\mathbf{140}_1$, $\mathbf{140}_2$, . . . , and $\mathbf{140}_L$ based on an input sound signal by processing to be described later. The level of each noise canceling signal generated by the FFNC filter 320*a* is adjusted by the cancellation amount control unit $\mathbf{321}_{FF}$ and passed to the adder 313.

Note that the parameters in the FFNC filter 320*a* and the cancellation amount control unit $\mathbf{321}_{FF}$ can be changed, for example, by control of the control unit 310 according to a user operation on the operation unit 211. For example, the control unit 310 can switch the FFNC filter 320*a* to an FFNC filter having another characteristic in accordance with a user operation. As an example, the control unit 310 can switch the default FFNC filter 320*a* to an FFNC filter whose parameter is optimized for specific noise (such as airplane noise) in accordance with a user operation. Furthermore, the control unit 310 can adjust the cancellation amount of the noise 20 by the noise canceling signal by controlling the parameter of the cancellation amount control unit $\mathbf{321}_{FF}$ in accordance with a user operation.

The adder 313 synthesizes to output the audio signal 700 passed from the level control unit 312 and the noise canceling signal, corresponding to each of the drivers $\mathbf{140}_1$, $\mathbf{140}_2$, . . . , and $\mathbf{140}_L$, passed from the cancellation amount control unit $\mathbf{321}_{FF}$. Each signal output from the DSP 300*a* in this manner is an acoustic signal obtained by adding the audio signal 700 to a signal for canceling a noise component generated outside the housing 520.

As described above, the DSP 300*a* functions as a signal processing unit that generates the noise canceling signal as the acoustic control signal.

Returning to the description of FIG. 3A, each acoustic signal output from the DSP 300*a* is passed to the digital to analog converter (DAC) 201, and the digital acoustic signal is converted into an analog acoustic signal. The acoustic signal converted into the analog format by the DAC 201 are supplied to the driver amplifiers $\mathbf{130}_1$, $\mathbf{130}_2$, and $\mathbf{130}_L$. The driver amplifiers $\mathbf{130}_1$, $\mathbf{130}_2$, and $\mathbf{130}_1$, drive the drivers $\mathbf{140}_1$, $\mathbf{140}_2$, and $\mathbf{140}_L$, respectively, based on the supplied acoustic signal.

As a result, the user wearing the headphone 50 can listen to the sound based on the audio signal 700 in a state where the noise 20 generated outside the housing 520 of the headphone 50 is suppressed.

Figure 4:
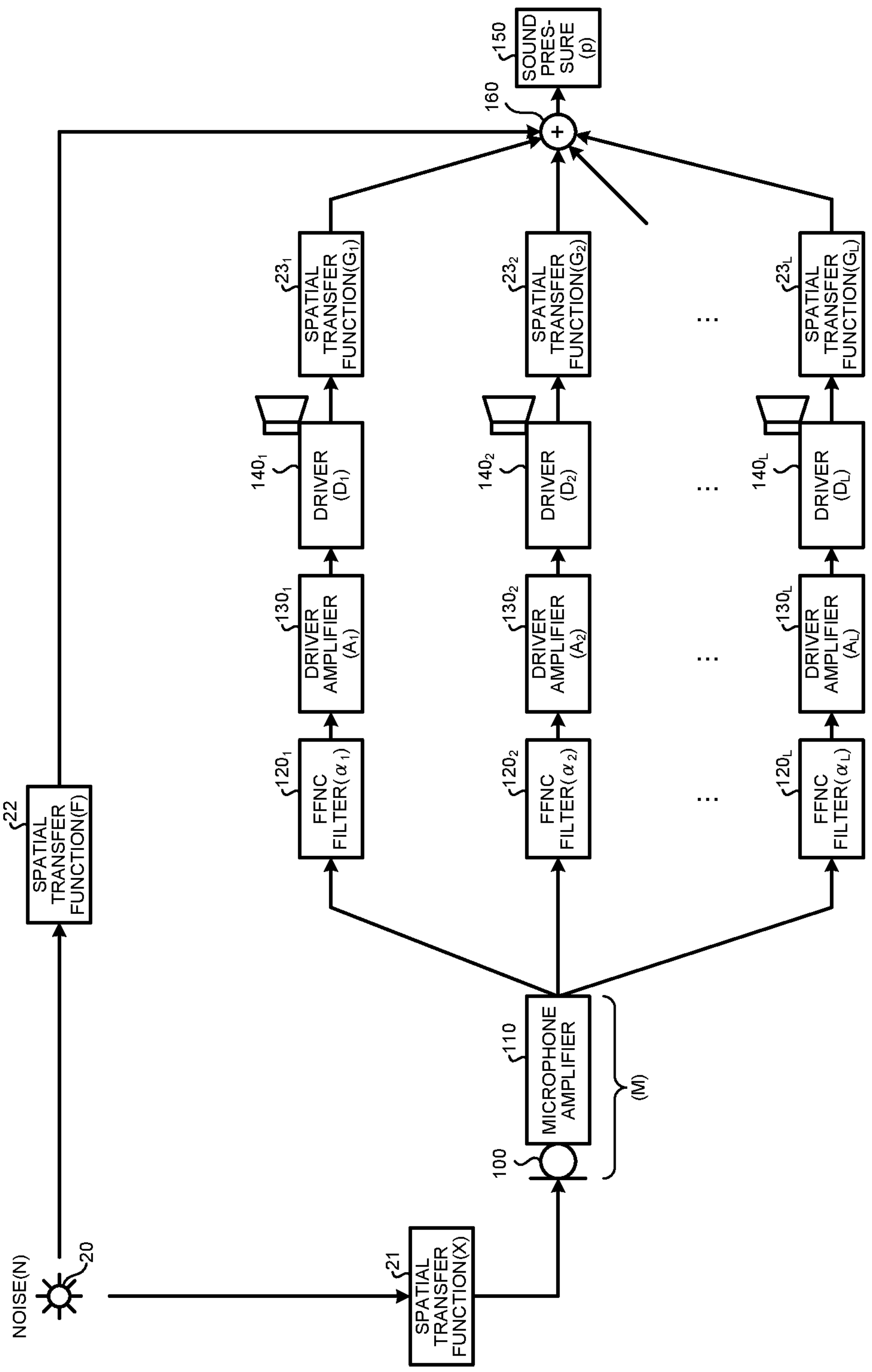
FIG. 4 is a diagram illustrating a configuration of the acoustic output device according to the first embodiment using a transfer function.

FIG. 4 is a diagram illustrating a configuration of the acoustic output device according to the first embodiment using a transfer function. Note that FIG. 4 illustrates one of the left and right configurations of the headphone 50. The configuration illustrated in FIG. 4 is a configuration in which the configurations of the FFNC filter 120, the driver amplifier 130, the driver 140, and the space 23 in the configuration according to the existing technology illustrated in FIG. 1 are connected in parallel by the number of drivers $\mathbf{140}_1$, $\mathbf{140}_2$, . . . , and $\mathbf{140}_L$.

In FIG. 4, the FFNC filters $\mathbf{120}_1$, $\mathbf{120}_2$, . . . , and $\mathbf{120}_L$ are implemented by the FFNC filter 320*a* in FIG. 3B, and the filter coefficients are $\alpha_1$, $\alpha_2$, . . . , and $\alpha_L$, respectively. In addition, transfer functions of the driver amplifier $\mathbf{130}_1$ and the driver $\mathbf{140}_1$, the driver amplifier $\mathbf{130}_2$ and the drivers $140_2$, . . . , and the driver amplifier $130_L$ and the driver $140_L$ are set as transfer functions $A_1$ and $D_1$, transfer functions $A_2$ and $D_2$, . . . , and transfer functions $A_L$ and $D_L$, respectively. Furthermore, the spaces $23_1$, $23_2$, . . . , and $23_L$ are spatial transfer functions $G_1$, $G_2$, . . . , and $G_L$, respectively.

That is, in FIG. 4, a configuration in which the FFNC filter $120_1$, the driver amplifier $130_1$, the driver $140_1$, and the space $23_1$ are connected is a configuration for generating the canceling sound generated by the driver $140_1$. Similarly, a configuration in which the FFNC filter $120_2$, the driver amplifier $130_2$, the driver $140_2$, and the space $23_2$ are connected is a configuration for generating the canceling sound generated by the driver $140_2$. In addition, a configuration in which the FFNC filter $120_L$, the driver amplifier $130_L$, the driver $140_L$, and the space $23_L$ are connected is a configuration for generating the canceling sound generated by the driver $140_L$.

The sound signal based on the sound collected by the FF microphone are passed from the microphone amplifier 110 to the FFNC filters $120_1$, $120_2$, . . . , and $120_L$. The sound signal is passed to the driver $140_1$ via, for example, the FFNC filter $120_1$ and the driver amplifier $130_1$ to generate a noise canceling sound, and the generated noise canceling sound is input to the addition unit 160 via the space 231 inside the housing 520.

Similarly, the sound signals transmitted to the FFNC filters $120_2$, . . . , and $120_L$ are transmitted to the drivers $140_2$, . . . , and $140_L$ via the driver amplifiers $130_2$, . . . , and $130_L$, respectively, to be noise cancelling sounds, respectively, and are input to the addition unit 160 via the spaces $23_2$, . . . , and $23_L$. In the space of the housing 520, the addition unit 160 adds each noise cancelling sound input through spaces $23_1$, $23_2$, . . . , and $23_L$ and the noise 20, outside housing 520, input to the addition unit 160 through the space 22 to output them. The output of the addition unit 160 reaches the eardrum 61 of the user wearing the headphone 50 as the sound pressure 150 (sound pressure (p)).

From FIG. 4, it is sufficient if the leakage noise (NF) at the position of an eardrum 61 can be canceled, and thus, the following Expression (3) obtained by expanding the above-described Expression (1) to the parallel processing is obtained with the sound pressure (p) at the eardrum 61=0.

$$p = NF \times NXM\left(\sum_{l=1}^{L} \alpha_l A_l D_l G_l\right) \tag{3}$$

Expression (4) is obtained by modifying Expression (3).

$$\sum_{l=1}^{L} \alpha_l A_l D_l G_l = -\frac{F}{XM} \tag{4}$$

By obtaining the filter coefficients $\alpha_1$, $\alpha_2$, . . . , and $\alpha_L$ that satisfy Expression (4) as the filter coefficient α of each of the FFNC filters $120_1$, $120_2$, . . . , and $120_L$, noise canceling in a case of using one FF microphone and the L drivers $140_1$, $140_2$, . . . , and $140_L$ is possible.

(2-3. Effects According to First Embodiment)

Next, effects according to the first embodiment will be described. In the first embodiment, by mounting the plurality of drivers $140_1$, $140_2$, . . . , and $140_L$ on the housing 520 of the headphone 50, the noise canceling performance can be improved as compared with the single microphone/single driver FF noise canceling headphone according to the existing technology described with reference to FIG. 1.

Hereinafter, an any driver among the plurality of drivers $140_1$, $140_2$, . . . , and $140_L$ is referred to as a driver $140_x$. Among the plurality of FFNC filters $120_1$, $120_2$, . . . , and $120_L$, the FFNC filter corresponding to the driver $140_x$ is set as the FFNC filter $120_x$ with the filter coefficient $\alpha_x$.

There are the following three reasons why the configuration in which the plurality of drivers $140_1$, $140_2$, . . . , and $140_L$ are provided in the housing 520 according to the first embodiment can improve the noise canceling performance as compared with the configuration using the single driver 140 according to the existing technology.

(1) The degree of freedom of the filter coefficient $\alpha_x$ of the FFNC filter $120_x$ is higher than that of the filter coefficient of the FFNC filter 120 of the existing technology. As a result, the noise canceling signal can be generated and reproduced with high accuracy.

(2) The noise canceling signal can be reproduced from the driver $140_x$ at a position close to the incoming direction of the noise 20 among the plurality of drivers $140_1$, $140_2$, . . . , and $140_L$.

(3) Even in the situation of the high sound pressure noise, the noise canceling signal can be reproduced with high accuracy.

(Coping with incoming direction of noise) Reasons (1) and (2) will be described with reference to FIGS. 5A, 5B, 5C, 6A, 6B, and 6C. FIGS. 5A, 5B, 50, 6A, 6B, and 6C are schematic diagrams for explaining the effects of the acoustic output device according to the first embodiment.

Figures 5A, 5B, 5C:
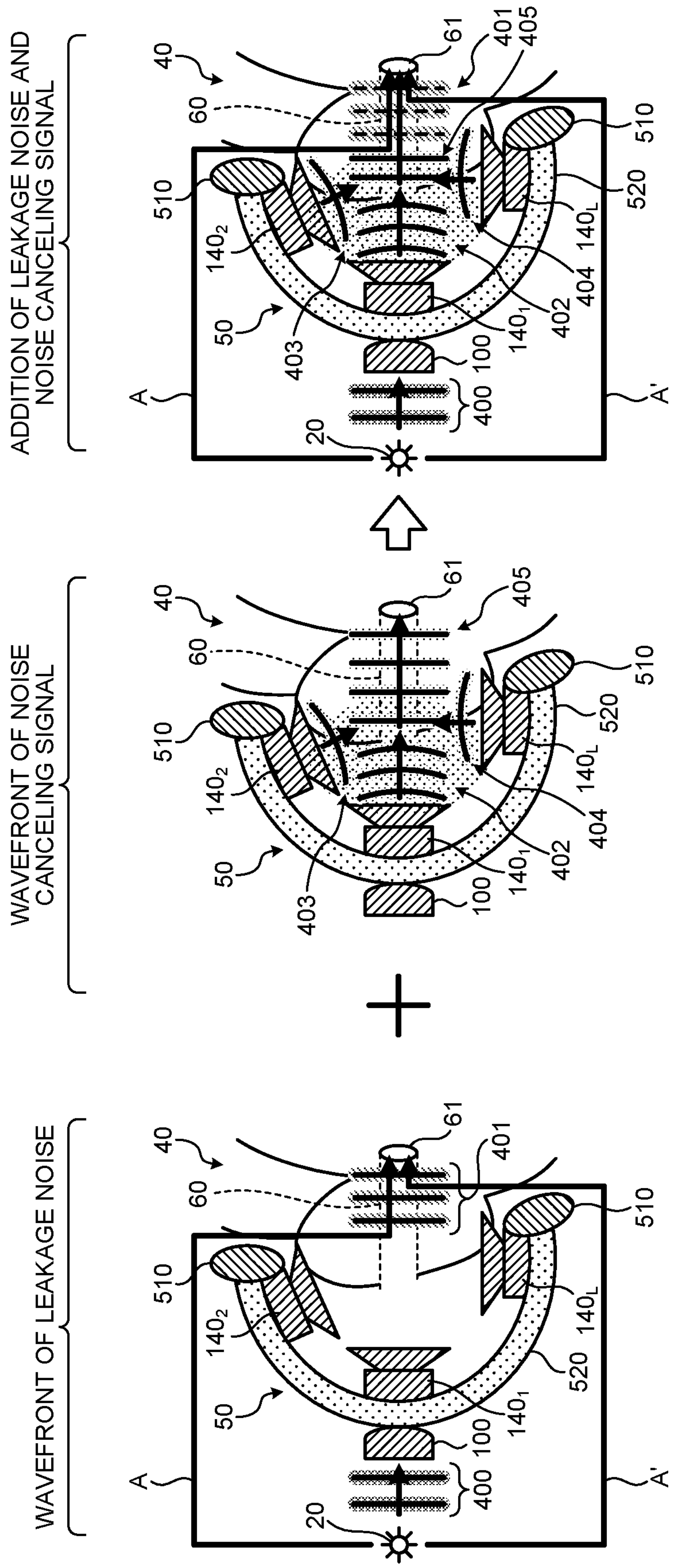
FIGS. 5A, 5B, and 5C are schematic diagrams for explaining an effect of the acoustic output device according to the first embodiment.

FIGS. 5A, 5B, and 5C illustrate a case where the noise 20 comes from the horizontal direction with respect to the housing 520, that is, from a direction parallel to the direction which the FF microphone and the driver 1401 face.

FIG. 5A schematically illustrates the wavefront 400 of the noise 20 reaching the FF microphone provided in the housing 520, and the wavefront 401 of the noise 20 leaking from the gap between an ear pad 510 provided in the housing 520 and the head 40 of the user wearing the headphone 50. The noise 20 reaches the FF microphone via the space of the spatial transfer function X, leaks from the gap between the ear pad 510 and the head 40 to the inside of the housing 520 via the space of the spatial transfer function F, and reaches the eardrum 61 via the ear canal 60, as indicated by paths A and A'.

FIG. 5B schematically illustrates an example of the wavefront by the noise canceling sound obtained by reproducing a noise canceling signal generated based on the noise 20 collected by the FF microphone and that is output from each of drivers 1401, 1402, and 140L in the housing 520. The noise canceling sounds indicated by wavefronts 402, 403, and 404 output from the drivers 1401, 1402, and 140L, respectively, are synthesized at the entrance of the ear canal 60, and reach the eardrum 61 as a sound indicated by the wavefront 405. Ideally, the sound indicated by the wavefront 405 is, for example, a sound having a phase opposite to that of the wavefront 401 due to the leakage noise indicated in FIG. 5A.

FIG. 5C schematically illustrates a state in which FIGS. 5A and 5B are added together. Specifically, in FIG. 5C, a state in which the sound indicated by the wavefront 405 reproduced by each of the drivers 1401, 1402, and 140L and synthesized at the entrance of the ear canal 60 and the sound indicated by the wavefront 401 of the noise 20 leaking from the gap between the ear pad 510 and the head 40 are synthesized and reach the eardrum 61 is schematically illustrated.

Since the wavefront 401 of the leakage noise and the wavefront 405 of the noise canceling sound substantially match with each other, the leakage noise is canceled by the noise canceling sound. Therefore, the user wearing the headphone 50 can listen to the sound in which the leakage noise is suppressed by the noise canceling sound.

Figures 6A, 6B, 6C:
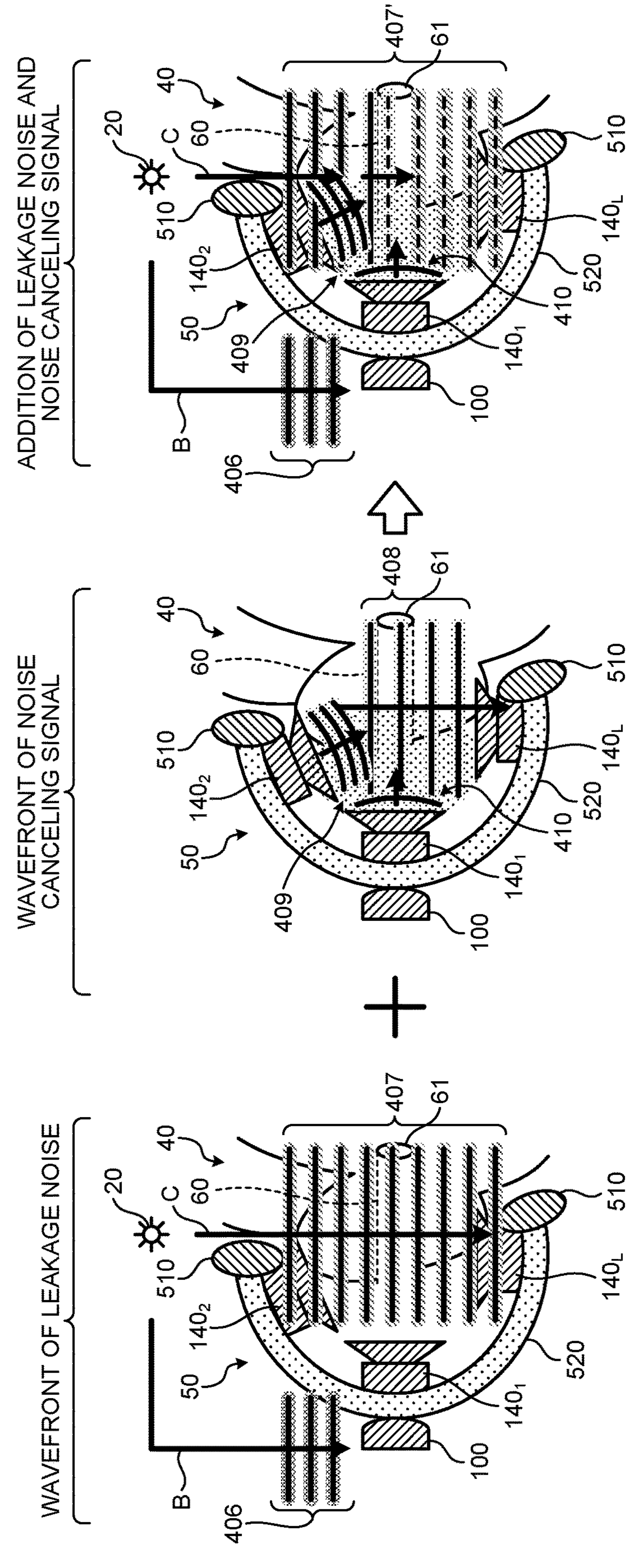
FIGS. 6A, 6B, and 6C are schematic diagrams for explaining an effect of the acoustic output device according to the first embodiment.

FIGS. 6A, 6B, and 6C illustrate a case where the noise 20 comes from a direction perpendicular to the housing 520, that is, a direction (in the example of FIGS. 6A, 6B, and 6C, the upper side) perpendicular to a direction which the FF microphone and the driver 1401 face.

FIG. 6A schematically illustrates the wavefront 406 of the noise 20 reaching the FF microphone provided in the housing 520, and the wavefront 407 of the noise 20 leaking from the gap between the ear pad 510 provided in the housing 520 and the head 40 of the user wearing headphone 50. The noise 20 reaches the FF microphone via the path B in the space of the spatial transfer function X and leaks into the housing 520 from the gap on the upper side of the housing 520 between the ear pad 510 of the housing 520 and the head 40 via the path C in the space of the spatial transfer function F.

FIG. 6B schematically illustrates an example of the wavefront by the noise canceling sound in which a noise canceling signal generated based on the noise 20 collected by the FF microphone is reproduced by each of drivers 1401, 1402, and 140L and the is output from each of drivers 1401, 1402, and 140L in the housing 520.

In this example, the noise 20 comes from above the headphone 50, and the noise canceling signal is actively reproduced from the driver $140_1$ disposed on the upper portion of the housing 520, which is close to the arrival position of the noise 20, among the three drivers $140_2$, $140_2$, and $140_L$ disposed on the housing 520.

As a more specific example, as illustrated in FIG. 6B, the highest level noise canceling signal is generated in the driver amplifier 1302 corresponding to the driver 1402 disposed on the upper portion of the housing 520 among the drivers 1401, 1402, and 140L. The driver 1402 reproduces the noise canceling sound according to the high-level noise canceling signal. The noise canceling sound travels toward the entrance of the ear canal 60, for example, as indicated by the wavefront 409.

For the driver $140_1$ disposed on the center portion of the housing 520, the driver amplifier $130_1$ corresponding to the driver $140_1$ generates a noise canceling signal having a lower level (medium level) than the noise canceling signal generated by the driver amplifier $130_2$ described above. The driver $140_1$ reproduces the noise canceling sound according to the medium level noise canceling signal. The noise canceling sound travels toward the entrance of the ear canal 60, for example, as indicated by the wavefront 410.

Furthermore, for the driver $140_L$ disposed on the lower portion of the housing 520, the driver $140_L$ corresponding to the driver amplifier $130_L$ generates a noise canceling signal having a lower level (lower level) than the noise canceling signal generated by the driver amplifier $130_1$ described above. The driver $140_L$ reproduces the noise canceling sound according to the low level noise canceling signal. In the example of the figure, the noise canceling sound is not reproduced from the driver $140_L$.

The respective noise canceling sounds reproduced by the drivers $140_1$, $140_2$, and $140_L$ are synthesized inside the housing 520, and the synthesized noise canceling sound is generated from the top to the bottom in the housing 520 as indicated by the wavefront 408 in the figure. Ideally, the sound indicated by the wavefront 408 by the synthesized noise canceling sound is, for example, a sound having a phase opposite to that of the wavefront 407 by the leakage noise illustrated in the section (a).

FIG. 6C schematically illustrates a state in which FIGS. 6A and 6B are added. Specifically, the sound indicated by the wavefront 408 obtained by synthesizing the noise canceling sounds reproduced by the drivers 1401, 1402, and 140L in FIG. 6B, and the leakage noise indicated by the wavefront 407 due to the noise 20 leaking from the gap between the upper side of the ear pad 510 and the head 40 in the housing 520 are synthesized. This synthesized sound reaches the eardrum 61.

Since the wavefront 407 of the leakage noise and the wavefront 408 of the sound obtained by synthesizing the respective noise canceling sounds substantially match with each other, the leakage noise is canceled by the noise canceling sound (wavefront 407'). The sound indicated by the wavefront 407' is a sound in which leakage noise is canceled by the noise canceling sound, and the user wearing the headphone 50 can listen to a sound in which leakage noise from above is suppressed.

As described above, according to the configuration according to the first embodiment, in addition to the driver $140_1$ disposed on the center portion in the housing 520 of the headphone 50, for example, the driver $140_2$ is mounted on the upper portion in the housing 520. Therefore, even in a case where the noise 20 arrives from above the headphone 50, noise canceling corresponding to the incoming direction of the noise 20 can be performed by actively reproducing the noise canceling signal in the driver $140_2$ disposed at a position close to the incoming direction of the noise 20. As a result, the reproduction sound reproduced by the headphone 50 can be made clearer.

Note that microphones facing the upper side of the headphone 50 in addition to the FF microphones provided in the left and right housings 520 of the headphone 50, and the direction in which the noise 20 arrives at the headphone 50 can be estimated based on sounds collected by, for example, the left and right FF microphones and the microphones facing the upper side. Not limited to this, for example, the setting of each of the FFNC filters $120_1$, $120_2$, . . . , and $120_L$ and the driver amplifiers $130_1$, $130_2$, . . . , and $130_L$ can be switched to setting corresponding to the noise 20 from above according to the control of the control unit 310 in accordance with the operation on the operation unit 211.

Figure 7A:
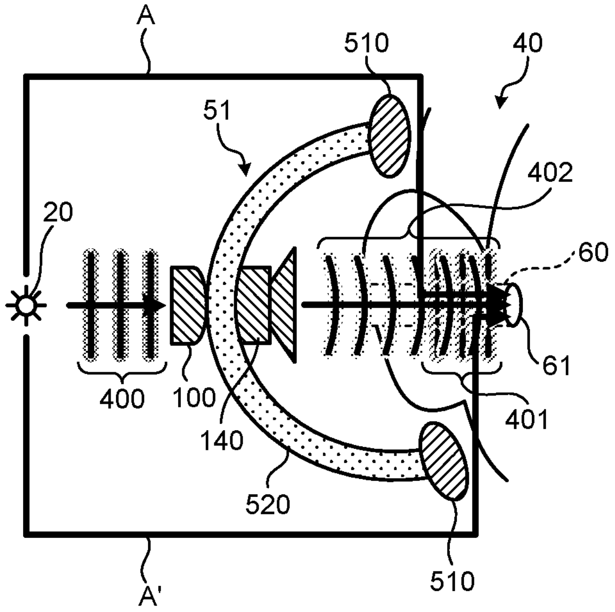
FIGS. 7A and 7B are diagrams schematically illustrating noise canceling according to an existing technology.
Figure 7B:
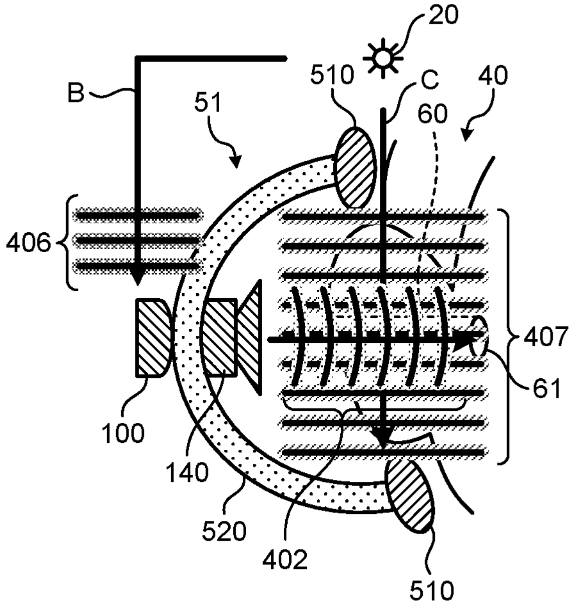

FIGS. 7A and 7B are diagrams schematically illustrating noise canceling by single microphone/single driver noise canceling headphone according to the existing technology. In a headphone 51 illustrated in FIGS. 7A and 7B, only one driver 140 is provided on the center portion of the housing 520. Further, the FF microphone is provided at a position facing the driver 140 via the housing 520. The configuration described using the transfer function in FIG. 1 is applied to the configuration of the headphone 51.

FIG. 7A illustrates a case where the noise 20 arrives at the housing 520 from the horizontal direction. Similar to FIG. 5A, the noise 20 leaks from the gap between the ear pad 510 of the housing 520 and the head 40 as indicated by paths A and A', and reaches the eardrum 61 via the ear canal 60 as leakage noise. In this configuration, the noise 20 indicated by the wavefront 400 is collected by the FF microphone, and a noise canceling signal generated based on the collected noise 20 is reproduced as a noise canceling sound by the driver 140. The noise canceling sound is synthesized with leakage noise in the space inside the housing 520 and reaches the eardrum 61 via the ear canal 60. Therefore, as in the description using FIGS. 5A, 5B, and 5C, the user can listen to the sound in which the leakage noise is suppressed by the noise canceling sound.

FIG. 7B illustrates a case where the noise 20 arrives from the vertical direction with respect to the housing described with reference to FIGS. 6A, 6B, and 6C. In this case, the headphone 51 does not include a driver provided on the upper portion of the housing 520. Therefore, as indicated by the wavefront 402, the canceling sound arrives from the horizontal direction toward the ear canal 60, and it is difficult to cancel the leakage noise arriving from above the housing 520, which is indicated by the wavefront 407, as the wavefront.

As described above, in the case of the single microphone/single driver, favorable noise canceling can be performed for the noise 20 arriving from the direction in which the driver 140 is located, but there is a possibility that sufficient noise canceling performance cannot be obtained for the noise 20 arriving from other directions.

(Coping with High Sound Pressure Noise)

Next, coping with the high sound pressure noise by providing the plurality of drivers $\mathbf{140}_1$, $\mathbf{140}_2$, . . . , and $\mathbf{140}_L$ of the above-described reason (3) will be described.

As described above, by disposing the plurality of drivers $\mathbf{140}_1$, $\mathbf{140}_2$, . . . , and $\mathbf{140}_L$ on the housing 520, the degree of freedom of the FFNC filter $\mathbf{120}_x$ is increased as compared with a case where only one FFNC filter 120 is disposed. As the degree of freedom of the FFNC filter $\mathbf{120}_x$ increases, a noise canceling signal for canceling the noise 20 can be reproduced from the plurality of drivers $\mathbf{140}_1$, $\mathbf{140}_2$, . . . , and $\mathbf{140}_L$, and noise canceling can be performed even for high sound pressure noise having a very high sound pressure, for example.

Figure 8A:
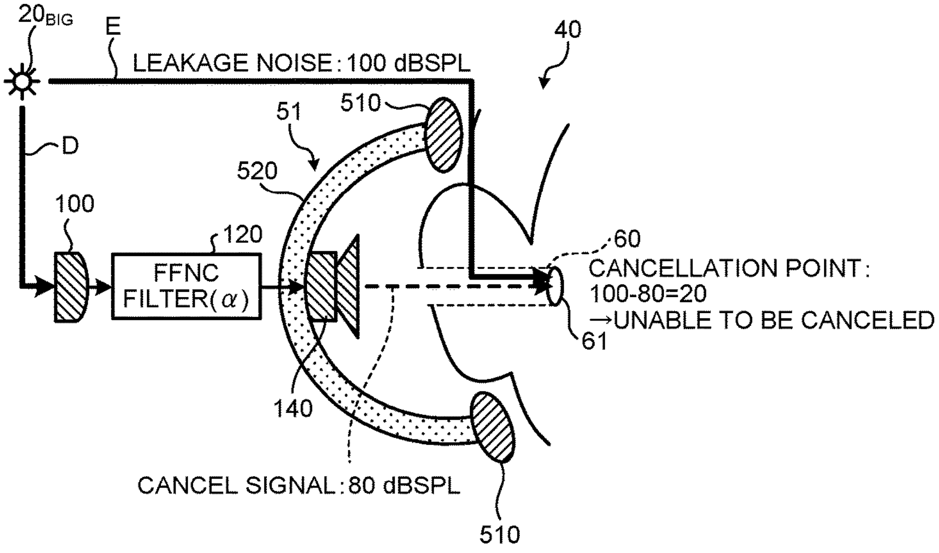
FIGS. 8A and 8B are schematic diagrams for explaining noise canceling for high sound pressure noise according to the first embodiment.
Figure 8B:
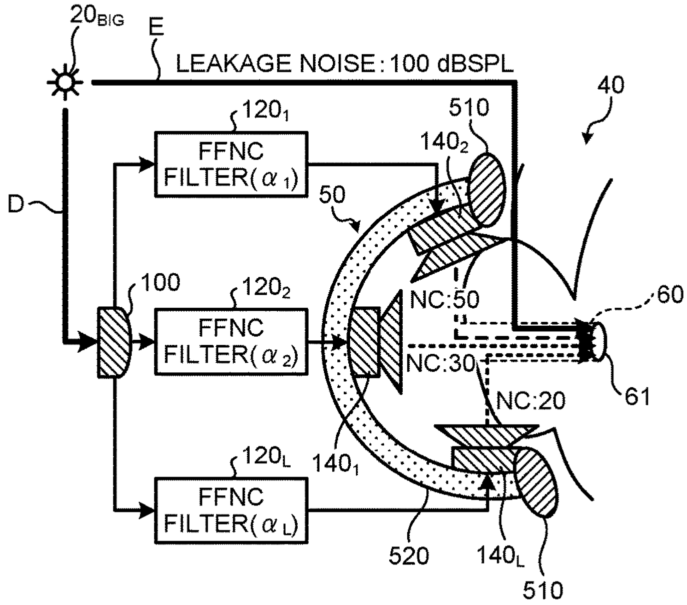

FIGS. 8A and 8B are schematic diagrams for explaining noise canceling for high sound pressure noise according to the first embodiment. FIG. 8A is a schematic diagram for explaining canceling of high sound pressure noise by the single microphone/single driver FF method noise canceling headphone according to the existing technology. In the figure, a headphone 51 is the same as the headphone 51 described with reference to FIGS. 7A and 7B, and only one driver 140 is provided on the center portion in the housing 520, and the FF microphone is provided at a position facing the driver 140 via the housing 520.

The high sound pressure noise $\mathbf{20}_{BIG}$ is collected by the FF microphone as illustrated in a path D. The FFNC filter 120 with the filter coefficient α generates a noise canceling signal for canceling the high sound pressure noise $\mathbf{20}_{BIG}$ based on the high sound pressure noise $\mathbf{20}_{BIG}$ collected by the FF microphone, and supplies the generated noise canceling signal to the driver 140 via the driver amplifier 130 (not illustrated). The driver 140 reproduces the noise canceling sound based on the noise canceling signal generated in accordance with the high sound pressure noise $\mathbf{20}_{BIG}$.

On the other hand, the high sound pressure noise $\mathbf{20}_{BIG}$ leaks into the housing 520 from the gap between the ear pad 510 and the head 40 along the path E to be leakage noise. Here, it is assumed that the maximum sound pressure that can be driven by the driver 140 is 80 [dB sound pressure level (dBSPL)] and the sound pressure of the leakage noise at the position of the eardrum 61 is 100 [dBSPL]. In the existing technology, since only one driver 140 is provided on the housing 520, noise canceling can be performed only for 80 [dBSPL] at the maximum, and leakage noise for 20 [dBSPL] cannot be canceled at the eardrum 61 which is a cancellation point.

FIG. 8B is a schematic diagram for explaining noise canceling of the high sound pressure noise 20BIG in a case where a plurality of (three in this example) drivers 1401, 1402, and 140L is provided on the housing 520 according to the first embodiment.

The high sound pressure noise $\mathbf{20}_{BIG}$ is collected by the FF microphone and passed to the FFNC filters $\mathbf{120}_1$, $\mathbf{120}_2$, . . . , and $\mathbf{120}_L$ with the filter coefficients $\alpha_1$, $\alpha_2$, . . . , and $\alpha_L$, respectively, as illustrated in the path D. Each of the FFNC filters $\mathbf{120}_1$, $\mathbf{120}_2$, . . . , and $\mathbf{120}_L$ generates a noise canceling signal for canceling the high sound pressure noise $\mathbf{20}_{BIG}$ based on the high sound pressure noise $\mathbf{20}_{BIG}$ passed from the FF microphone. The noise canceling signals generated by the FFNC filters $\mathbf{120}_1$, $\mathbf{120}_2$, . . . , and $\mathbf{120}_L$ are supplied to the drivers $\mathbf{140}_1$, $\mathbf{140}_2$, . . . , and $\mathbf{140}_L$ via the driver amplifiers $\mathbf{130}_1$, $\mathbf{130}_2$, . . . , and $\mathbf{130}_L$ (not illustrated), respectively. Each of the drivers $\mathbf{140}_1$, $\mathbf{140}_2$, . . . , and $\mathbf{140}_L$ reproduces the noise canceling sound based on the noise canceling signal generated according to the high sound pressure noise $\mathbf{20}_{BIG}$.

In this case, the sound pressure level corresponding to 100 [dBSPL] to be canceled by the cancel signal is dispersed and reproduced by the plurality of drivers $\mathbf{140}_1$, $\mathbf{140}_2$, and $140_L$.

In the example of FIG. 8B, the driver 1401 reproduces the canceling sound of 50 [dBSPL], the driver 1402 reproduces the canceling sound of 30 [dBSPL], and the driver 140L reproduces the canceling sound of 20 [dBSPL], so that the total sound pressure of the canceling sounds reproduced by the three drivers 1401, 1402, and 140L is set to 100 [dBSPL].

For example, the control unit 310 sets the filter coefficients $\alpha_1$, $\alpha_2$, and $\alpha_L$ of the FFNC filters $\mathbf{120}_1$, $\mathbf{120}_2$, and $\mathbf{120}_L$ to predetermined settings, respectively, so that the noise canceling sound having a desired sound pressure can be reproduced in each of the drivers $\mathbf{140}_1$, $\mathbf{140}_2$, and $\mathbf{140}_L$. Alternatively, the control unit 310 may control each of the driver amplifiers $\mathbf{130}_1$, $\mathbf{130}_2$, and $\mathbf{130}_L$ to cause each of the drivers $\mathbf{140}_1$, $\mathbf{140}_2$, and $\mathbf{140}_L$ to reproduce a noise canceling sound having a desired sound pressure.

As described above, in the first embodiment, it is also possible to easily cope with noise canceling for the high sound pressure noise $\mathbf{20}_{BIG}$. As an example, by applying the noise canceling according to the first embodiment, it is possible to protect the sense of hearing of, for example, a DJ (Disc Jockey) performer who performs under the high sound pressure such as club music, a worker who works under large noise, and the like.

(2-4. Modification of First Embodiment)

Next, the modification of the first embodiment will be described. A modification of the first embodiment is an example of a case where each of the plurality of drivers $\mathbf{140}_1$, $\mathbf{140}_2$, . . . , and $\mathbf{140}_L$ disposed in the housing 520 is used not as a full-range driver but as a driver that reproduces a sound signal of each frequency band obtained by dividing a reproduction frequency band.

Figure 9:
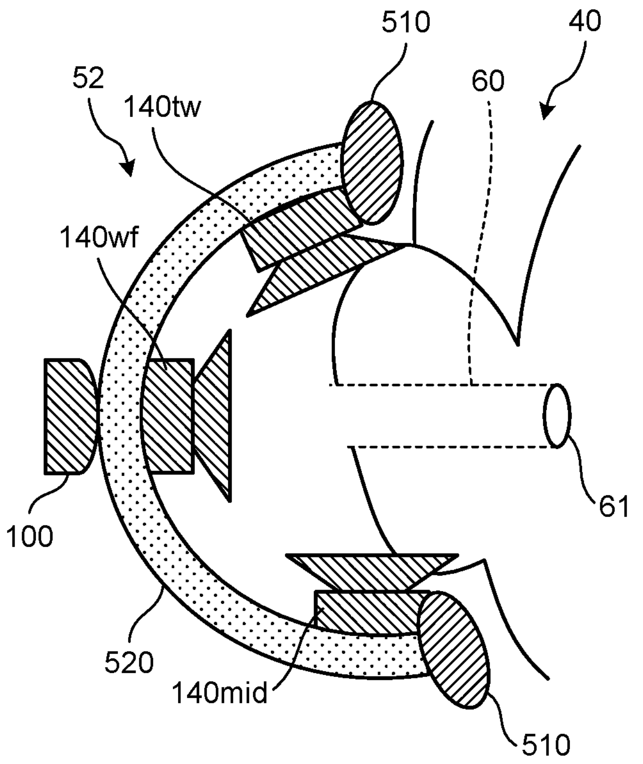
FIG. 9 is a schematic diagram schematically illustrating a vertical cross section of an appearance of an example of a headphone applicable to a modification of the first embodiment.

FIG. 9 is a schematic diagram schematically illustrating a vertical cross section of an appearance of an example of a headphone applicable to a modification of the first embodiment. In FIG. 9, a headphone 52 include one FF microphone and three drivers $\mathbf{140}_{tw}$, $\mathbf{140}_{wf}$, and $\mathbf{140}_{mid}$. The driver $\mathbf{140}_{tw}$ is a tweeter that performs high-frequency reproduction, the driver $\mathbf{140}_{mid}$ is a mid-range driver that performs mid-frequency reproduction, and the driver $\mathbf{140}_{wf}$ is a woofer that performs low-frequency reproduction.

Figure 10:
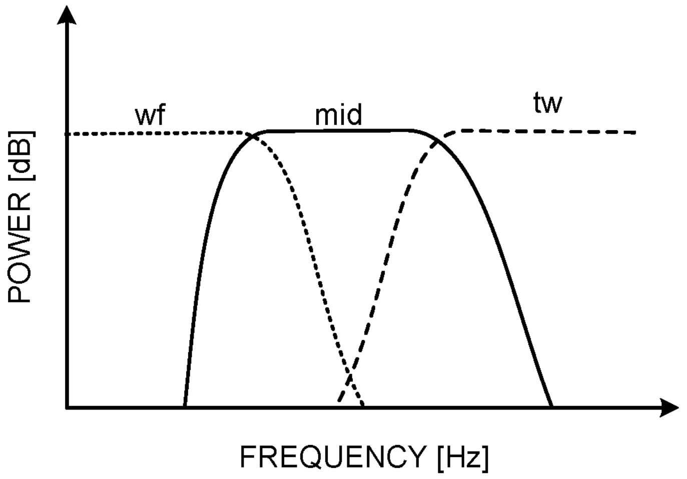
FIG. 10 is a diagram schematically illustrating an example of frequency characteristics of a sound signal supplied to each driver.

For example, in the configuration illustrated in FIG. 3A, the sound signal output from the DAC 201 is filtered into high-frequency, mid-frequency, and low-frequency sound signals by a predetermined speaker network, and supplied to the drivers $\mathbf{140}_{tw}$, $\mathbf{140}_{mid}$, and $\mathbf{140}_{wf}$. FIG. 10 is a diagram schematically illustrating an example of frequency characteristics of sound signals supplied to the drivers 140$_{tw}$, 140$_{mid}$, and 140$_{wf}$. The sound signal tw supplied to the driver 140$_{tw}$ is a signal obtained by cutting a frequency band lower than the first frequency, and the sound signal wf supplied to the driver 140$_{wf}$ is a signal obtained by cutting a frequency band higher than the second frequency lower than the first frequency. Furthermore, the sound signal mid supplied to the driver 140$_{mid}$ is a signal obtained by cutting a frequency band higher than the first frequency and a frequency band lower than the second frequency.

As described above, by limiting the frequency band of the sound signal supplied to each of the plurality of drivers 140$_{tw}$, 140$_{mid}$, and 140$_{wf}$, an unnecessary peak/notch does not appear in the frequency characteristics as compared with the case of using the full-range driver, and thus the cancel signal can be stably reproduced.

Next, a point that the cancellation signal can be stably reproduced by band division by the plurality of drivers 140$_{tw}$, 140$_{mid}$, and 140$_{wf}$ will be described while being compared with the existing technology. The configuration of the FF method noise canceling by the single microphone/single driver according to the existing technology is described using the transfer function in FIG. 1, and the filter coefficient α of the FFNC filter 120 is obtained by the above-described Expressions (1) and (2). At this time, as can be seen from Expression (2), the transfer function D of the driver 140 exists on the denominator side.

Figure 11A:
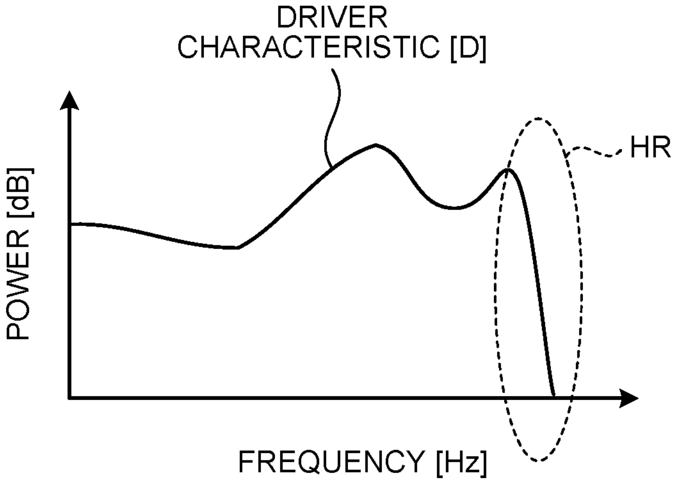
FIGS. 11A and 11B are schematic diagrams illustrating an example of characteristics of a full range driver and an FFNC filter corresponding to the full range driver.
Figure 11B:
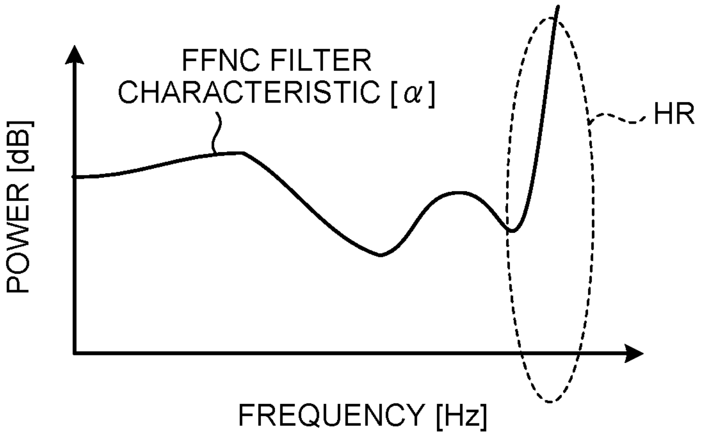

Here, characteristics of the FFNC filter 120 in a case where only the full range driver is used will be considered. FIGS. 11A and 11B are schematic diagrams illustrating an example of characteristics of the full range driver and the FFNC filter corresponding to the full range driver. In FIGS. 11A and 11B, the vertical axis represents power [dB], and the horizontal axis represents frequency.

For example, the full-range driver 140 having frequency characteristics as illustrated in FIG. 11A is assumed. Few full-range drivers have flat characteristics from a low-frequency to a high-frequency. In the example of FIG. 11A, the driver characteristic (D) is a characteristic in which the power rises in the mid-frequency and steeply decreases in the predetermined frequency band HR of the high-frequency. In the figure, the driver characteristic is illustrated as a transfer function (D).

FIG. 11B illustrates an example of a characteristic of the FFNC filter 120 corresponding to the characteristic of FIG. 11A. In the figure, the characteristic of the FFNC filter is illustrated as a filter coefficient α. From the above-described Expression (2), since the driver characteristic (D) exists on the denominator side, the characteristic of the FFNC filter 120 has a rough shape close to the inverse characteristic of the driver characteristic (D) illustrated in FIG. 11A as illustrated in FIG. 11B. In the example of the figure, the power sharply increases in the frequency band HR where the power sharply decreases in the driver characteristic (D).

In the case of the driver characteristic (D) illustrated in FIG. 11A, the power of the frequency band HR of the FFNC filter 120 is large although it is difficult for the driver 140 to reproduce sound in the high-frequency, that is, the frequency band HR. Therefore, the driver 140 attempts to forcibly reproduce the noise canceling signal based on the output of the FFNC filter 120. As a result, the reproduced noise canceling signal is distorted, and noise may be amplified instead of canceling noise.

As a countermeasure, it is possible to prevent the noise canceling signal from being distorted by cutting the power of the high-frequency component of the FFNC filter 120. However, in this case, since the power is cut, it is difficult to cancel the noise in the high-frequency. Therefore, by using a multi-driver, performing band division by each driver, and generating a cancel signal for each divided frequency band, it is possible to cancel noise in a wide band from a low-frequency to a high-frequency.

3. Second Embodiment

Next, the second embodiment of the present disclosure will be described. The second embodiment is an example in which the present disclosure is applied to a multi-microphone/multi-driver FF method noise canceling headphone in which two or more drivers are provided inside the housing of the headphone and two or more FF microphones are provided toward the outside of the housing.

(3-1. Configuration According to Second Embodiment)

Figure 12:
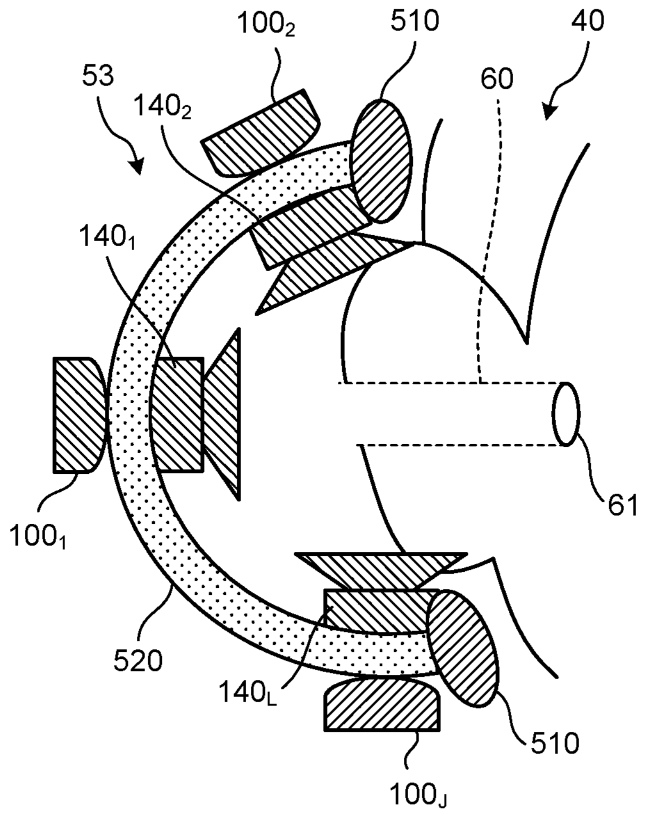
FIG. 12 is a schematic diagram schematically illustrating a vertical cross section of an appearance of an example of a multi-microphone/multi-driver FF method noise canceling headphone according to the second embodiment.

FIG. 12 is a schematic diagram schematically illustrating a vertical cross section of an appearance of an example of a multi-microphone/multi-driver FF method noise canceling headphone 53 according to the second embodiment. Hereinafter, the "multi-microphone/multi-driver FF method noise canceling headphone 53" will be simply described as the "headphone 53". Note that FIG. 12 illustrates the right housing 520 of the left and right housings of the headphone 53.

In the headphone 53 illustrated in FIG. 12, L drivers 140$_1$, 140$_2$, . . . , and 140$_L$ are provided inside the housing 520, as in the headphone 50 described with reference to FIG. 2. In the example of FIG. 12, assuming that L=3, three drivers 140$_1$, 140$_2$, and 140$_L$ are provided on the housing 520. The alignment direction of the drivers 140$_1$, 140$_2$, and 140$_L$ is not limited to the vertical direction illustrated in FIG. 12, and may be a horizontal direction or an oblique direction.

The headphone 53 is provided with J FF microphones 100$_1$, 100$_2$, . . . , and 100$_J$ on the housing 520 toward the outside of the housing 520. In the illustrated example, three drivers 140$_1$, 140$_2$, and 140$_L$ and three FF microphones 100$_1$, 100$_2$, and 100$_J$ are provided on the housing 520, and the FF microphones 100$_1$, 100$_2$, and 100$_J$ are provided at positions facing the drivers 140$_1$, 140$_2$, and 140$_L$ via the housing 520, respectively. Note that the positions of the FF microphones 100$_1$, 100$_2$, . . . , and 100$_J$ are not limited to this example.

Figure 13A:
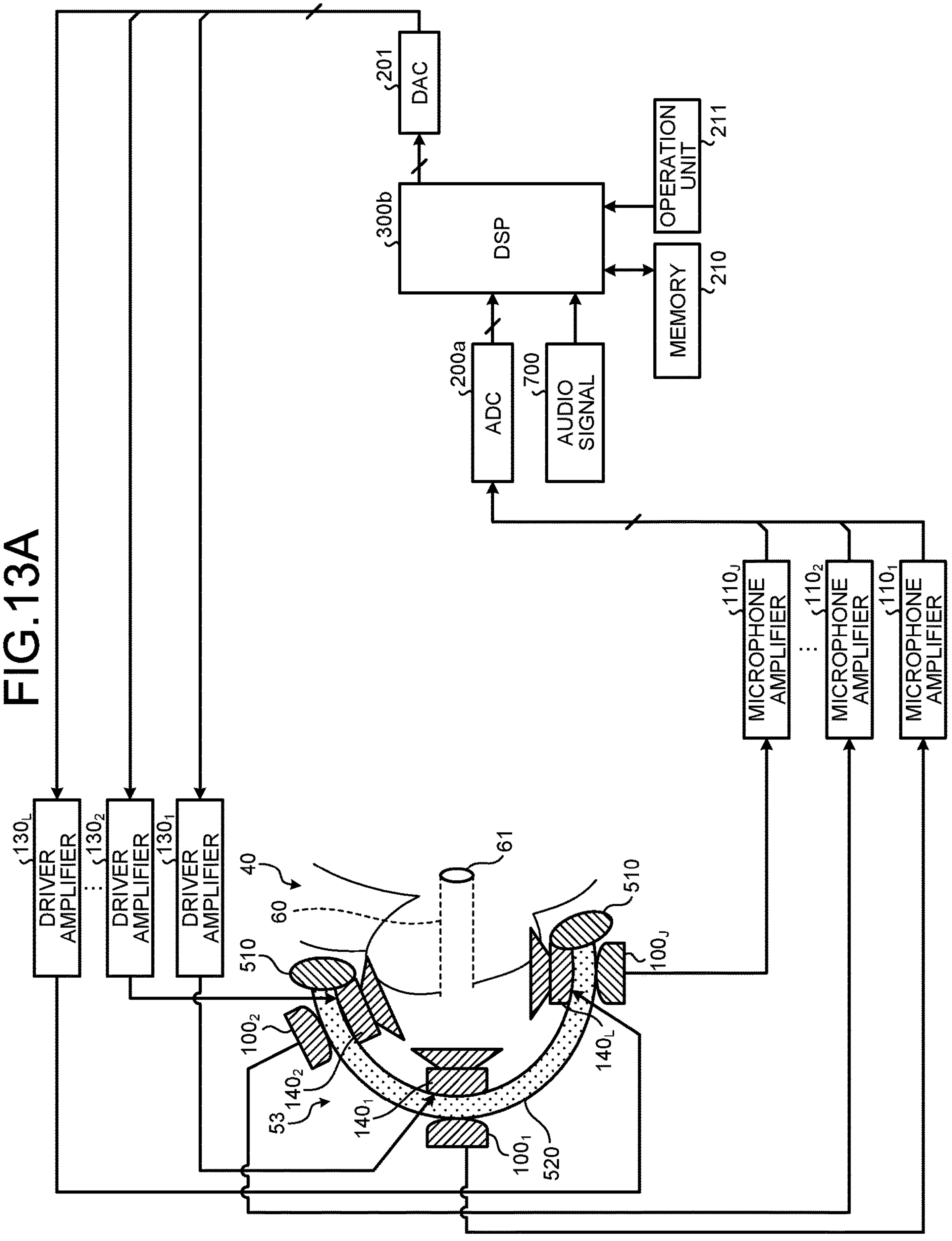
FIG. 13A is a schematic diagram schematically illustrating a configuration of an example of an acoustic output device according to the second embodiment.

FIG. 13A is a schematic diagram schematically illustrating a configuration of an example of an acoustic output device according to the second embodiment. In the configuration illustrated in FIG. 13A, J microphone amplifiers 110$_1$, 110$_2$, . . . , and 110$_J$ respectively corresponding to J FF microphones 100$_1$, 100$_2$, . . . , and 100$_J$ are provided instead of the microphone amplifier 110 in the configuration illustrated in FIG. 3A.

Furthermore, in FIG. 13A, an ADC 200*a* and a DSP 300*b* are configured to be capable of supporting the sound signals of the plurality of channels output from the respective J microphone amplifiers 110$_1$, 110$_2$, . . . , and 110$_J$ unlike the ADC 200 and the DSP 300*a* illustrated in FIG. 3A.

Figure 13B:
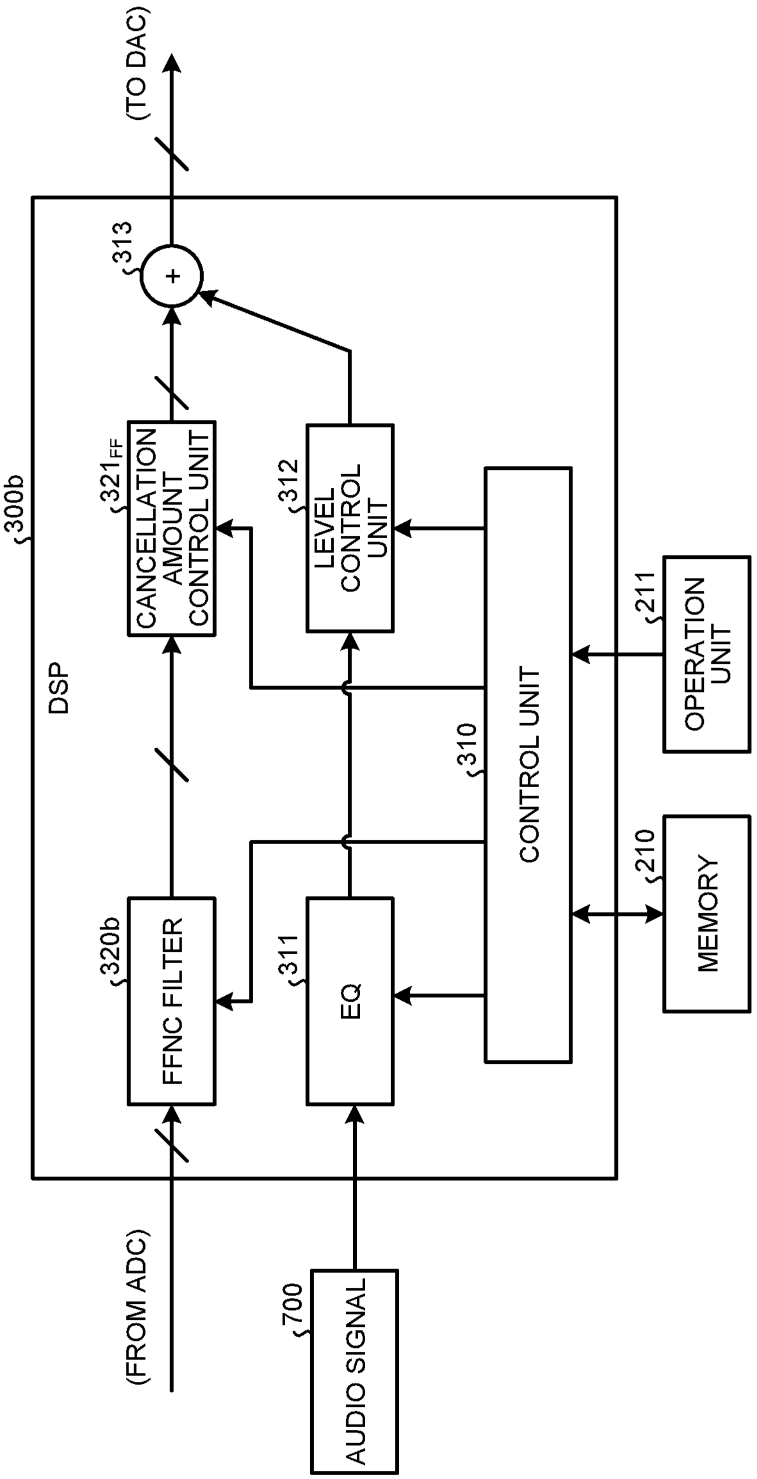
FIG. 13B is a functional block diagram of an example for explaining functions of the DSP according to the second embodiment.

FIG. 13B is a functional block diagram of an example for explaining the functions of the DSP 300*b* according to the second embodiment. In FIG. 13B, an FFNC filter 320*b* includes the functions of (J×L) FFNC filters corresponding to the plurality of microphone amplifiers 110$_1$, 110$_2$, . . . , and 110$_J$ and the L drivers 140$_1$, 140$_2$, . . . , and 140$_L$ illustrated in FIG. 13A to output L noise canceling signals corresponding to the drivers 140$_1$, 140$_2$, . . . , and 140$_L$. The cancellation amount control unit $321_{FF}$ includes a function of adjusting the cancellation amount for each of the L noise canceling signals.

Figure 14:
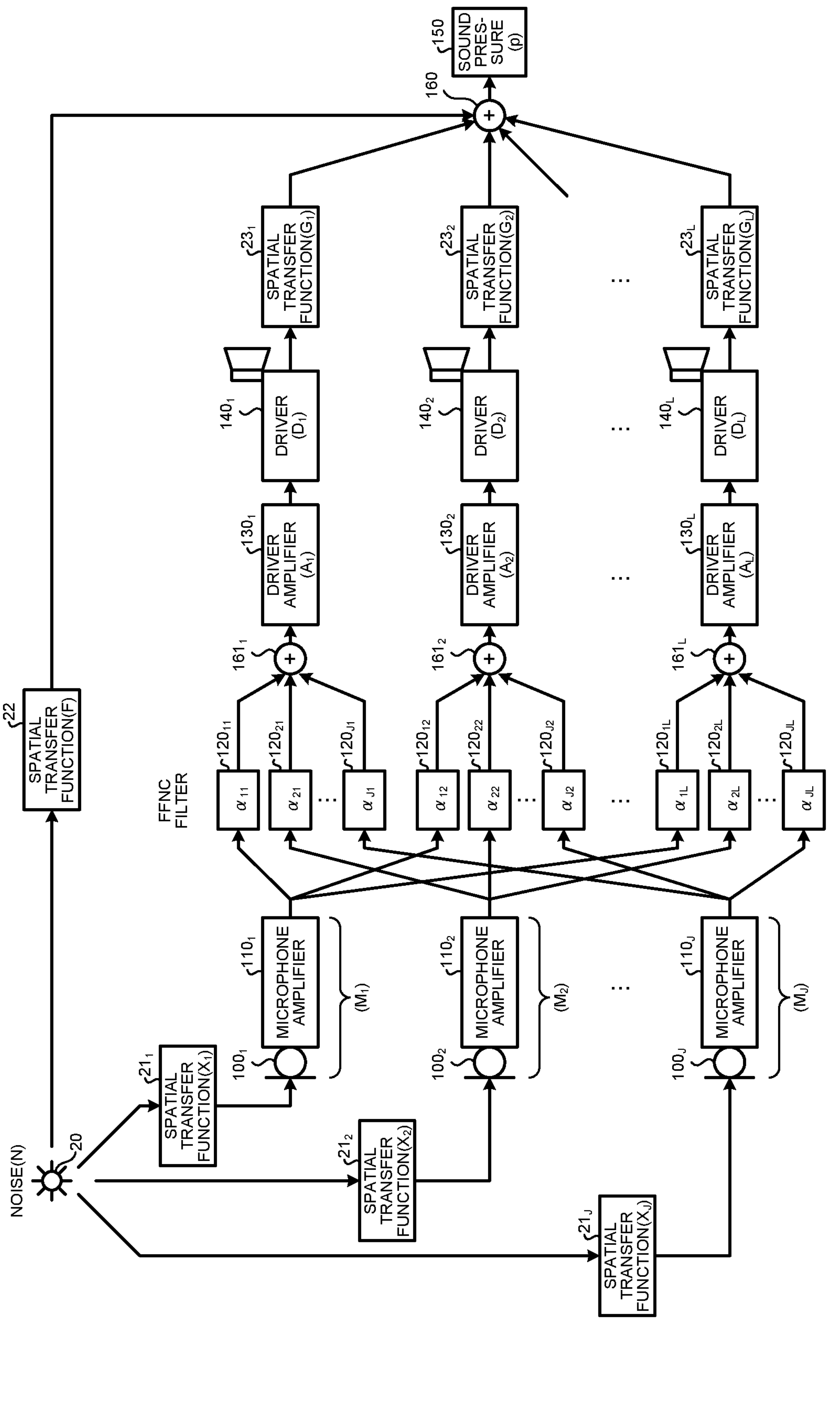
FIG. 14 is a diagram illustrating a configuration of an acoustic output device according to the second embodiment using a transfer function.

FIG. 14 is a diagram illustrating a configuration of an acoustic output device according to the second embodiment using a transfer function. Note that FIG. 14 illustrates one of the left and right configurations of the headphone 53. The configuration illustrated in FIG. 14 includes a plurality of sets of the FF microphone and the microphone amplifier 110 illustrated in FIG. 4 described above, and further includes a plurality of FFNC filters 120 for each of the plurality of sets.

Specifically, the headphone 53 include a set of the FF microphone $\mathbf{100}_1$ and the microphone amplifier $\mathbf{110}_1$, a set of the FF microphone $\mathbf{100}_2$ and the microphone amplifier $\mathbf{110}_2$, . . . , and a set of the FF microphone 100*j*, and the microphone amplifier 110*j*, which are transfer functions $M_1$, $M_2$, . . . , and $M_J$, respectively. The noise 20 is collected by the FF microphones $\mathbf{100}_1$, $\mathbf{100}_2$, . . . , and $\mathbf{100}_J$ via the spaces $\mathbf{21}_1$, $\mathbf{21}_2$, . . . , and $\mathbf{21}_J$, which are the spatial transfer functions $X_1$, $X_2$, . . . , and $X_J$, respectively, and is output from the microphone amplifiers $\mathbf{110}_1$, $\mathbf{110}_2$, . . . , and $\mathbf{110}_J$.

The headphone 53 include J FFNC filters for each of the drivers $\mathbf{140}_1$, $\mathbf{140}_2$, . . . , and $\mathbf{140}_L$. That is, it includes the FFNC filters $\mathbf{120}_{11}$, $\mathbf{120}_{21}$, . . . , and $\mathbf{120}_{J1}$ with the filter coefficients $\alpha_{11}$, $\alpha_{21}$, . . . , and $\alpha_{J1}$ for the driver $\mathbf{140}_1$, respectively. It includes the FFNC filters $\mathbf{120}_{12}$, $\mathbf{120}_{22}$, . . . , and $\mathbf{120}_{J2}$ with the filter coefficients $\alpha_{12}$, $\alpha_{22}$, . . . , and $\alpha_{J2}$ for the driver $\mathbf{140}_2$, respectively. Similarly, it includes the FFNC filters $\mathbf{120}_{1L}$, $\mathbf{120}_{2L}$, . . . , and $\mathbf{120}_{JL}$ with the filter coefficients $\alpha_{1L}$, $\alpha_{2L}$, . . . , and $\alpha_{JL}$ for the driver $\mathbf{140}_L$.

The FFNC filters $\mathbf{120}_{11}$ to $\mathbf{120}_{JL}$ are realized by the FFNC filter 320*b* in FIG. 13B.

In FIG. 14, the output of the microphone amplifier $\mathbf{110}_1$ is input to first indicated FFNCs $\mathbf{120}_{11}$, $\mathbf{120}_{12}$, . . . , and $\mathbf{120}_{1L}$ among the FFNC filters corresponding to the drivers $\mathbf{140}_1$, $\mathbf{140}_2$, . . . , and $\mathbf{140}_L$, respectively. The output of the microphone amplifier $\mathbf{110}_2$ is input to second indicated FFNCs $\mathbf{120}_{21}$, $\mathbf{120}_{22}$, . . . , and $\mathbf{120}_{2L}$ among the FFNC filters corresponding to the drivers $\mathbf{140}_1$, $\mathbf{140}_2$, . . . , and $\mathbf{140}_L$, respectively. Similarly, the output of the microphone amplifier $\mathbf{110}_J$ is input to J-th indicated FFNCs $\mathbf{120}_{J1}$, $\mathbf{120}_{J2}$, . . . , and $\mathbf{120}_{JL}$ among the FFNC filters corresponding to the drivers $\mathbf{140}_1$, $\mathbf{140}_2$, . . . , and $\mathbf{140}_L$, respectively.

The outputs of the FFNC filters $\mathbf{120}_{11}$, $\mathbf{120}_{21}$, . . . , and $\mathbf{120}_{J1}$ corresponding to the driver $\mathbf{140}_1$ are added by an adder $\mathbf{161}_1$ and passed to the driver amplifier $\mathbf{130}_1$. The outputs of the FFNC filters $\mathbf{120}_{12}$, $\mathbf{120}_{22}$, . . . , and $\mathbf{120}_{J2}$ corresponding to the driver $\mathbf{140}_2$ are added by an adder $\mathbf{161}_2$ and passed to the driver amplifier $\mathbf{130}_2$. Similarly, the outputs of the FFNC filters $\mathbf{120}_{1L}$, $\mathbf{120}_{2L}$, . . . , and $\mathbf{120}_{JL}$ corresponding to the driver $\mathbf{140}_L$ are added by the adder $\mathbf{161}_L$ and passed to the driver amplifier $\mathbf{130}_L$.

The configuration after the driver amplifiers $\mathbf{130}_1$, $\mathbf{130}_2$, . . . , and $\mathbf{130}_L$ and subsequent amplifiers is the same as the configuration illustrated in FIG. 4, and thus the description thereof is omitted here.

(3-2. Effects of Second Embodiment)

Next, effects of the second embodiment will be described. It can be seen that, in the multi-microphone configuration illustrated in FIG. 14, the number of FFNC filters is further increased and the degree of freedom of the filter coefficient α is further increased as compared with the single microphone configuration illustrated in FIG. 4 described above. In the multi-microphone configuration, the performance of noise canceling can be improved as compared with the single microphone configuration.

Figure 15:
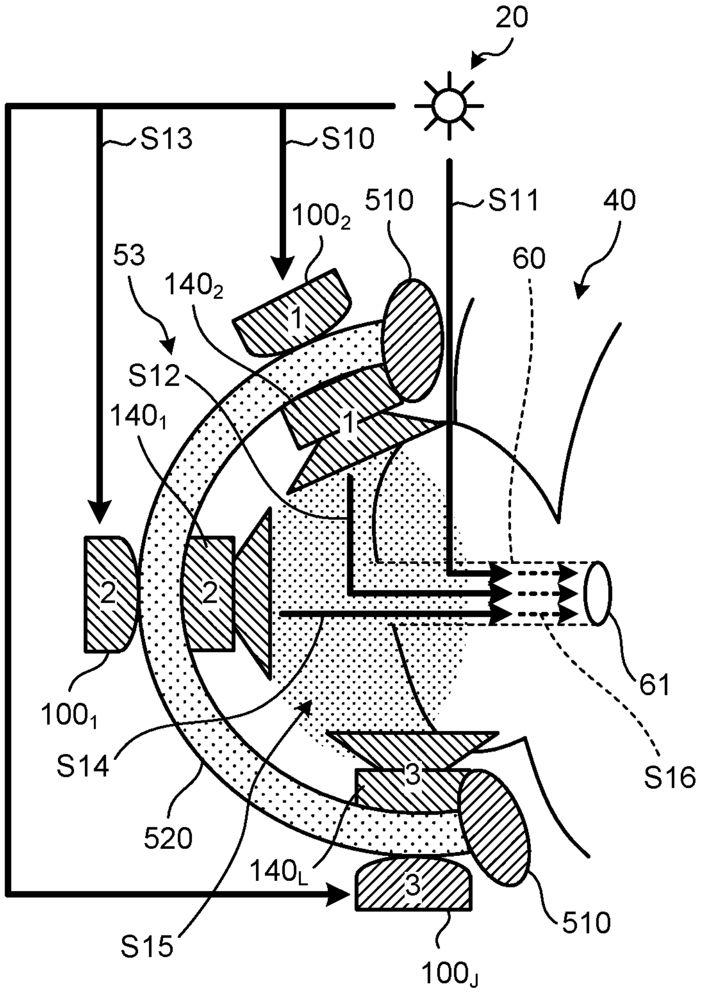
FIG. 15 is a schematic diagram for explaining an outline of noise canceling according to the second embodiment.

FIG. 15 is a schematic diagram for explaining an outline of noise canceling according to the second embodiment. Here, a case where the noise 20 comes from above the headphone 53 is illustrated. The noise 20 is first collected by the FF microphone $\mathbf{100}_2$ provided on the upper portion of the housing 520 (step S10). The noise 20 further leaks into the housing 520 (step S11). The headphone 53 generates a noise canceling signal based on the noise 20 collected by the FF microphone $\mathbf{100}_2$, and reproduces the generated noise canceling signal by the driver $\mathbf{140}_2$ (step S12).

The noise 20 is also collected by the FF microphone $\mathbf{100}_1$ provided on the center portion of the housing 520 (step S13). The headphone 53 generates a noise canceling signal based on the noise 20 collected by the FF microphone $\mathbf{100}_1$, and reproduces the generated noise canceling signal by the driver $\mathbf{140}_1$ (step S14).

The cancellation signal reproduced by the driver $\mathbf{140}_2$ and the cancellation signal reproduced by the driver $\mathbf{140}_1$ are synthesized in a space in the housing 520 to generate a wavefront (step S15). The noise 20 leaking into the housing 520 in step S11 is canceled at the position of the eardrum 61 by the wavefront based on the cancellation signal generated in step S15.

As described above, by disposing the plurality of FF microphones $\mathbf{100}_1$, $\mathbf{100}_2$, . . . , and $\mathbf{100}_J$ on the housing 520, it is possible to collect sound by the FF microphone before noise reaches the position of the eardrum 61, perform a filtering process by the FFNC filter, and immediately reproduce the cancellation signal from the driver disposed in the vicinity of the position where the noise 20 has leaked. Therefore, the canceling performance can be improved as compared with the single microphone configuration. That is, it can be considered that the performance of noise canceling is improved by analyzing the incoming direction of the noise 20 by the plurality of FF microphones $\mathbf{100}_1$, $\mathbf{100}_2$, . . . , and $\mathbf{100}_J$ disposed on the housing 520 and immediately reproducing the cancellation signal from the driver corresponding to the incoming direction among the drivers $\mathbf{140}_1$, $\mathbf{140}_2$, . . . , and $\mathbf{140}_L$.

Figure 16A:
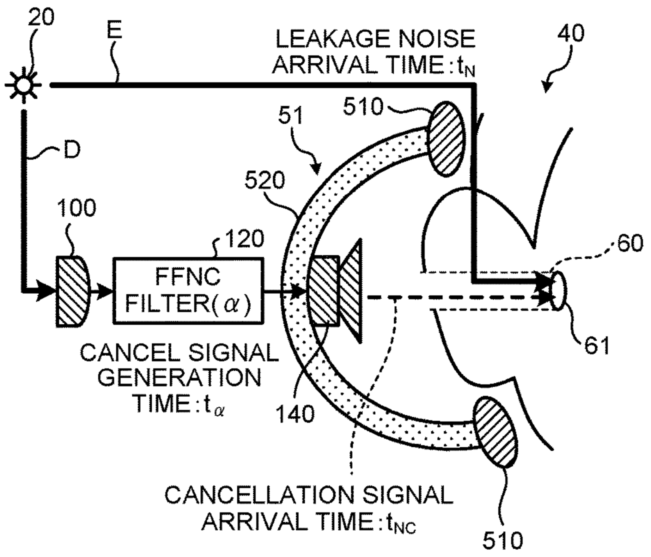
FIGS. 16A and 16B are schematic diagrams schematically illustrating noise canceling according to an existing technology.
Figure 16B:
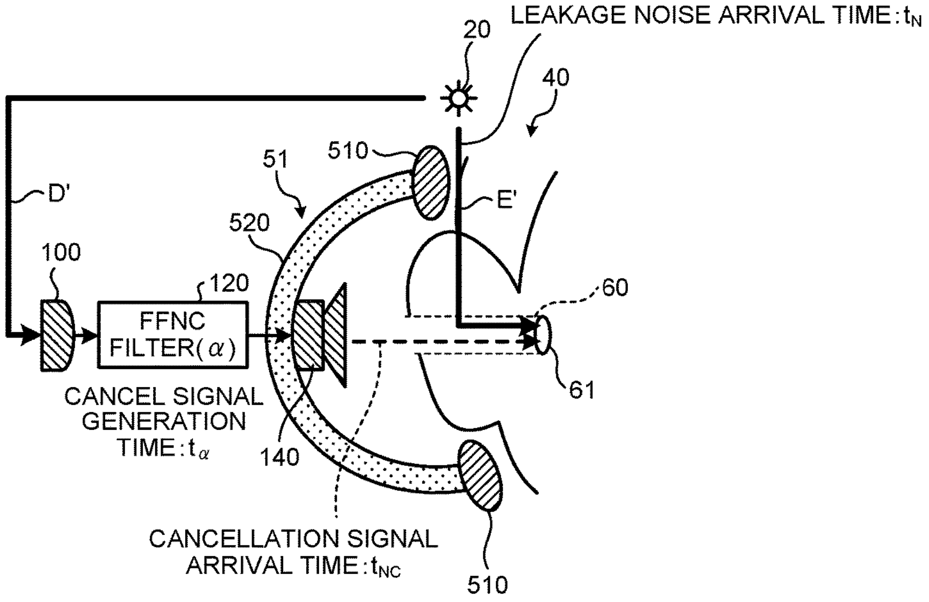

(Comparison with existing technology) FIGS. 16A and 16B are schematic diagrams schematically illustrating noise canceling according to an existing technology (single microphone/single driver configuration). In the existing single microphone/single driver configuration, as illustrated in FIG. 16A, the noise 20 coming from the lateral direction of the FF microphone provided on the center portion of the housing 520 by the path D can be reproduced by generating a cancel signal before the noise 20 reaches the position of the eardrum 61. Therefore, it is possible to cancel the leakage noise in which the noise 20 leaks from above the housing 520 via the path E.

This is because $t_\alpha+t_{NC}\leq t_N$ always holds where time $t_N$ is a time until the noise 20 leaks to the position of the eardrum 61 via the path E, time $t_\alpha$ is a time for generating the cancellation signal by the FFNC filter 120, and time $t_{NC}$ is a time for the cancellation sound reproducing the cancellation signal from the driver 140 to reach the position of the eardrum 61.

However, as illustrated in FIG. 16B, in a case where the noise 20 arrives from above the housing 520, the noise 20 leaking through the path E' reaches the position of the eardrum 61 before the cancel signal, and $t_\alpha$+tNC>tN holds. Therefore, the canceling performance is deteriorated as compared with the case of canceling the noise 20 from the lateral direction. As described above, by adopting the multi-microphone/multi-driver according to the second embodiment as the configuration of the noise canceling headphone, it is possible to improve the canceling performance as compared with the existing single microphone/single driver.

4. Third Embodiment

Next, the third embodiment will be described. The third embodiment employs, as the noise canceling method, a feedback (FB) method in which leakage noise in the housing 520 is collected by a microphone provided in the housing 520, and the leakage noise at the position of the eardrum 61 is canceled based on the collected leakage noise. In the third embodiment, in the multi-microphone/multi-driver, a plurality of microphones used for noise canceling is provided as internal microphones in the housing 520, and is used as an FB method microphone (FB microphone).

(4-1. Existing Technology)

Figure 17:
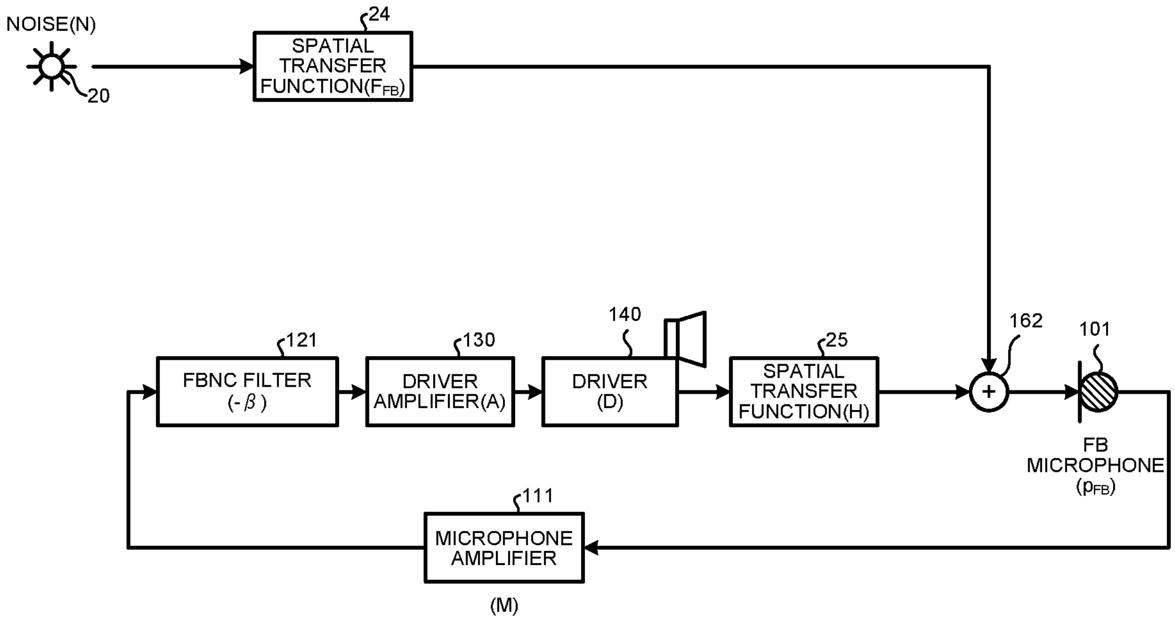
FIG. 17 is a diagram illustrating a configuration of a single microphone/single driver FB method noise canceling headphone according to an existing technology using a transfer function.

First, in order to facilitate understanding, FB method noise canceling by a single microphone/single driver according to an existing technology will be described. FIG. 17 is a diagram illustrating a configuration of a single microphone/single driver FB method noise canceling headphone according to the existing technology using a transfer function.

The leakage noise in which the noise 20 has leaked into the housing 520 via the space 24 of the spatial transfer function $F_{FB}$ and the noise canceling sound reproduced by the driver 140 and transmitted via a space 25 in the housing 520 of the spatial transfer function H are synthesized by an addition unit 162 by the space inside the housing 520. The sound synthesized by the addition unit 162 is collected by an FB microphone 101. The sound pressure at the position of the FB microphone 101 is referred to as a sound pressure $p_{FB}$.

The sound signal output from the FB microphone 101 is supplied to a microphone amplifier 111 and amplified. A transfer function including the FB microphone 101 and the microphone amplifier 111 is (M). The output of the microphone amplifier 111 is passed to an FBNC filter 121 having a filter coefficient −β for performing noise canceling (NC) of the FB method.

The FBNC filter 121 generates a noise canceling signal for generating a noise canceling sound that cancels noise based on the input signal. The noise canceling signal generated by the FBNC filter 121 is amplified by the driver amplifier 130 of the transfer function A, and drives the driver 140 of the transfer function D. The driver 140 generates a noise canceling sound by air vibration according to the noise canceling signal. The noise canceling sound is transmitted from the driver 140 toward a control point (for example, the eardrum of the user wearing the headphone) via the space 25. At this time, as described above, the noise canceling sound is synthesized with the noise 20 leaking into the housing by the addition unit 162 and reaches the position of the eardrum 61. As a result, the sound arriving at the position of the eardrum 61 is a sound in which the leakage noise is canceled by the canceling sound.

In this configuration, the sound pressure $p_{FB}$ at the position of the FB microphone 101 is expressed by the following Expression (5).

$$p_{FB} = \frac{NF_{FB}}{1 + M\beta ADH} \tag{5}$$

(4-2. Configuration According to Third Embodiment)

Figure 18:
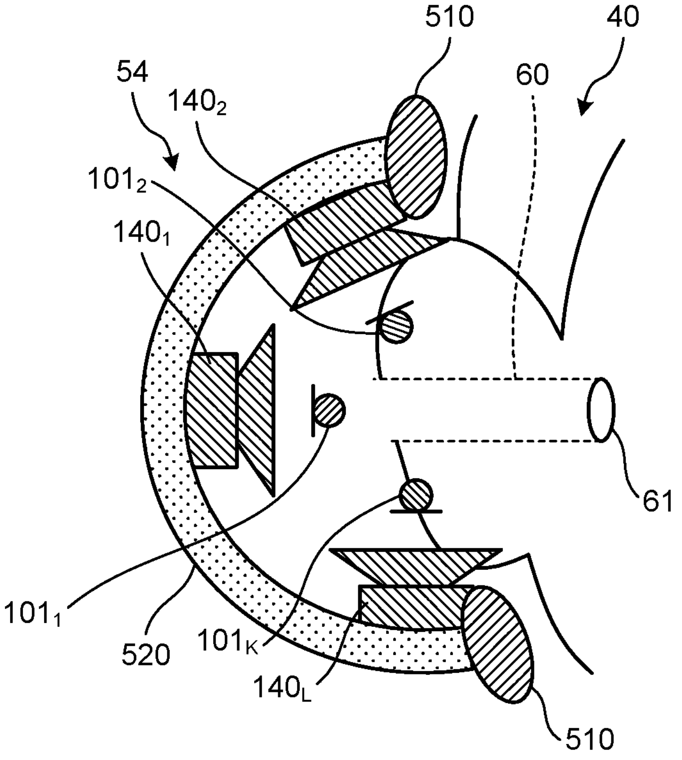
FIG. 18 is a schematic diagram schematically illustrating a vertical cross section of an appearance of an example of a multi-microphone/multi-driver FB method noise canceling headphone according to the third embodiment.

Next, a configuration according to the third embodiment will be described. FIG. 18 is a schematic diagram schematically illustrating a vertical cross section of an appearance of an example of a multi-microphone/multi-driver FB method noise canceling headphone 54 according to the third embodiment. Hereinafter, the "multi-microphone/multi-driver FB method noise canceling headphone 54" will be simply described as the "headphone 54". Note that FIG. 18 illustrates the right housing 520 of the left and right housings of the headphone 54.

In the headphone 54 illustrated in FIG. 18, L drivers $\mathbf{140}_1$, $\mathbf{140}_2$, . . . , and $\mathbf{140}_L$ are provided inside the housing 520, as in the headphone 50 described with reference to FIG. 2. In the example of FIG. 18, assuming that L=3, three drivers $\mathbf{140}_1$, $\mathbf{140}_2$, and $\mathbf{140}_L$ are provided on the housing 520. The alignment direction of the drivers $\mathbf{140}_1$, $\mathbf{140}_2$, and $\mathbf{140}_L$ is not limited to the vertical direction illustrated in FIG. 12, and may be a horizontal direction or an oblique direction.

The headphone 54 is provided with K FB microphones $\mathbf{101}_1$, $\mathbf{101}_2$, . . . , and $\mathbf{101}_K$ in the housing 520. In the illustrated example, three drivers $\mathbf{140}_1$, $\mathbf{140}_2$, and $\mathbf{140}_L$ and three FB microphones $\mathbf{101}_1$, $\mathbf{101}_2$, and $\mathbf{101}_K$ are provided in the housing 520, and the FB microphones $\mathbf{101}_1$, $\mathbf{101}_2$, and $\mathbf{101}_K$ are provided toward the corresponding drivers $\mathbf{140}_1$, $\mathbf{140}_2$, and $\mathbf{140}_L$, respectively, in the housing 520. The positions of the FB microphones $\mathbf{101}_1$, $\mathbf{101}_2$, . . . , and $\mathbf{101}_K$ are not limited to this example.

Figure 19A:
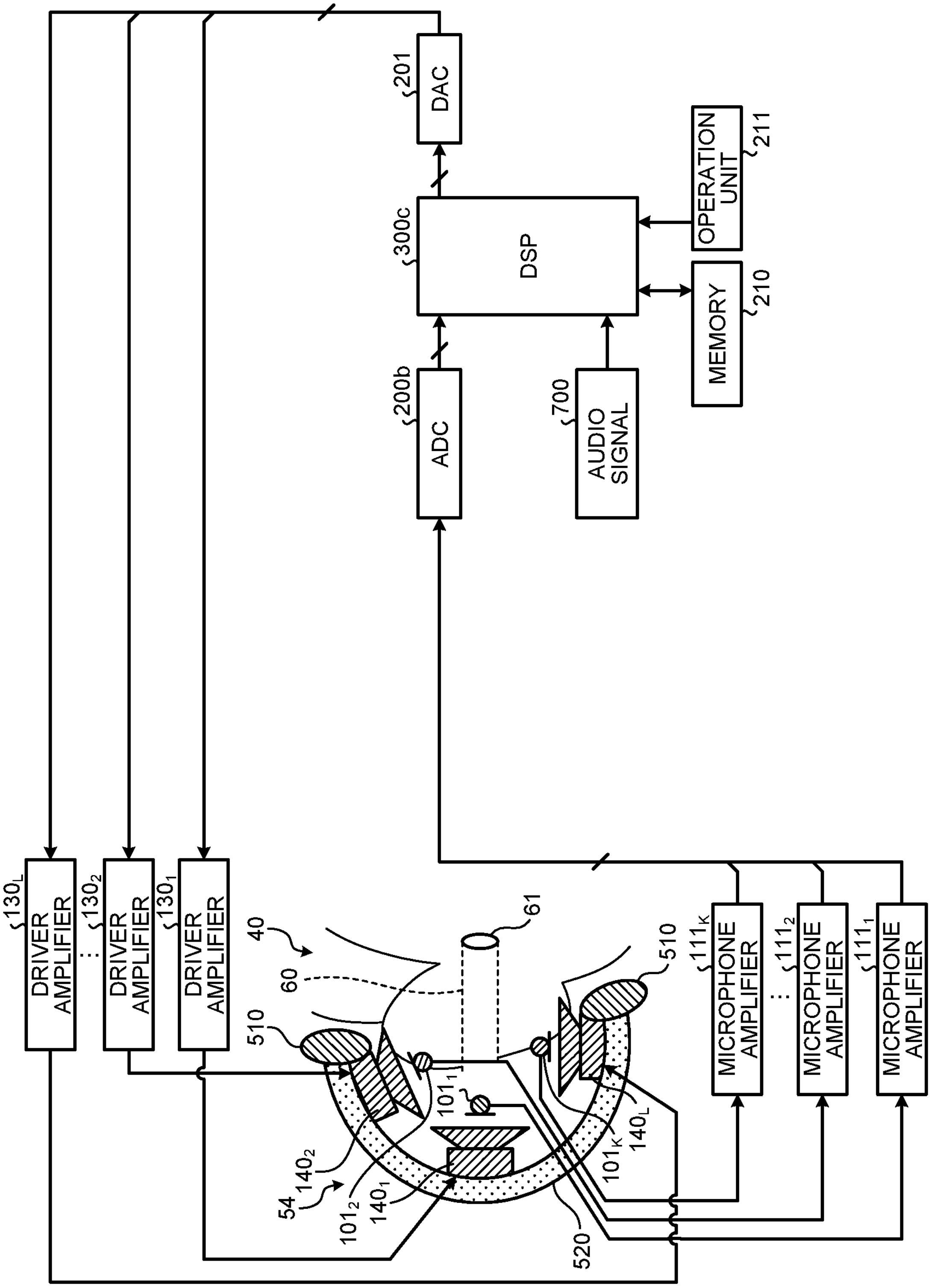
FIG. 19A is a schematic diagram schematically illustrating a configuration of an example of an acoustic output device according to the third embodiment.

FIG. 19A is a schematic diagram schematically illustrating a configuration of an example of an acoustic output device according to the third embodiment. The configuration illustrated in FIG. 19A is different from the configuration illustrated in FIG. 3A in that K microphone amplifiers $\mathbf{111}_1$, $\mathbf{111}_2$, . . . , and $\mathbf{101}_K$ respectively corresponding to K FB microphones $\mathbf{101}_1$, $\mathbf{101}_2$, . . . , and $\mathbf{111}_K$ are provided instead of the microphone amplifier 110.

Furthermore, in FIG. 19A, an ADC 200*b* and a DSP 300*c* are configured to be capable of supporting the sound signals of the plurality of channels output from the K microphone amplifiers $\mathbf{111}_1$, $\mathbf{111}_2$, . . . , and $\mathbf{111}_K$, unlike the ADC 200 and the DSP 300*a* illustrated in FIG. 3A.

Figure 19B:
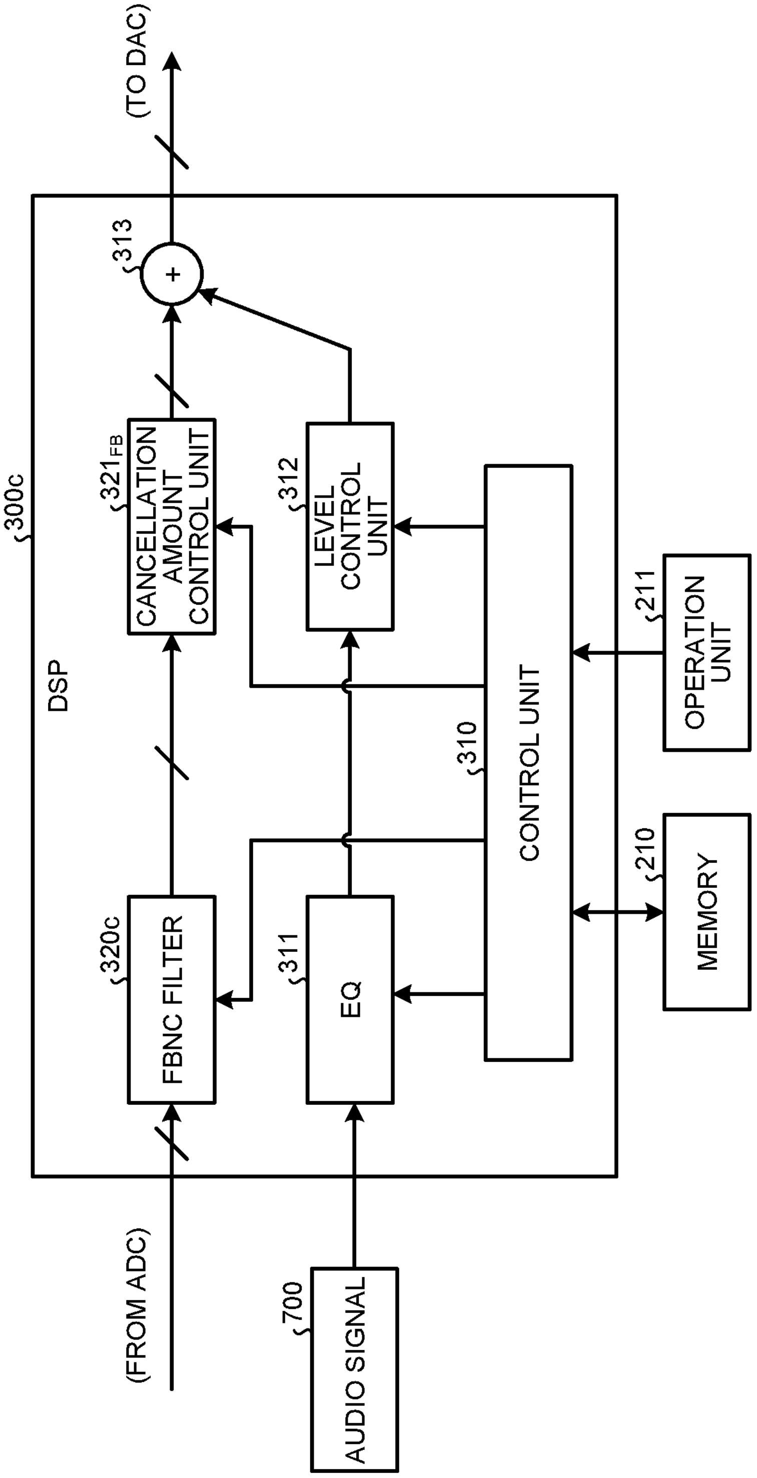
FIG. 19B is a functional block diagram of an example for explaining functions of a DSP according to the third embodiment.

FIG. 19B is a functional block diagram of an example for explaining the functions of the DSP 300*c* according to the third embodiment. In FIG. 19B, an FBNC filter 320*c* includes the functions of (K×L) FBNC filters corresponding to the plurality of microphone amplifiers $\mathbf{111}_1$, $\mathbf{111}_2$, . . . , and $\mathbf{111}_K$ and the L drivers $\mathbf{140}_1$, $\mathbf{140}_2$, . . . , and $\mathbf{140}_L$ illustrated in FIG. 19A to output L noise canceling signals corresponding to the drivers $\mathbf{140}_1$, $\mathbf{140}_2$, . . . , and $\mathbf{140}_L$. A cancellation amount control unit $\mathbf{321}_{FB}$ includes a function of adjusting the cancellation amount for each of the L noise canceling signals.

The headphone 54 generate the noise canceling signal by the FBNC filters corresponding to the FB microphones $\mathbf{101}_1$, $\mathbf{101}_2$, . . . , and $\mathbf{102}_K$ and the drivers $\mathbf{140}_1$, $\mathbf{140}_2$, . . . , and $\mathbf{140}_L$ in the FBNC filter 320*c* based on the sound signals output from the FB microphones $\mathbf{101}_1$, $\mathbf{101}_2$, . . . , and $\mathbf{101}_K$. By reproducing the generated noise canceling signals by the drivers $\mathbf{140}_1$, $\mathbf{140}_2$, . . . , and $\mathbf{140}_L$, noise canceling by the FB method is realized.

Figure 20:
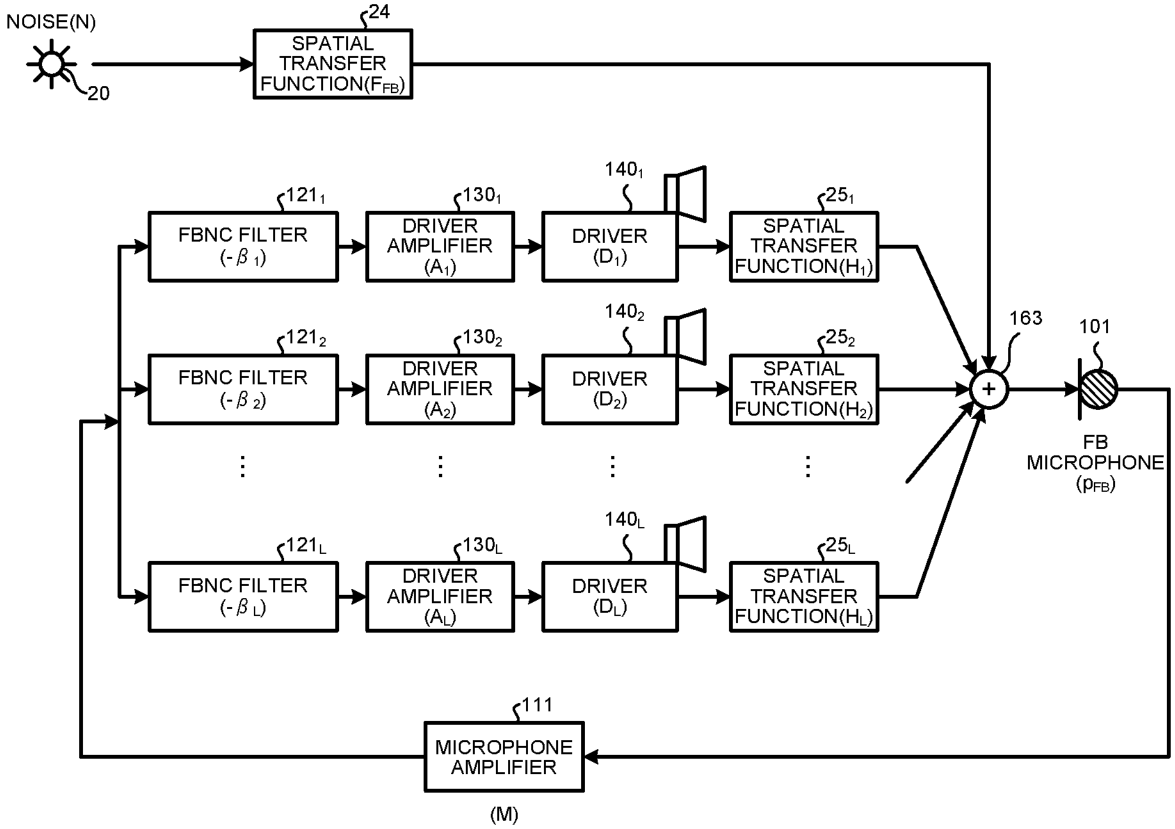
FIG. 20 is a diagram illustrating a configuration of an acoustic output device according to the third embodiment using a transfer function.

FIG. 20 is a diagram illustrating a configuration of an acoustic output device according to the third embodiment using a transfer function. For the sake of explanation, FIG. 20 illustrates an example in which one FB microphone 101 is used (K=1). Furthermore, FIG. 20 illustrates one of the left and right configurations of the headphone 54. The configuration illustrated in FIG. 20 is a configuration in which the configurations of the FBNC filter 121, the driver amplifier 130, the driver 140, and the space 25 in the configuration according to the existing technology illustrated in FIG. 17 are connected in parallel by the number of drivers $\mathbf{140}_1$, $\mathbf{140}_2$, . . . , and $\mathbf{140}_L$.

In FIG. 20, the noise canceling sounds obtained by reproducing the noise canceling signals by the drivers $\mathbf{140}_1$, $\mathbf{140}_2$, . . . , and $\mathbf{140}_L$ reach an addition unit 163 in the housing 520 via the spaces $\mathbf{25}_1$, $\mathbf{25}_2$, . . . , and $\mathbf{25}_L$ of the spatial transfer functions $H_1$, $H_2$, . . . , and $H_L$, respectively. Furthermore, the noise 20 leaks into the housing 520 via the space 24 of the spatial transfer function $F_{FB}$ and reaches the addition unit 163 as leakage noise. The noise canceling sounds obtained by reproducing the noise canceling signals by the drivers $\mathbf{140}_1$, $\mathbf{140}_2$, . . . , and $\mathbf{140}_L$ and the leakage noise are synthesized, and the sound in which the leakage noise is canceled is collected by the FB microphone 101.

The output of the FB microphone 101 is passed to the FBNC filters $\mathbf{121}_1$, $\mathbf{121}_2$, . . . , and $\mathbf{121}_L$ having the filter coefficients $-\beta_1$, $-\beta_2$, . . . , and $-\beta_L$, respectively. The FBNC filters $\mathbf{121}_1$, $\mathbf{121}_2$, . . . , and $\mathbf{121}_L$ are implemented by the FBNC filter 320*c* of FIG. 19B.

In FIG. 20, the FBNC filters $\mathbf{121}_1$, $\mathbf{121}_2$, . . . , and $\mathbf{121}_L$ generates L noise canceling signals corresponding to the drivers $\mathbf{140}_1$, $\mathbf{140}_2$, . . . , and $\mathbf{140}_L$ based on the output of the FB microphone 101. The L noise canceling signals are amplified by the corresponding driver amplifiers $\mathbf{130}_1$, $\mathbf{130}_2$, . . . , and $\mathbf{130}_L$, and reproduced by the drivers $\mathbf{140}_1$, $\mathbf{140}_2$, . . . , and $\mathbf{140}_L$ respectively.

In the noise canceling of the FB method, the sound pressure $p_{FB}$ at the position of the FB microphone 101 may be reduced. The following Expression (6) is obtained based on the configuration of FIG. 20.

$$p_{FB} = NF_{FB} - p_{FB}M\left(\sum_{l=1}^{L}\beta_l A_l D_l H_l\right) \tag{6}$$

When Expression (6) is transformed, the following Expression (7) is obtained.

$$p_{FB} = \frac{NF_{FB}}{1 + M\left(\sum_{l=1}^{L}\beta_l A_l D_l H_l\right)} \tag{7}$$

In Expression (7), by designing the filter coefficients $\beta_1$, $\beta_2$, . . . , $\beta_L$ of the FBNC filters $\mathbf{121}_1$, $\mathbf{121}_2$, . . . , $\mathbf{121}_L$ so that the value on the denominator side increases, the sound pressure $p_{FB}$ at the position of the FB microphone 101 approaches 0, and the effect of noise canceling can be further enhanced. Note that the filter coefficients $\beta_1$, $\beta_2$, . . . , and $\beta_L$ need to be designed with attention to howling and the like.

Expression (7) according to the single microphone/multi-driver FB method is compared with Expression (5) according to the single microphone/single-driver FB method described above. In this case, in the multi-driver Expression (7), the filter coefficients $\beta_1$, $\beta_2$, . . . , and $\beta_L$ corresponding to the drivers $\mathbf{140}_1$, $\mathbf{140}_2$, . . . , and $\mathbf{140}_L$, respectively, contribute to the denominator side by the sum of products, so that the denominator side can be increased, and the canceling performance is improved.

Figure 21:
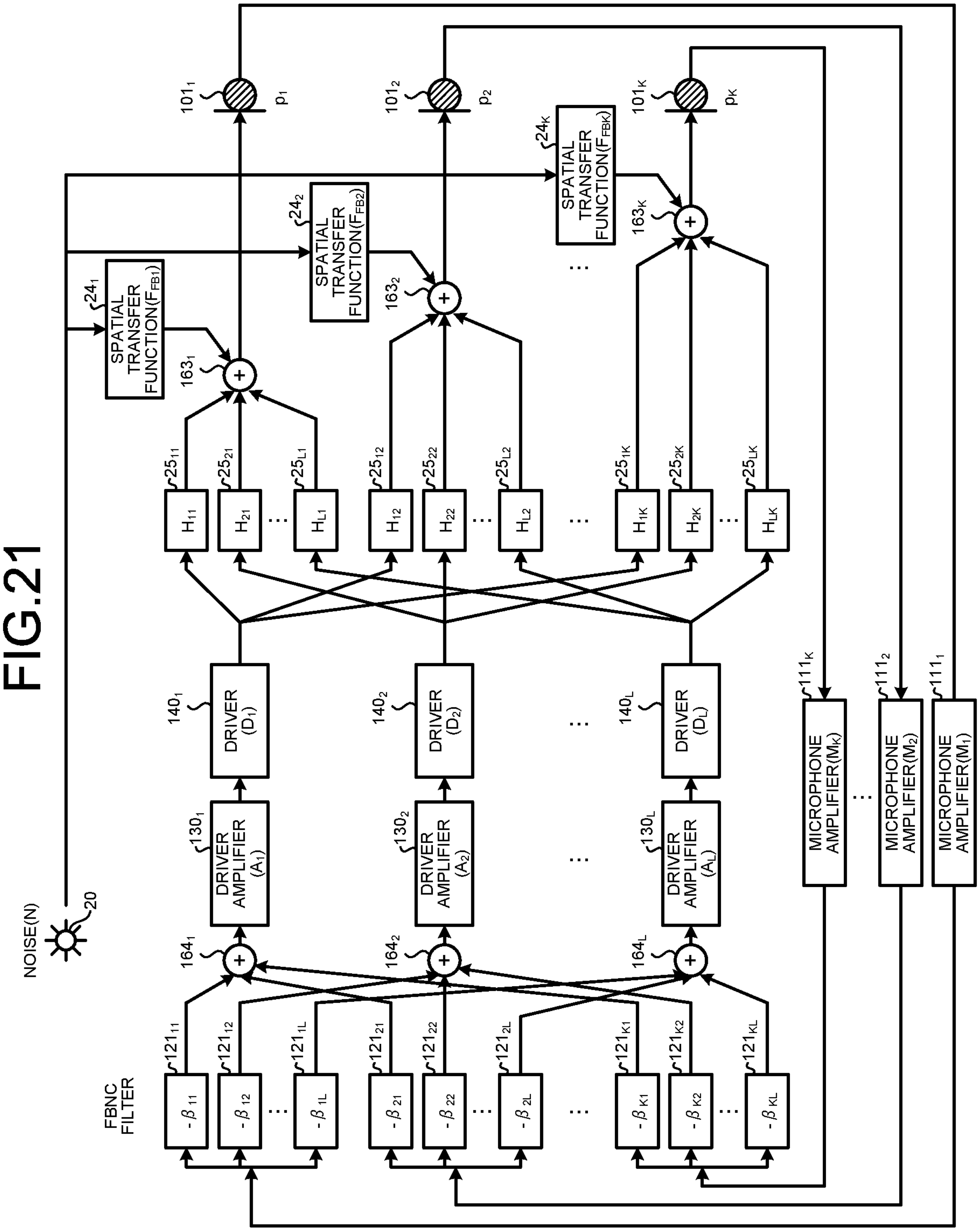
FIG. 21 is a diagram illustrating a configuration of an acoustic output device according to the third embodiment using a transfer function.

FIG. 21 is a diagram illustrating a configuration of an acoustic output device according to the third embodiment using a transfer function. The configuration of FIG. 21 illustrates an example in a case where K FB microphones $\mathbf{101}_1$, $\mathbf{101}_2$, . . . , and $\mathbf{101}_K$ are included as illustrated in the cross-sectional view of the appearance of the headphone 54 illustrated in FIG. 18. In the example of FIG. 21, K FB microphones $\mathbf{101}_1$ to $\mathbf{101}_K$ and L drivers $\mathbf{140}_1$ to $\mathbf{140}_L$ are provided in the housing 520. The sound pressures in the FB microphone $\mathbf{101}_1$ to $\mathbf{101}_K$ are set to sound pressures $p_1$, $p_2$, . . . , and $p_K$, respectively.

In FIG. 21, the output of the FB microphone $\mathbf{101}_1$ is input to the FBNC filters $\mathbf{121}_{11}$, $\mathbf{121}_{12}$, . . . , and $\mathbf{121}_{1L}$ having the filter coefficients $-\beta_{11}$, $-\beta_{12}$, . . . , and $-\beta_{1L}$, respectively, via the microphone amplifier $\mathbf{111}_1$. The output of the FB microphone $\mathbf{101}_2$ is input to the FBNC filters $\mathbf{121}_{21}$, $\mathbf{121}_{22}$, . . . , and $\mathbf{121}_{2L}$ having the filter coefficients $-\beta_{21}$, $-\beta_{22}$, . . . , and $-\beta_{2L}$, respectively, via the microphone amplifier $\mathbf{111}_2$. Thereafter, similarly, the outputs of the FB microphone $\mathbf{101}_K$ are input to the FBNC filters $\mathbf{121}_{K1}$, $\mathbf{121}_{K2}$, . . . , and $\mathbf{121}_{KL}$, having the filter coefficients $-\beta_{K1}$, $-\beta_{K2}$, . . . , and $-\beta_{KL}$, respectively, via the microphone amplifier $\mathbf{111}_K$.

The FBNC filters $\mathbf{121}_{11}$ to $\mathbf{121}_{KL}$ are implemented by the FBNC filter 320*c* of FIG. 19B.

In FIG. 21, the noise canceling signals output from the FBNC filters $\mathbf{121}_{11}$, $\mathbf{121}_{21}$, . . . , and $\mathbf{121}_{K1}$ are added by an adder $\mathbf{164}_1$ and combined into one noise canceling signal. The synthesized noise canceling signal output from the adder $\mathbf{164}_1$ is amplified by the driver amplifier $\mathbf{130}_1$ and reproduced by the driver $\mathbf{140}_1$.

The noise canceling signals output from the FBNC filters $\mathbf{121}_{12}$, $\mathbf{121}_{22}$, . . . , and $\mathbf{121}_{K2}$ are added by an adder $\mathbf{164}_2$ and combined into one noise canceling signal. The synthesized noise canceling signal output from the adder $\mathbf{164}_2$ is amplified by the driver amplifier $\mathbf{130}_2$ and reproduced by the driver $\mathbf{140}_2$.

Thereafter, similarly, the noise canceling signals output from the FBNC filters $\mathbf{121}_{1L}$, $\mathbf{121}_{2L}$, . . . , and $\mathbf{121}_{KL}$ are added by the adder $\mathbf{164}_L$ and combined into one noise canceling signal. The synthesized noise canceling signal output from the adder $\mathbf{164}_L$ is amplified by the driver amplifier $\mathbf{130}_L$ and reproduced by the driver $\mathbf{140}_L$.

The noise canceling sound reproduced by the driver $\mathbf{140}_1$ arrives at the addition units $\mathbf{163}_1$, $\mathbf{163}_2$, . . . , and $\mathbf{163}_K$ of the housing 520 via the spaces $\mathbf{25}_{11}$, $\mathbf{25}_{12}$, . . . , and $\mathbf{25}_{1K}$ in the housing 520 of the spatial transfer functions $H_{11}$, $H_{12}$, . . . , and $H_{1K}$, respectively.

The noise canceling sound reproduced by the driver $\mathbf{140}_2$ arrives at the addition units $\mathbf{163}_1$, $\mathbf{163}_2$, . . . , and $\mathbf{163}_K$ of the housing 520 via the spaces $\mathbf{25}_{21}$, $\mathbf{25}_{22}$, . . . , and $\mathbf{25}_{2K}$ in the housing 520 of the spatial transfer functions $H_{21}$, $H_{22}$, . . . , and $H_{2K}$, respectively.

Hereinafter, similarly, the noise canceling sound reproduced by the driver $\mathbf{140}_L$ arrives at the addition units $\mathbf{163}_1$, $\mathbf{163}_2$, . . . , and $\mathbf{163}_K$ of the housing 520 via the spaces $\mathbf{25}_{L1}$, $\mathbf{25}_{L2}$, . . . , and $\mathbf{25}_{LK}$ in the housing 520 of the spatial transfer functions $H_{L1}$, $H_{L2}$, . . . , and $H_{LK}$, respectively.

Furthermore, the noise 20 arrives at the addition unit $\mathbf{163}_1$ via the space $\mathbf{24}_1$ of the spatial transfer function $F_{FB1}$. In the addition unit $\mathbf{163}_1$, the noise canceling sounds arriving via the spaces $\mathbf{25}_{11}$, $\mathbf{25}_{21}$, . . . , and $\mathbf{25}_{L1}$ and leakage noise arriving via the space $\mathbf{24}_1$ are synthesized, and the sound canceled by the noise canceling sounds from the leakage noise is collected by the FB microphone $\mathbf{101}_1$.

Furthermore, the noise 20 arrives at the addition unit $\mathbf{163}_2$ via the space $\mathbf{24}_2$ of the spatial transfer function $F_{FB2}$. In the addition unit $\mathbf{163}_2$, the noise canceling sounds arriving via the spaces $\mathbf{25}_{12}$, $\mathbf{25}_{22}$, . . . , and $\mathbf{25}_{L2}$ and leakage noise arriving via the space $\mathbf{24}_2$ are synthesized, and the sound canceled by the noise canceling sounds from the leakage noise is collected by the FB microphone $\mathbf{101}_2$.

Similarly, the noise 20 further arrives at the addition unit $\mathbf{163}_K$ via the space $\mathbf{24}_K$ of the spatial transfer function $F_{FBK}$. In the addition unit $\mathbf{163}_K$, the noise canceling sounds arriving via the spaces $\mathbf{25}_{1K}$, $\mathbf{25}_{2K}$, . . . , and $\mathbf{25}_{LK}$ and leakage noise arriving via the space $\mathbf{24}_K$ are synthesized, and the sound canceled by the noise canceling sounds from the leakage noise is collected by the FB microphone $\mathbf{101}_K$.

In FIG. 21, for example, when attention is paid to the sound pressure $p_1$ at the FB microphone $\mathbf{101}_1$, the following Expression (8) is obtained from respective transfer functions in FIG. 21.

$$\begin{aligned} p_1 = MF_{FB1} &- (p_1M_1\beta_{11} + p_2M_2\beta_{21} + \dots + p_kM_k\beta_{K1})A_1D_1H_{11} - \\ &(p_1M_1\beta_{12} + p_2M_2\beta_{22} + \dots + p_kM_k\beta_{K2})A_2D_2H_{21} \\ &\vdots \\ &-(p_1M_1\beta_{1L} + p_2M_2\beta_{2L} + \dots + p_kM_k\beta_{KL})A_LD_LH_{L1} \end{aligned} \tag{8}$$

Expression (8) is organized into the following Expression (9).

$$\begin{aligned} p_1 = NF_{FB1} - p_1M_1\beta_{11}A_1D_1H_{11} - \left(\sum_{k=2}^{K} p_kM_k\beta_{k1}\right)A_1D_1H_{11} - \\ p_1M_1\beta_{12}A_2D_2H_{21} - \left(\sum_{k=2}^{K} p_kM_k\beta_{k2}\right)A_2D_2H_{21} - \\ p_1M_1\beta_{1L}A_LD_LH_{L1} - \left(\sum_{k=2}^{K} p_KM_k\beta_{kL}\right)A_LD_LH_{L1} \end{aligned} \tag{9}$$

When the left side of Expression (9) is organized by the sound pressure $p_1$, the following Expression (10) is obtained.

$$p_1 + p_1M_1\left(\sum_{l=1}^{L} \beta_{1l}A_lD_lH_{l1}\right) = NF_{FB1} - \sum_{l=1}^{L}\left\{\left(\sum_{k=2}^{K} p_kM_k\beta_{kl}\right)A_lD_lH_{l1}\right\} \tag{10}$$

When the expression (10) is organized by the sound pressure $p_1$, the following expression (11) is obtained.

$$p_1 = \frac{NF_{FB1} - \sum_{l=1}^{L}\left\{\left(\sum_{k=2}^{K} p_kM_k\beta_{kl}\right)A_lD_lH_{l1}\right\}}{1 + M_1\left(\sum_{l=1}^{L} \beta_{1l}A_lD_lH_{l1}\right)} \tag{11}$$

In Expression (11), by designing the FBNC filters $\mathbf{121}_{11}$ to $\mathbf{121}_{1L}$, $\mathbf{121}_{21}$ to $\mathbf{121}_{2L}$, and $\mathbf{121}_{K1}$ to $\mathbf{121}_{KL}$ so that the denominator is large, it is possible to cancel the leakage noise. Expression (11) is different from Expression (7) described above for the multi-driver single type FB method in that the molecular side of Expression (11) is the sum of leakage noise and FB components from FB microphones $\mathbf{101}_2$, . . . , and $\mathbf{101}_K$ other than the FB microphone $\mathbf{101}_1$ of interest.

Note that, although the description has been given focusing on the FB $\mathbf{101}_1$ here for the sake of description, other FB microphones $\mathbf{101}_2$ to $\mathbf{101}_K$ can be similarly derived.

5. Fourth Embodiment

Next, the fourth embodiment of the present disclosure will be described. The fourth embodiment is an example of implementing noise canceling by combining an FF method and an FB method in a multi-microphone/multi-driver noise canceling headphone. Hereinafter, the noise canceling method in which the FF method and the FB method are combined is appropriately referred to as a Dual method.

Figure 22:
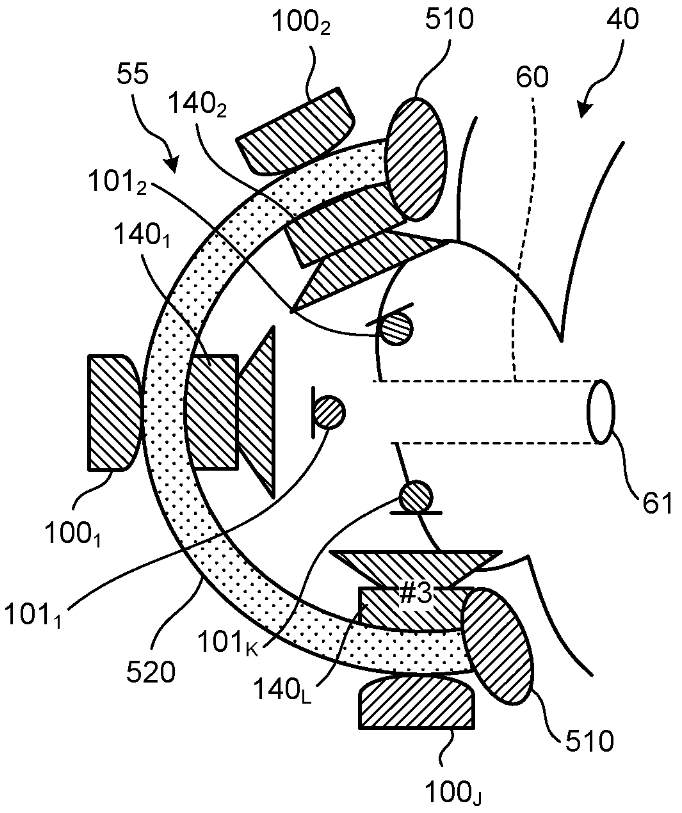
FIG. 22 is a schematic diagram schematically illustrating a vertical cross section of an appearance of an example of a multi-microphone/multi-driver Dual method noise canceling headphone according to the fourth embodiment.

FIG. 22 is a schematic diagram schematically illustrating a vertical cross section of an appearance of an example of a multi-microphone/multi-driver Dual method noise canceling headphone 55 according to the fourth embodiment. Hereinafter, the "multi-microphone/multi-driver Dual method noise canceling headphone 55" will be simply described as the "headphone 55". Note that FIG. 22 illustrates the right housing 520 of the left and right housings of the headphone 55.

As illustrated in FIG. 22, the headphone 55 according to the fourth embodiment have a configuration in which the headphone 53 described with reference to FIG. 12 and the headphone 54 described with reference to FIG. 18 are combined. That is, the headphone 55 is provided with a plurality of drivers $\mathbf{140}_1$, $\mathbf{140}_2$, . . . , and $\mathbf{140}_L$ and a plurality of FB microphones $\mathbf{101}_1$, $\mathbf{101}_2$, . . . , and $\mathbf{101}_K$ used for noise canceling of the FB method in the housing 520. Furthermore, the headphone 55 is provided with a plurality of FF microphones $\mathbf{100}_1$, $\mathbf{100}_2$, . . . , and $\mathbf{100}_J$ used for noise canceling of the FF method toward the outside of the housing 520.

Figure 23A:
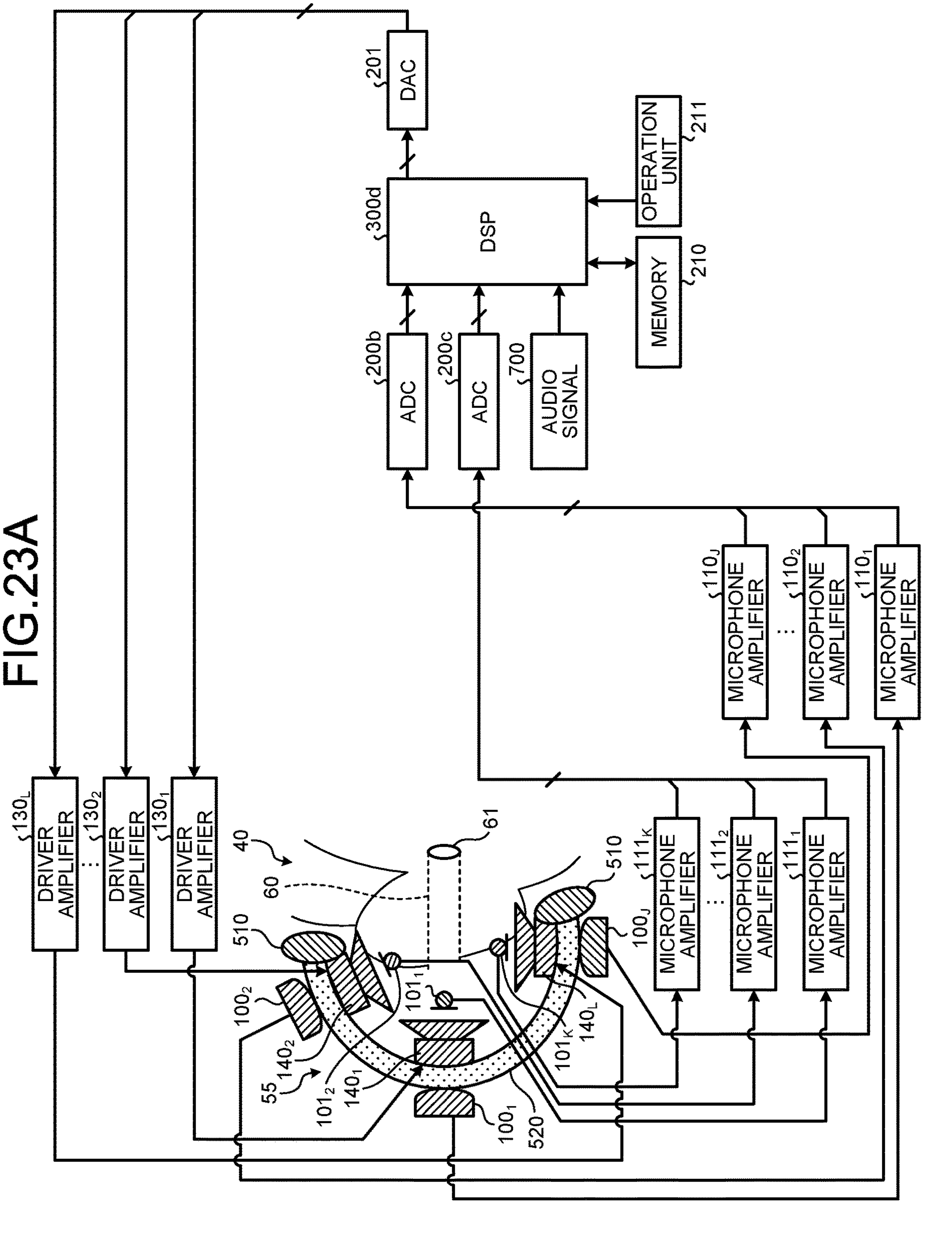
FIG. 23A is a schematic diagram schematically illustrating a configuration of an example of an acoustic output device according to the fourth embodiment.

FIG. 23A is a schematic diagram schematically illustrating a configuration of an example of an acoustic output device according to the fourth embodiment. The configuration illustrated in FIG. 23A is a combination of the above-described configuration in FIG. 13A and the configuration in FIG. 19A.

That is, the outputs of the FF microphones $\mathbf{100}_1$, $\mathbf{100}_2$, . . . , and $\mathbf{100}_J$ are input to the ADC 200*b* via the microphone amplifiers $\mathbf{110}_1$, $\mathbf{110}_2$, . . . , and $\mathbf{110}_J$, respectively. The ADC 200*b* converts the sound signal input from each of the microphone amplifiers $\mathbf{110}_1$, $\mathbf{110}_2$, . . . , and $\mathbf{110}_J$ into a digital sound signal, and supplies the digital sound signal to a DSP 300*d*.

Similarly, the outputs of the FB microphones $\mathbf{101}_1$, $\mathbf{101}_2$, . . . , and $\mathbf{101}_K$ are input to the ADC 200*c* via the microphone amplifiers $\mathbf{111}_1$, $\mathbf{111}_2$, . . . , and $\mathbf{111}_K$, respectively. The ADC 200*c* converts the sound signal input from each of the microphone amplifiers $\mathbf{111}_1$, $\mathbf{111}_2$, . . . , and $\mathbf{111}_K$ into a digital sound signal, and supplies the digital sound signal to the DSP 300*d*.

Figure 23B:
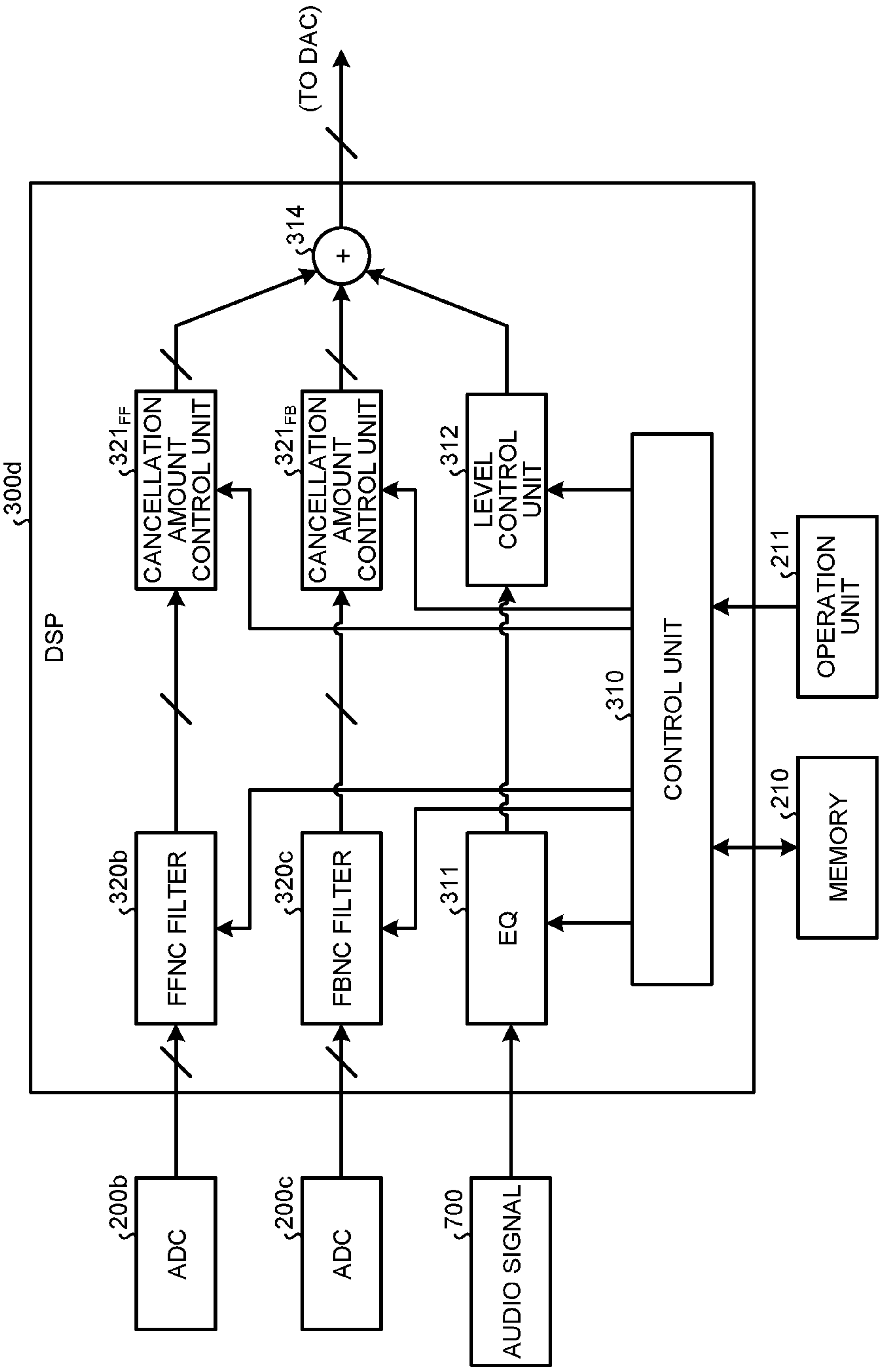
FIG. 23B is a functional block diagram of an example for explaining functions of the DSP according to the fourth embodiment.

FIG. 23B is a functional block diagram of an example for explaining the functions of the DSP 300*d* according to the fourth embodiment. The configuration illustrated in FIG. 23B has a configuration in which the DSP 300*b* illustrated in FIG. 13B and the DSP 300*c* illustrated in FIG. 19B described above are combined. Specifically, the DSP 300*d* includes the FFNC filter 320*b* and the cancellation amount control unit $\mathbf{321}_{FF}$ corresponding to the FF microphones $\mathbf{100}_1$, $\mathbf{100}_2$, . . . , and $\mathbf{100}_J$, and the FBNC filter 320*c* and the cancellation amount control unit $\mathbf{321}_{FB}$ corresponding to the FB microphones $\mathbf{101}_1$, $\mathbf{101}_2$, . . . , and $\mathbf{101}_K$. Each output of the ADC 200*b* is input to the FFNC filter 320*b*. Further, each output of the ADC 200*c* is input to the FBNC filter 320*c*.

Figure 24:
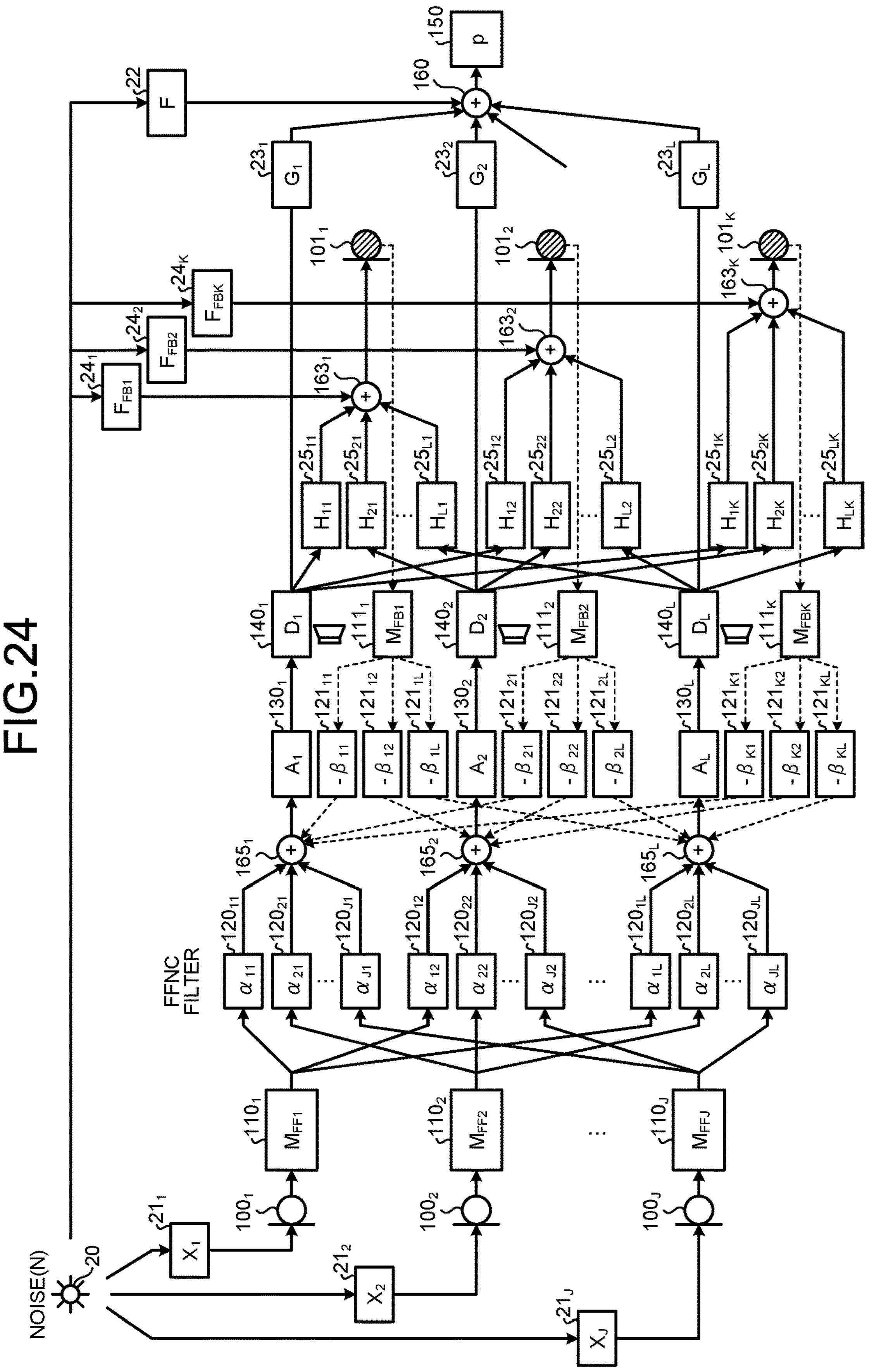
FIG. 24 is a diagram illustrating a configuration of an acoustic output device according to the fourth embodiment using a transfer function.

FIG. 24 is a diagram illustrating a configuration of an acoustic output device according to the fourth embodiment using a transfer function. Noise canceling by the FF method and noise canceling by the FB method can be controlled independently of each other. Therefore, the configuration illustrated in FIG. 24 is a combination of the configuration of FIG. 14 by the multi-microphone/multi-driver FF method noise canceling and the configuration of FIG. 21 by the multi-microphone/multi-driver FB method noise canceling described above. Note that, in FIG. 24, the transfer function of the j-th (1≤j≤J) FF microphone $\mathbf{100}_j$ and the microphone amplifier $\mathbf{110}_j$ is ($M_{FFj}$), and the transfer function of the k-th (1≤k≤K) FB microphone $\mathbf{101}_k$ and the microphone amplifier $\mathbf{111}_k$ is ($M_{FBk}$).

First, a configuration related to noise canceling of the FF method in FIG. 24 will be described. The headphone 55 include a set of the FF microphone $\mathbf{100}_1$ and the microphone amplifier $\mathbf{110}_1$, a set of the FF microphone $\mathbf{100}_2$ and the microphone amplifier $\mathbf{110}_2$, . . . , and a set of the FF microphone $\mathbf{100}_J$, and the microphone amplifier $\mathbf{110}_J$, which are transfer functions $M_{FF1}$, $M_{FF2}$, . . . , and $M_{FFJ}$, respectively. The noise 20 is collected by the FF microphones $\mathbf{100}_1$, $\mathbf{100}_2$, . . . , and $\mathbf{100}_J$ via the spaces $\mathbf{21}_1$, $\mathbf{21}_2$, . . . , and $\mathbf{21}_J$, which are the spatial transfer functions $X_1$, $X_2$, . . . , and $X_J$, respectively, and is output from the microphone amplifiers $\mathbf{110}_1$, $\mathbf{110}_2$, . . . , and $\mathbf{110}_J$.

The output of the microphone amplifier $\mathbf{110}_1$ is input to the FFNCs $\mathbf{120}_{11}$, $\mathbf{120}_{12}$, . . . , and $\mathbf{120}_{1L}$. Each of the FFNCs $\mathbf{120}_{11}$, $\mathbf{120}_{12}$, . . . , and $\mathbf{120}_{1L}$ generates a noise canceling signal based on the output of the microphone amplifier $\mathbf{110}_1$, and inputs the generated noise canceling signal to each of the adders $\mathbf{165}_1$, $\mathbf{165}_2$, . . . , and $\mathbf{165}_L$.

The output of the microphone amplifier $\mathbf{110}_2$ is input to the FFNCs $\mathbf{120}_{21}$, $\mathbf{120}_{22}$, . . . , and $\mathbf{120}_{2L}$. Each of the FFNCs $\mathbf{120}_{21}$, $\mathbf{120}_{22}$, . . . , and $\mathbf{120}_{2L}$ generates a noise canceling signal based on the output of the microphone amplifier $\mathbf{110}_2$, and inputs the generated noise canceling signal to each of the adders $\mathbf{165}_1$, $\mathbf{165}_2$, . . . , and $\mathbf{165}_L$.

Similarly, the output of the microphone amplifier $\mathbf{110}_J$ is input to FFNCs $\mathbf{120}_{J1}$, $\mathbf{120}_{J2}$, . . . , and $\mathbf{120}_{JL}$. Each of the FFNCs $\mathbf{120}_{J1}$, $\mathbf{120}_{J2}$, . . . , and $\mathbf{120}_{JL}$ generates a noise canceling signal based on the output of the microphone amplifier $\mathbf{110}_J$, and inputs the generated noise canceling signal to each of the adders $\mathbf{165}_1$, $\mathbf{165}_2$, . . . , and $\mathbf{165}_L$.

Next, a configuration related to noise canceling of the FB method will be described. The headphone 55 include a set of the FB microphone $\mathbf{101}_1$ and the microphone amplifier $\mathbf{111}_1$, a set of the FB microphone $\mathbf{101}_2$ and the microphone amplifier $\mathbf{111}_2$, . . . , and a set of the FB microphone $\mathbf{101}_K$, and the microphone amplifier $\mathbf{111}_K$, which are transfer functions $M_{FB1}$, $M_{FB2}$, . . . , and $M_{FBK}$, respectively. The FB microphones $\mathbf{101}_1$, $\mathbf{101}_2$, . . . , and $\mathbf{101}_K$ collects outputs of the addition units $\mathbf{163}_1$, $\mathbf{163}_2$, . . . , and $\mathbf{163}_K$, respectively, and the collected sound signal is output from each of the microphone amplifiers $\mathbf{111}_1$, $\mathbf{111}_2$, . . . , and $\mathbf{111}_K$.

The output of the microphone amplifier $\mathbf{111}_1$ is input to the FBNC filters $\mathbf{121}_{11}$, $\mathbf{121}_{12}$, . . . , and $\mathbf{121}_{1L}$. The output of the microphone amplifier $\mathbf{111}_2$ is input to the FBNC filters $\mathbf{121}_{21}$, $\mathbf{121}_{22}$, . . . , and $\mathbf{121}_{2L}$. Thereafter, similarly, the output of the microphone amplifier $\mathbf{111}_K$ is input to the FBNC filters $\mathbf{121}_{K1}$, $\mathbf{121}_{K2}$, . . . , and $\mathbf{121}_{KL}$.

The respective noise canceling signals output from the FBNC filters $\mathbf{121}_{11}$, $\mathbf{121}_{21}$, . . . , and $\mathbf{121}_{K1}$ are input to the adder $\mathbf{165}_1$. The adder $\mathbf{165}_1$ synthesizes the respective noise canceling signals output from the FFNC filters $\mathbf{120}_{11}$, $\mathbf{120}_{21}$, . . . , and $\mathbf{120}_{J1}$ with the respective noise canceling signals output from the FBNC filters $\mathbf{121}_{11}$, $\mathbf{121}_{21}$, . . . , and $\mathbf{121}_{K1}$. The synthesized noise canceling signal output from the adder $\mathbf{165}_1$ is amplified by the driver amplifier $\mathbf{130}_1$ and reproduced by the driver $\mathbf{140}_1$.

The respective noise canceling signals output from the FBNC filters $\mathbf{121}_{12}$, $\mathbf{121}_{22}$, . . . , and $\mathbf{121}_{K2}$ are input to the adder $\mathbf{165}_2$. The adder $\mathbf{165}_2$ synthesizes the respective noise canceling signals output from the FFNC filters $\mathbf{120}_{12}$, $\mathbf{120}_{22}$, . . . , and $\mathbf{120}_{J2}$ with the respective noise canceling signals output from the FBNC filters $\mathbf{121}_{12}$, $\mathbf{121}_{22}$, . . . , and $\mathbf{121}_{K2}$. The synthesized noise canceling signal output from the adder $\mathbf{165}_2$ is amplified by the driver amplifier $\mathbf{130}_2$ and reproduced by the driver $\mathbf{140}_2$.

Thereafter, similarly, the respective noise canceling signals output from the FBNC filters $\mathbf{121}_{1L}$, $\mathbf{121}_{2L}$, . . . , and $\mathbf{121}_{KL}$ are input to the adder $\mathbf{165}_L$. The adder $\mathbf{165}_L$ synthesizes the respective noise canceling signals output from the FFNC filters $\mathbf{120}_{1L}$, $\mathbf{120}_{2L}$, . . . , and $\mathbf{120}_{JL}$ with the respective noise canceling signals output from the FBNC filters $\mathbf{121}_{1L}$, $\mathbf{121}_{2L}$, . . . , and $\mathbf{121}_{KL}$. The synthesized noise canceling signal output from the adder $\mathbf{165}_L$ is amplified by the driver amplifier $\mathbf{130}_L$ and reproduced by the driver $\mathbf{140}_L$.

The noise canceling sound reproduced by the driver $\mathbf{140}_1$ arrives at the addition units $\mathbf{163}_1$, $\mathbf{163}_2$, . . . , and $\mathbf{163}_K$ in the housing 520 via the spaces $\mathbf{25}_{11}$, $\mathbf{25}_{12}$, . . . , and $\mathbf{25}_{1K}$ in the housing 520, respectively. The noise canceling sound reproduced by the driver $\mathbf{140}_2$ arrives at the addition units $\mathbf{163}_1$, $\mathbf{163}_2$, . . . , and $\mathbf{163}_K$ of the housing 520 via the spaces $\mathbf{25}_{21}$, $\mathbf{25}_{22}$, . . . , and $\mathbf{25}_{2K}$ in the housing 520, respectively. Hereinafter, similarly, the noise canceling sound reproduced by the driver $\mathbf{140}_L$ arrives at the addition units $\mathbf{163}_1$, $\mathbf{163}_2$, . . . , and $\mathbf{163}_K$ in the housing 520 via the spaces $\mathbf{25}_{L1}$, $\mathbf{25}_{L2}$, . . . , and $\mathbf{25}_{LK}$ in the respective housings 520.

Furthermore, noise 20 arrives at the addition units $\mathbf{163}_1$, $\mathbf{163}_2$, . . . , and $\mathbf{163}_K$ via spaces $\mathbf{24}_1$, $\mathbf{24}_2$, . . . , and $\mathbf{24}_K$, respectively.

In the addition unit $\mathbf{163}_1$, the noise canceling sounds arriving via the spaces $\mathbf{25}_{11}$, $\mathbf{25}_{21}$, . . . , and $\mathbf{25}_{L1}$ and leakage noise arriving via the space $\mathbf{24}_1$ are synthesized, and the sound canceled by the noise canceling sounds from the leakage noise is collected by the FB microphone $\mathbf{101}_1$.

In the addition unit $\mathbf{163}_2$, the noise canceling sounds arriving via the spaces $\mathbf{25}_{12}$, $\mathbf{25}_{22}$, . . . , and $\mathbf{25}_{L2}$ and leakage noise arriving via the space $\mathbf{24}_2$ are synthesized, and the sound canceled by the noise canceling sounds from the leakage noise is collected by the FB microphone $\mathbf{101}_2$.

Thereafter, in a similar manner, in the addition unit $\mathbf{163}_K$, the noise canceling sounds arriving via the spaces $\mathbf{25}_{1K}$, $\mathbf{25}_{2K}$, . . . , and $\mathbf{25}_{LK}$ and the leakage noise arriving via the space $\mathbf{24}_K$ are synthesized, and the sound canceled by the noise canceling sounds from the leakage noise is collected by the FB microphone $\mathbf{101}_K$.

Furthermore, the noise canceling sounds by the noise canceling of the FF method reproduced by the drivers $\mathbf{140}_1$, $\mathbf{140}_2$, . . . , and $\mathbf{140}_L$ arrives at the addition unit 160 in the housing 520 via the spaces $\mathbf{23}_1$, $\mathbf{23}_2$, and $\mathbf{23}_L$ in the housing 520, respectively. The noise canceling sound of the FF method is synthesized by the addition unit 160 to be one noise canceling sound, and reaches the position of the eardrum 61 of the user as the sound pressure 150 of the sound pressure (p).

According to the configuration of the fourth embodiment, the residual noise in the housing 520 that has not been canceled by the noise canceling of the FF method can be canceled by the noise canceling of the FB method. Therefore, the noise canceling performance can be further improved as compared with a case where one of the noise canceling of the multi-microphone/multi-driver FF method and the noise canceling of the multi-microphone/multi-driver FB method is performed.

6. Fifth Embodiment

Next, the fifth embodiment of the present disclosure will be described. In the fifth embodiment, it is possible to reproduce 3D (3-Dimension) audio content with realistic feeling using the headphone in which a plurality of drivers 140 is provided in the housing 520.

As one of the realistic 3D audio content, there is a content by object-based sound. In the object-based sound, one or a plurality of audio signals serving as a sound material is regarded as one sound source (referred to as an object sound source), and meta information is added to the object sound source. Examples of the meta information added to the object sound source include positional information.

For example, the object sound source including the positional information as the meta information decodes the meta information to be added and reproduces the decoded meta information by the speaker system corresponding to the object-based sound, so that the sound image by the object sound source can be localized at the position based on the positional information or the localization of the sound image can be moved on the time axis. As a result, it is possible to express a realistic sound.

In the headphone provided with the plurality of drivers 140 in the housing 520, by reproducing the object sound source, the 3D audio content sound source, and the like from respective drivers 140, the user wearing the headphone can enjoy a realistic acoustic experience.

Figure 25A:
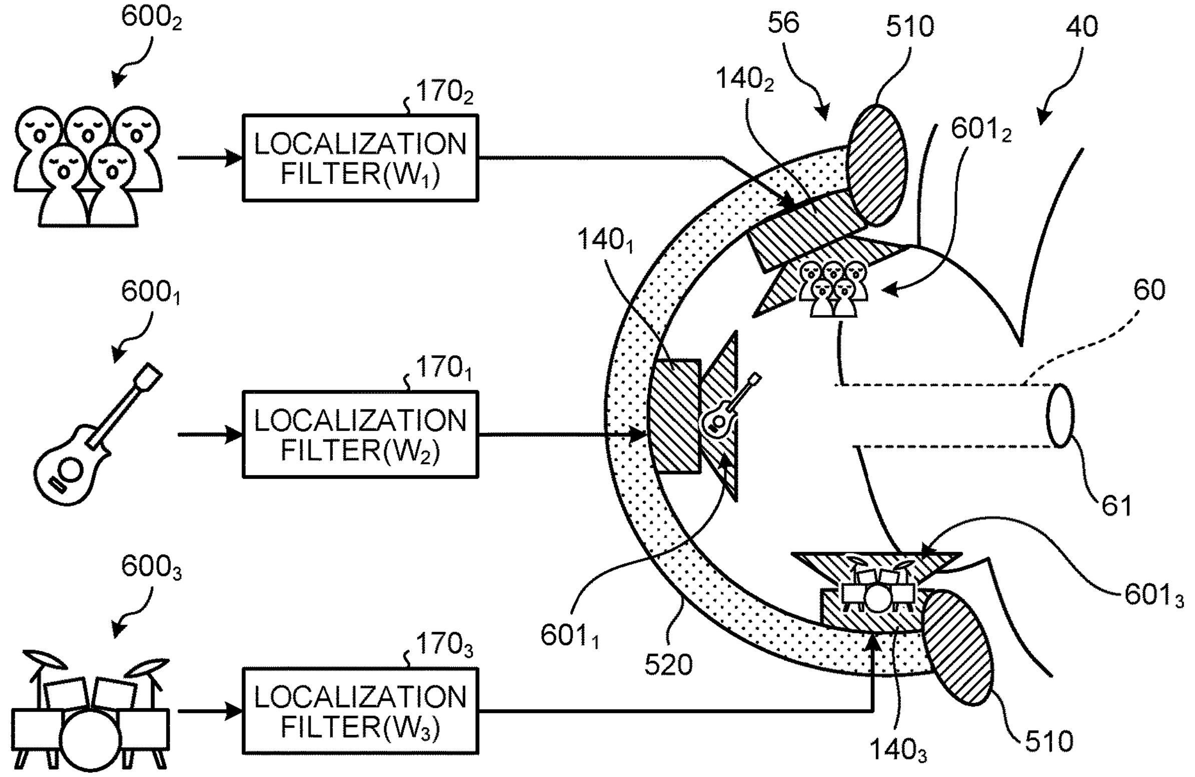
FIG. 25A is a schematic diagram for explaining reproduction of an object sound source according to the fifth embodiment.

FIG. 25A is a schematic diagram for describing reproduction of an object sound source according to the fifth embodiment. In FIG. 25A, a headphone 56 is provided with a plurality of (three in this example) drivers 140$_1$, 140$_2$, and 140$_3$ in the housing 520. More specifically, the driver 140$_1$ is provided substantially at the center of the housing 520, the driver 140$_2$ is provided on the upper side of the housing 520, and the driver 140$_3$ is provided on the lower side of the housing 520.

For example, positional information is added to each of object sound sources 600$_1$, 600$_2$, and 600$_3$ as meta information. For example, the object sound sources 600$_1$, 600$_2$, and 600$_3$ are input to a localization filter 170$_1$ with a filter coefficient $W_1$, a localization filter 170$_2$ with a filter coefficient $W_2$, and a localization filter 170$_3$ with a filter coefficient $W_3$, such as an equalizer (EQ).

For example, the localization filter 170$_1$ decodes the meta information added to the input object sound source 600$_1$, and extracts the positional information included in the meta information. The localization filter 170$_1$ outputs the object sound source 600$_1$ to the driver 140$_1$ with which the extracted positional information is associated, for example. As a result, the reproduction sound 601$_1$ obtained by reproducing the object sound source 600$_1$ is output from the driver 140$_1$.

The same applies to the localization filters 170$_2$ and 170$_3$. That is, the localization filters 170$_2$ and 170$_3$ decode the input object sound sources 600$_2$ and 600$_3$, respectively, and extract the positional information included in the meta information. The localization filters 170$_2$ and 170$_3$ output the object sound sources 600$_2$ and 600$_3$ to the drivers 140$_2$ and 140$_3$, respectively, with which the extracted positional information is associated with, for example. As a result, the reproduction sounds 601$_2$ and 601$_3$ obtained by reproducing the object sound sources 600$_2$ and 600$_3$ are output from the drivers 140$_2$ and 140$_3$, respectively.

As described above, by appropriately allocating the object sound sources 600$_1$ to 600$_3$ to the drivers 140$_1$ to 140$_3$, respectively, provided in the housing 520 based on the meta information, for example, the object sound sources 600$_1$ to 600$_3$ can reproduce the reproduction sound 601$_1$ to 601$_3$ having realistic feeling, respectively.

In the above description, it is described that the localization of each object sound source 600$_1$ to 600$_3$ at the time of reproduction is fixed, but this is not limited to this example. For example, it is also possible to move the localization of the reproduction sounds 601$_1$ to 601$_3$ by the object sound sources 600$_1$ to 600$_3$ at the time of reproduction of the object sound source 600$_1$ to 600$_3$, respectively. In this case, for example, it is conceivable to include the movement information in the meta information added to each of the object sound sources 600$_1$ to 600$_3$.

Figure 25B:
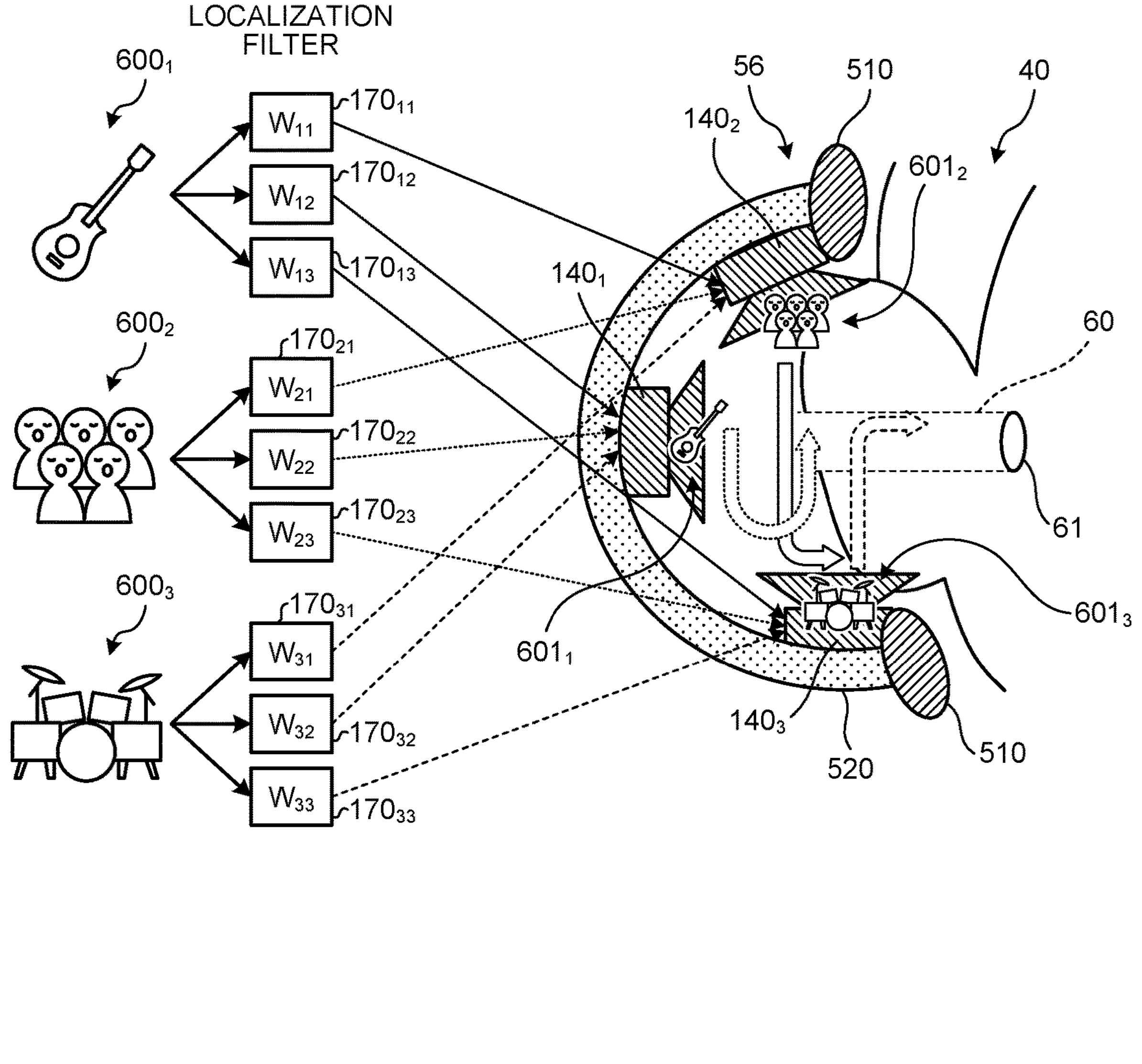
FIG. 25B is a schematic diagram schematically illustrating a state in which localization of a reproduction sound is moved at the time of reproducing an object sound source according to the fifth embodiment.

FIG. 25B is a schematic diagram schematically illustrating a state in which the localization of the reproduction sound is moved at the time of reproducing the object sound source according to the fifth embodiment. In this example, the object sound sources 600$_1$, 600$_2$, and 600$_3$ are reproduced from all the drivers 140$_1$, 140$_2$, and 140$_3$, and processing is performed by a filter that gives a delay or amplitude. As a result, the movement of the reproduction sounds 601$_1$, 601$_2$, and 601$_3$ of the object sound sources 600$_1$, 600$_2$, and 600$_3$ is realized.

In FIG. 25B, the object sound source 600$_1$ is input to localization filters 170$_{11}$, 170$_{12}$, and 170$_{13}$ with filter coefficients $W_{11}$, $W_{12}$, and $W_{13}$, respectively. The object sound source 600$_2$ is input to localization filters 170$_{21}$, 170$_{22}$ and 170$_{23}$ with filter coefficients $W_{21}$, $W_{22}$ and $W_{23}$, respectively. Similarly, the object sound source 600$_3$ is input to localization filters 170$_{31}$, 170$_{32}$, and 170$_{33}$ with filter coefficients $W_{31}$, $W_{32}$, and $W_{33}$, respectively.

Each of the localization filters 170$_{11}$ to 170$_{13}$ decodes the input meta information of the object sound source 600$_1$ and extracts the positional information and the movement information. The localization filters 170$_{11}$ to 170$_{13}$ determines allocation of levels and delays to the drivers 140$_1$, 140$_2$, and 140$_3$ of the object sound source 600$_1$, respectively, based on the extracted positional information and movement information. As a result, the reproduction sound 601$_1$ of the object sound source 600$_1$ can be moved in the housing 520.

The same applies to the localization filters 170$_{21}$ to 170$_{23}$ and the localization filters 170$_{31}$ to 170$_{33}$. The localization filters 170$_{21}$ to 170$_{23}$ and the localization filters 170$_{31}$ to 170$_{33}$ decode the input meta information of the object sound sources 600$_2$ and 600$_3$, respectively, extract the positional information and the movement information, and determine the allocation of the levels and the delays to the drivers 140$_1$, 140$_2$, and 140$_3$ of the object sound sources 600$_2$ and 600$_3$ based on the extracted positional information and movement information. As a result, as in the above, the reproduction sound 601$_2$ of the object sound source 600$_2$ and the reproduction sound 601$_3$ of the object sound source 600$_3$ can be moved in the housing 520.

As described above, by using the headphone 56 having the plurality of drivers 140$_1$ to 140$_3$ in the housing 520 and outputting the object sound sources 600$_1$ to 600$_3$ to the drivers 140$_1$ to 140$_3$ through the localization filters 170$_{11}$ to 170$_{33}$, respectively, it is possible to provide the user with an experience that the sound image is moving.

Figure 26A:
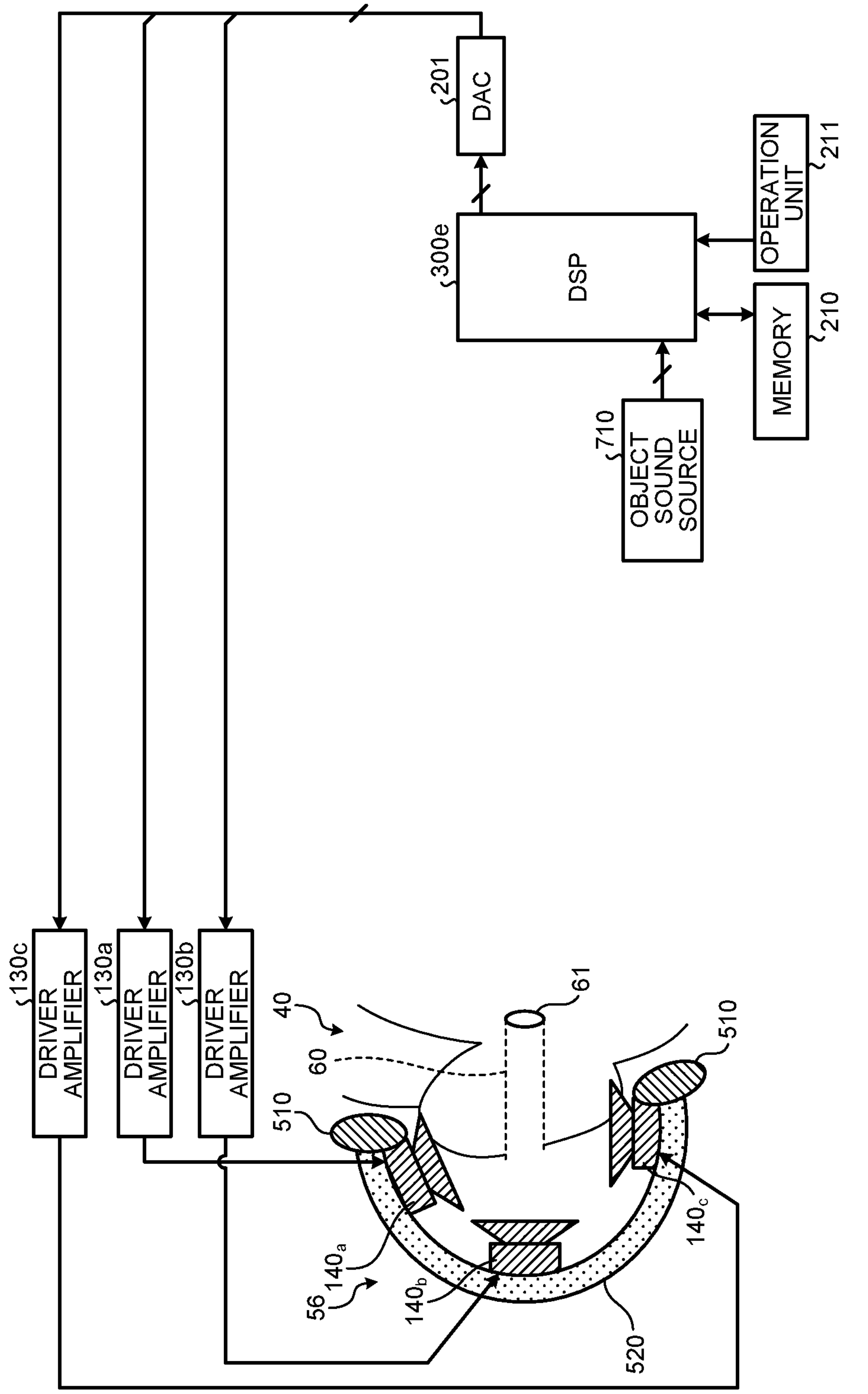
FIG. 26A is a schematic diagram schematically illustrating a configuration of an example of an acoustic output device according to the fifth embodiment.

FIG. 26A is a schematic diagram schematically illustrating a configuration of an example of an acoustic output device according to the fifth embodiment. In the example of FIG. 25A, the acoustic output device includes a headphone 56, driver amplifiers 130*a*, 130*b*, and 130*c*, a DAC 201, a memory 210, an operation unit $\mathbf{21}_1$, and a DSP 300e. The object sound source 710 corresponding to the object sound sources $\mathbf{600}_1$ to $\mathbf{600}_3$ or the like described above is input to the DSP 300e.

Figure 26B:
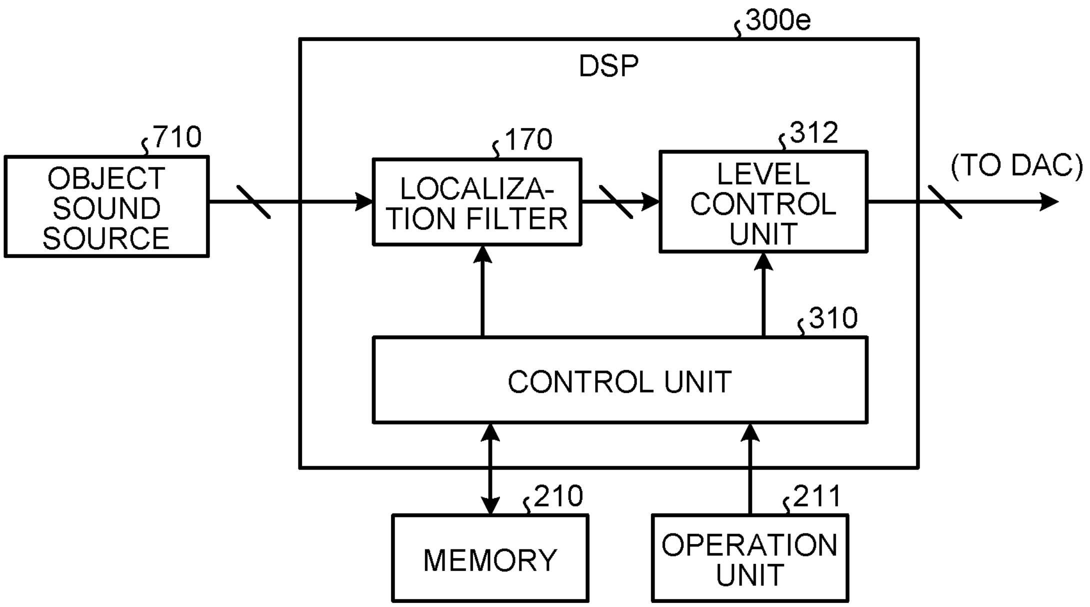
FIG. 26B is a functional block diagram of an example for explaining functions of the DSP according to the fifth embodiment.

FIG. 26B is a functional block diagram of an example for explaining the functions of the DSP 300e according to the fifth embodiment. In FIG. 26B, the DSP 300e includes a localization filter 170, a level control unit 312, and a control unit 310. The localization filter 170 realizes, for example, the localization filters $\mathbf{170}_{11}$ to $\mathbf{170}_{33}$ illustrated in FIG. 25B. The object sound source 710 input to the DSP 300e is passed to the localization filter 170. The localization filter 170 decodes the object sound source 710, and sets the localization of the object sound source 710, for example, based on the meta information added to the object sound source 710.

The localization filter 170 generates an output signal (audio signal) to be supplied to each of the drivers 140a, 140b, and 140c according to the set localization, and passes the generated output signal to the level control unit 312. The level control unit 312 adjusts the level of the output signal supplied to each of the drivers 140a, 140b, and 140c in accordance with, for example, an instruction from the control unit 310 according to a user operation on the operation unit 211. The output signals whose levels have been adjusted are supplied to the drivers 140a, 140b, and 140c, and reproduced as reproduction sounds.

Figure 27:
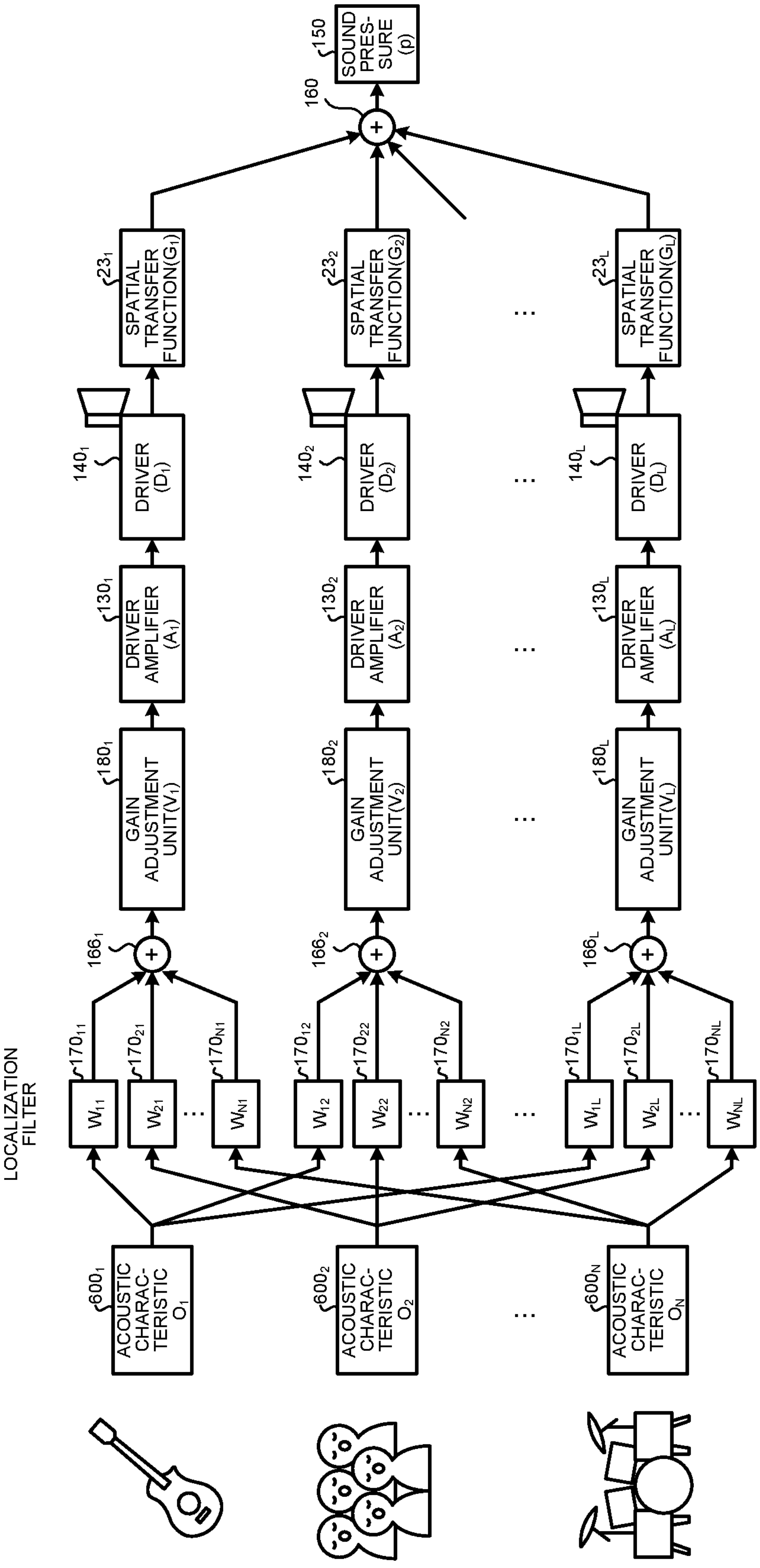
FIG. 27 is a diagram illustrating a configuration of an acoustic output device according to the fifth embodiment using a transfer function.

FIG. 27 is a diagram illustrating a configuration of an acoustic output device according to the fifth embodiment using a transfer function. It is assumed that the object sound sources $\mathbf{600}_1$, $\mathbf{600}_2$, . . . , and $\mathbf{600}_N$ have transfer functions $O_1$, $O_2$, . . . , and $O_N$, respectively, as acoustic characteristics.

The object sound sources $\mathbf{600}_1$, $\mathbf{600}_2$, . . . , and $\mathbf{600}_N$ are input to the localization filter $\mathbf{170}_{11}$ to $\mathbf{170}_{N1}$, the localization filter $\mathbf{170}_{12}$ to $\mathbf{170}_{N2}$, and the localization filters $\mathbf{170}_{1L}$ to $\mathbf{170}_{NL}$ corresponding to the drivers $\mathbf{140}_1$, $\mathbf{140}_2$, . . . , and $\mathbf{140}_L$, respectively. Specifically, the object sound source $\mathbf{600}_1$ is input to the localization filters $\mathbf{170}_{11}$, $\mathbf{170}_{12}$, and $\mathbf{170}_{1L}$. The object sound source $\mathbf{600}_2$ is input to the localization filters $\mathbf{170}_{21}$, $\mathbf{170}_{22}$, and $\mathbf{170}_{2L}$. Similarly thereafter, the object sound source $\mathbf{600}_N$ is input to the localization filters $\mathbf{170}_{N1}$, $\mathbf{170}_{N2}$, and $\mathbf{170}_{NL}$.

The outputs of the localization filters $\mathbf{170}_{11}$ to $\mathbf{170}_{N1}$ are synthesized by an adder $\mathbf{166}_1$, input to the driver amplifier $\mathbf{130}_1$ after the gain is adjusted by a gain adjustment unit $\mathbf{180}_1$ having the transfer function $V_1$, and reproduced from the driver $\mathbf{140}_1$. The outputs of the localization filters $\mathbf{170}_{12}$ to $\mathbf{170}_{N2}$ are synthesized by an adder $\mathbf{166}_2$, input to the driver amplifier $\mathbf{130}_2$ after the gain is adjusted by the gain adjustment unit $\mathbf{180}_2$ having the transfer function $V_2$, and reproduced from the driver $\mathbf{140}_2$. Thereafter, similarly, the outputs of the localization filters $\mathbf{170}_{1L}$ to $\mathbf{170}_{NL}$ are synthesized by the adder $\mathbf{166}_L$, input to the driver amplifier $\mathbf{130}_L$ after the gain is adjusted by the gain adjustment unit $\mathbf{180}_L$ having the transfer function $V_L$, and reproduced from the driver $\mathbf{140}_L$.

The reproduction sounds reproduced by the drivers $\mathbf{140}_1$, $\mathbf{140}_2$, . . . , and $\mathbf{140}_L$ are synthesized by the addition unit 160 in the housing 520 via the spaces $\mathbf{23}_1$, $\mathbf{23}_2$, . . . , and $\mathbf{23}_L$ in the housing 520 having the spatial transfer functions $G_1$, $G_2$, . . . , and $G_L$, respectively, and reach the position of the eardrum 61 as the sound pressure 150 of the sound pressure (p).

As described above, in the fifth embodiment, since the plurality of drivers $\mathbf{140}_1$, $\mathbf{140}_2$, . . . , and $\mathbf{140}_L$ is provided on the housing 520, the degree of freedom of the localization filter 170 is increased, so that sound image localization is facilitated.

(6-1. Modification of Fifth Embodiment)

Figure 28A:
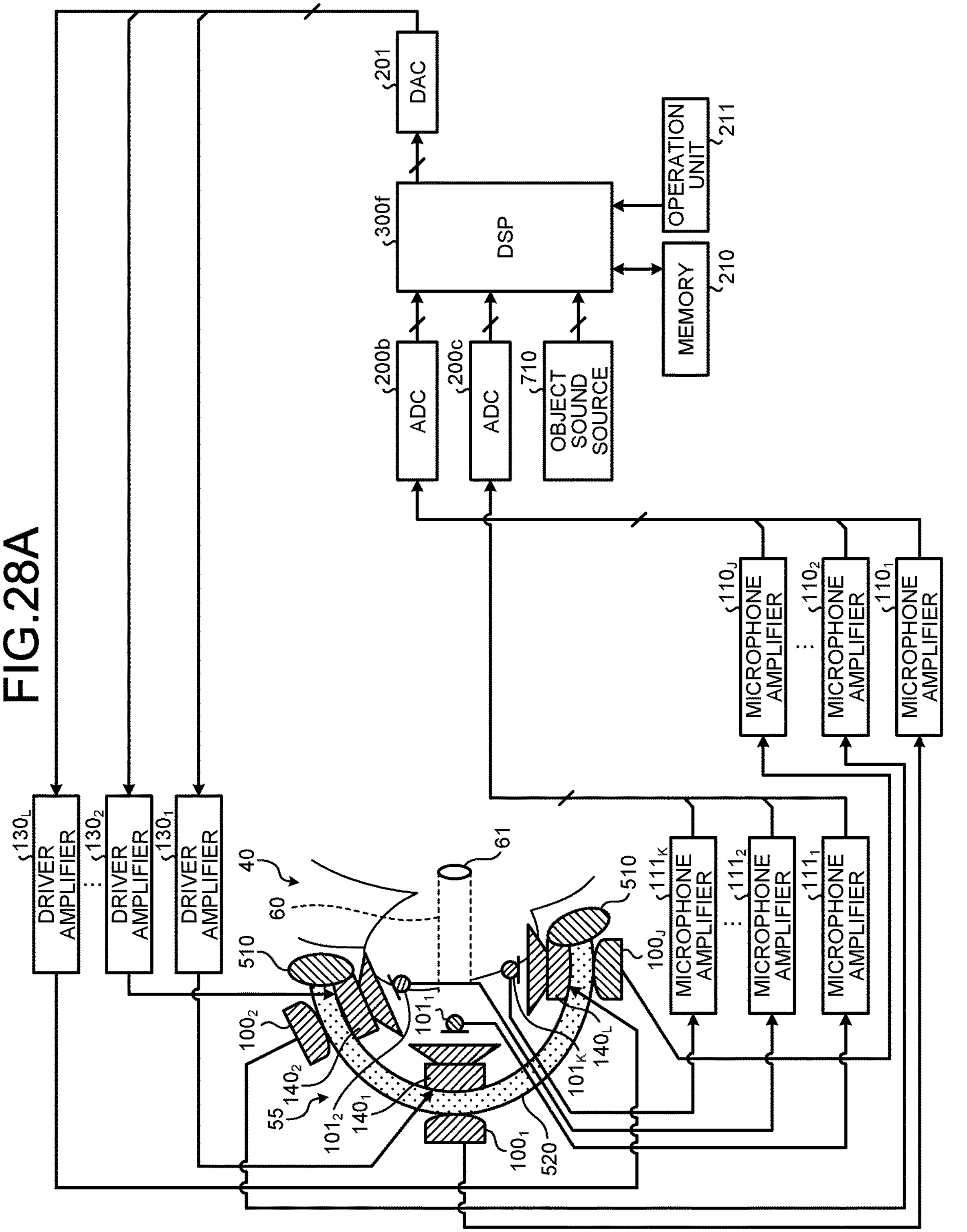
FIG. 28A is a schematic diagram schematically illustrating a configuration of an example of an acoustic output device according to a modification of the fifth embodiment.

It is possible to combine a configuration for performing noise canceling with the configuration for reproducing the object sound source according to the fifth embodiment described above. FIG. 28A is a schematic diagram schematically illustrating a configuration of an example of an acoustic output device according to a modification of the fifth embodiment.

The configuration illustrated in FIG. 28A incorporates a function of reproducing the object sound source 710 into the configuration illustrated in FIG. 23A described above. In this case, the DSP 300d illustrated in FIG. 23A is replaced with a DSP 300f corresponding to the processing of the object sound source, and the object sound source 710 is input to the DSP 300f instead of the audio signal 700 in FIG. 23A. Since the configuration same as that of FIG. 23A can be applied to the other configurations, the description thereof is omitted here.

Figure 28B:
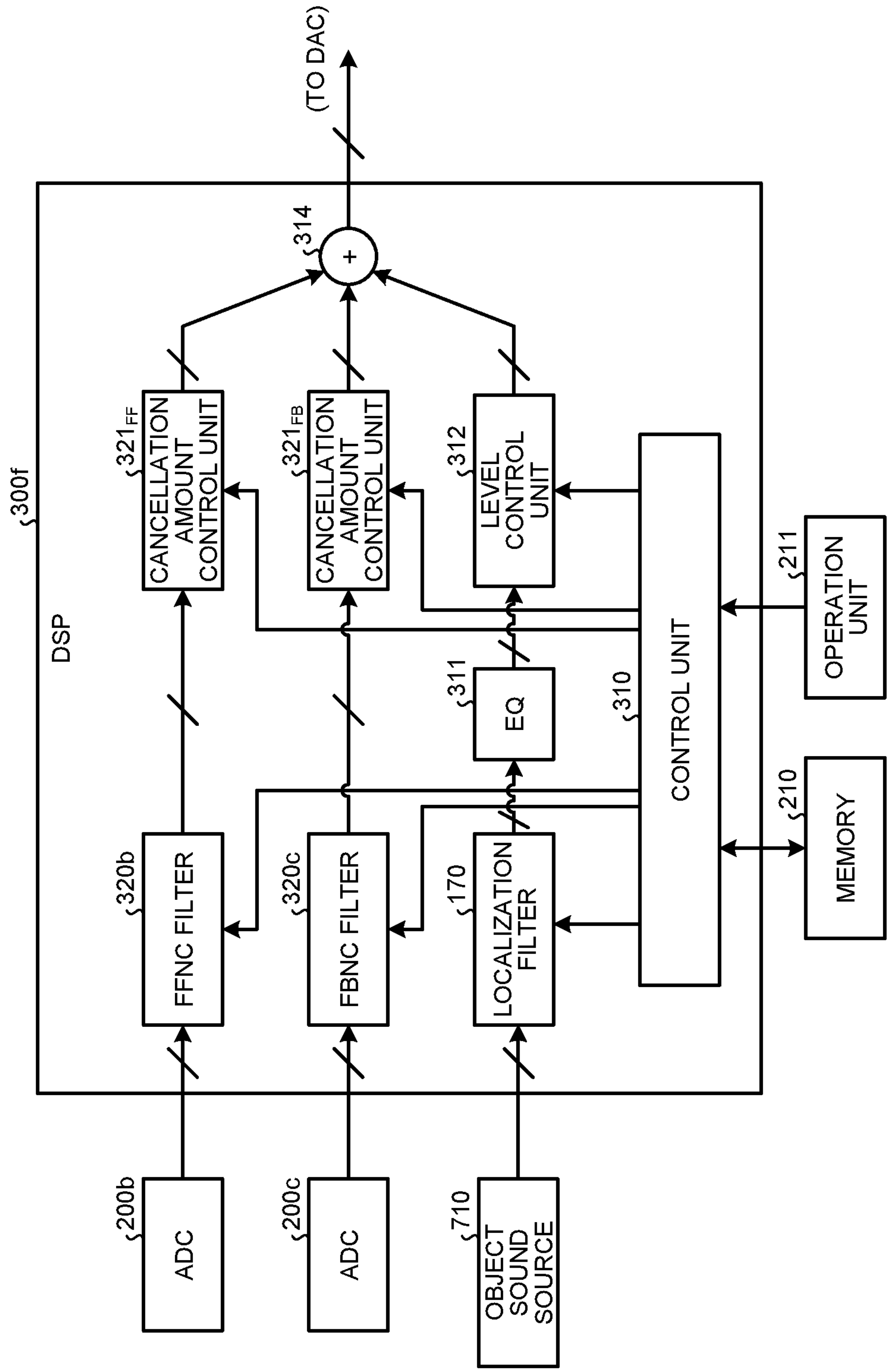
FIG. 28B is a functional block diagram of an example for explaining functions of the DSP according to a modification of the fifth embodiment.

FIG. 28B is a functional block diagram of an example for explaining functions of the DSP 300f according to a modification of the fifth embodiment. The DSP 300f illustrated in FIG. 28B is different from the DSP 300d illustrated in FIG. 23B in that the localization filter 170 is added. The object sound source 710 input to the DSP 300f is input to the localization filter 170, and the localization when being reproduced by the drivers $\mathbf{140}_1$ to $\mathbf{140}_L$ is set based on the meta information added to the object sound source 710. At this time, the localization filter 170 can also adjust the set localization, for example, in accordance with an instruction from the control unit 310 according to a user operation on the operation unit 211.

The object sound source 710 whose localization has been set by the localization filter 170 is passed to an adder 314 via the EQ 311 and the level control unit 312. The adder 314 synthesizes the noise canceling signal generated by the FFNC filter 320b, the noise canceling signal generated by the FBNC filter 320c, and the object sound source 710 whose localization passed from the level control unit 312 is set to output them.

The output of the adder 314 is converted into a digital sound signal corresponding to each of the drivers $\mathbf{140}_1$ to $\mathbf{140}_L$ by the DAC 201, and is supplied to each of the drivers $\mathbf{140}_1$ to $\mathbf{140}_L$ via the driver amplifiers $\mathbf{130}_1$ to $\mathbf{130}_L$, respectively. Each driver $\mathbf{140}_1$ to $\mathbf{140}_L$ can cancel the external noise by reproducing the object sound source 710 and the noise canceling sound.

As a result, the user wearing the headphone 55 can enjoy a highly realistic acoustic experience while performing noise canceling even outdoors.

7. Sixth Embodiment

Next, the sixth embodiment of the present disclosure will be described. In the sixth embodiment, a plurality of FF microphones $\mathbf{100}_1$, $\mathbf{100}_2$, . . . , and $\mathbf{100}_J$ provided on the housing 520 is used to collect noise coming from a specific direction and reproduce the collected noise with the specific direction as localization.

For example, a scene in which a vehicle approaches a user from behind the user in a state where the user wears the headphone to which the technology described in Patent Literature 2 is applied outdoors is considered. At this time, in a beamforming process using a plurality of FF microphones disposed on the outer portion of the housing, for example, noise of a vehicle approaching the user from behind is selectively collected and reproduced from a headphone driver, and noise from other directions is canceled, so that it is possible to call attention to the user.

At this time, in Patent Literature 2, the number of drivers that reproduce the sound signal is one for each of the L and R channels, and these drivers are disposed near the sides of the ears of the user wearing the headphone. Therefore, for example, it is difficult for the user to completely determine that the vehicle approaches the user from behind even when the noise of the vehicle approaching the user from behind is collected and reproduced from the driver as described above.

In the sixth embodiment, since the plurality of FF microphones 100$_1$ to 100$_J$ is provided in each of the left and right housings 520, it is possible to perform beamforming to enhance sound (noise) collected from a specific direction. Furthermore, since the plurality of drivers 140$_1$ to 140$_L$ is provided in each of the left and right housings 520, the collected sound is reproduced from a driver located in the direction corresponding to the direction from which the sound (noise) has arrived among the drivers 140$_1$ to 140$_L$ or all of the drivers 140$_1$ to 140$_L$ are driven by a signal process to reproduce the wavefront from which the sound (noise) has arrived. As a result, the user can determine the direction from which the sound (noise) has arrived.

It can be considered that the collected sound is a sound reproduced from the driver located in the direction corresponding to the direction from which the sound (noise) arrives, or the sound due to the wavefront from which the sound arrives is an acoustic control sound for controlling the sound in the housing 520, and the sound signal for reproducing the sound is an acoustic control signal for reproducing the acoustic control sound by the driver.

Figure 29:
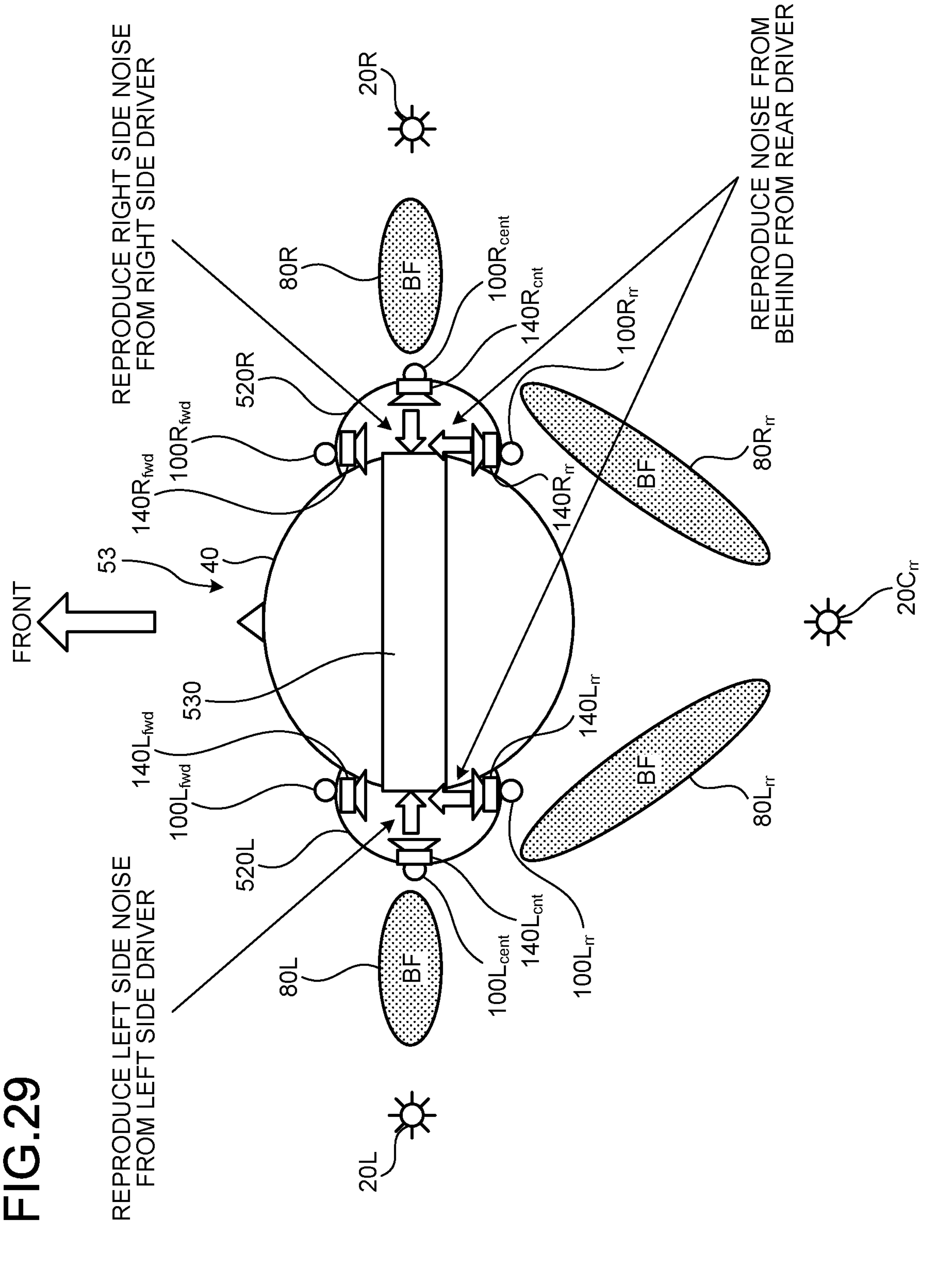
FIG. 29 is a schematic diagram for explaining reproduction control according to the sixth embodiment.

FIG. 29 is a schematic diagram for explaining reproduction control according to the sixth embodiment. Note that, in the figure, the horizontal cross-section of an appearance of the left and right housings 520L and 520R of the headphone 53 is schematically illustrated by taking the multi-microphone/multi-driver FF method noise canceling headphone 53 (headphone 53) according to the second embodiment as an example.

The headphone 53 illustrated in FIG. 29 has a configuration in which the left housing 520L and the right housing 520R are connected by a headband 530. Note that, in the figure, the direction indicated by a white arrow is a front of the user (head 40) wearing the headphone 53.

The housing 520L includes three drivers of drivers 140L$_{cnt}$, 140L$_{fwd}$, and 140L$_{rr}$ disposed on the center portion, the front portion, and the rear portion, respectively. In addition, the housing 520L includes three FF microphones of FF microphones 100L$_{cent}$, 100L$_{fwd}$, and 100L$_{rr}$ disposed on the center portion, the front portion, and the rear portion, respectively, toward the outside.

Similarly, the housing 520R includes three drivers of drivers 140R$_{cnt}$, 140R$_{fwd}$, and 140R$_{rr}$ disposed on the center portion, the front portion, and the rear portion, respectively. In addition, the housing 520R includes three FF microphones of FF microphones 100R$_{cent}$, 100R$_{fwd}$, and 100R$_{rr}$ disposed on the center portion, the front portion, and the rear portion, respectively, toward the outside.

The headphone 53 detect the incoming direction of the noise using a known beamforming technique based on outputs of the FF microphones 100L$_{cent}$, 100L$_{fwd}$, and 100L$_{rr}$ and the FF microphones 100R$_{cent}$, 100R$_{fwd}$, and 100R$_{rr}$ disposed in the left and right housings 520L and 520R, respectively. The headphone 53 reproduces the collected noise from a driver located in the direction corresponding to the incoming direction of the detected noise among the drivers 140L$_{cnt}$, 140L$_{fwd}$, and 140L$_{rr}$, and the drivers 140R$_{cnt}$, 140R$_{fwd}$, and 140R$_{rr}$ disposed in the left and right housings 520L and 520R, respectively.

In the example of FIG. 29, when detecting the noise 20L arriving from the left side by, for example, beamforming (BF) 80L, the headphone 53 reproduces the noise 20L collected by the beamforming 80L by the driver 140L$_{cnt}$ disposed in the direction corresponding to the incoming direction of the noise 20L. Similarly, when detecting the noise 20R arriving from the right side by beamforming 80R, the headphone 53 reproduces the noise 20R collected by the beamforming 80R by the driver 140R$_{cnt}$ disposed in the direction corresponding to the incoming direction of the noise 20R.

In addition, when detecting the noise 20C$_{rr}$ arriving from behind by beamforming 80L$_{rr}$ and beamforming 80R$_{rr}$, the headphone 53 reproduces the noise 20C$_{rr}$ collected by the beamforming 80L$_{rr}$ and the beamforming 80R$_{rr}$ by the drivers 140L$_{rr}$ and 140R$_{rr}$ disposed in the direction corresponding to the incoming direction of the noise 20C$_{rr}$. At this time, it is preferable to control the localization of the noise 20C$_{rr}$ reproduced by the drivers 140L$_{rr}$ and 140R$_{rr}$ according to the position of the noise 20C$_{rr}$ obtained by the beamforming 80L$_{rr}$ and the beamforming 80R$_{rr}$, for example.

As a result, it is possible for the driver to reproduce and regenerate the noise coming from the side to from behind, which is the blind spot, while canceling the noise from the front with the visual information of the user. Therefore, for example, the user wearing the headphone 53 according to the sixth embodiment can easily determine that the vehicle approaches the user from behind, and it is possible to ensure the safety of the user when the user uses the headphone 53 outdoors, and the problem in Patent Literature 2 can be solved.

Note that the noise 20C$_{rr}$ collected by the beamforming 80L$_{rr}$ and the beamforming 80R$_{rr}$ is noise generated behind the user, that is, in a direction that is a blind spot for the user. For example, the beamforming 80L$_{rr}$ and the beamforming 80R$_{rr}$ in which noise generated in a direction that is a blind spot for the user is collected may be referred to as blind spot BF (beamforming).

Figure 30A:
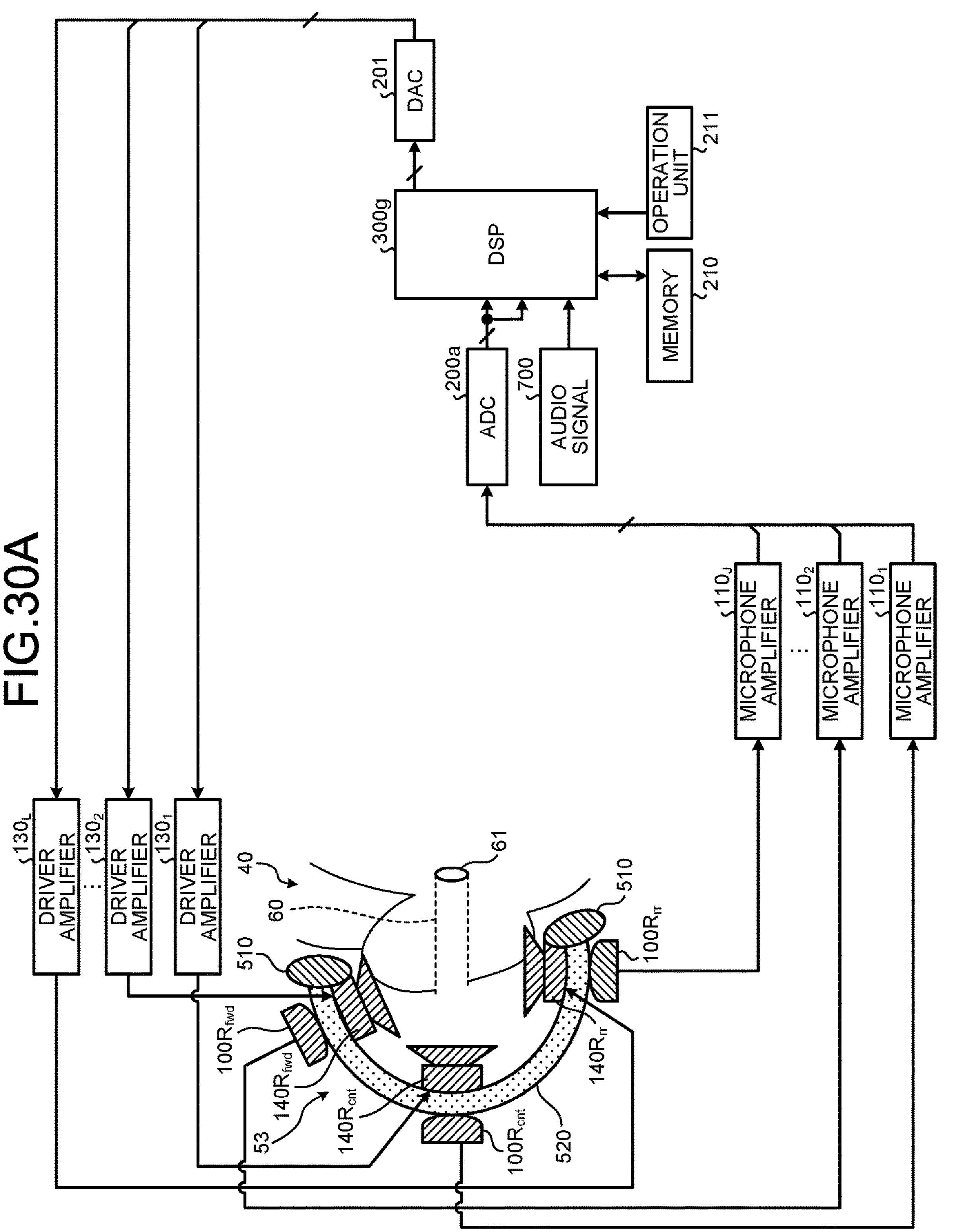
FIG. 30A is a schematic diagram schematically illustrating a configuration of an example of an acoustic output device according to the sixth embodiment.

FIG. 30A is a schematic diagram schematically illustrating a configuration of an example of an acoustic output device according to the sixth embodiment. The configuration illustrated in FIG. 30A is different from the configuration illustrated in FIG. 13A in that the function of a DSP 300*g* corresponds to beamforming and that the output of the ADC 200*a* is branched and input to the DSP 300*g*. The other configurations are similar to the configurations described with reference to FIG. 13A, and thus the description thereof is omitted here.

Here, the housing 520 illustrated in FIG. 30A indicates the housing 520R out of the left and right housings 520L and 520R illustrated in FIG. 29, for example. Similarly, the FF microphones 100$_1$, 100$_2$, and 100$_J$ correspond to the FF microphones 100R$_{cent}$, 100R$_{fwd}$, and 100R$_{rr}$ in FIG. 29, respectively, and the drivers 140$_1$, 140$_2$, and 140$_L$ correspond to the drivers 140R$_{cnt}$, 140R$_{fwd}$, and 140R$_{rr}$ in FIG. 29, respectively.

Note that the ADC 200*a* receives sound signals based on sounds collected by the FF microphones 100L$_{cent}$, 100L$_{fwd}$, and 100L$_{rr}$ and the FF microphones 100R$_{cent}$, 100R$_{fwd}$, and 100R$_{rr}$ provided on the left and right housings 520L and 520R, respectively.

Figure 30B:
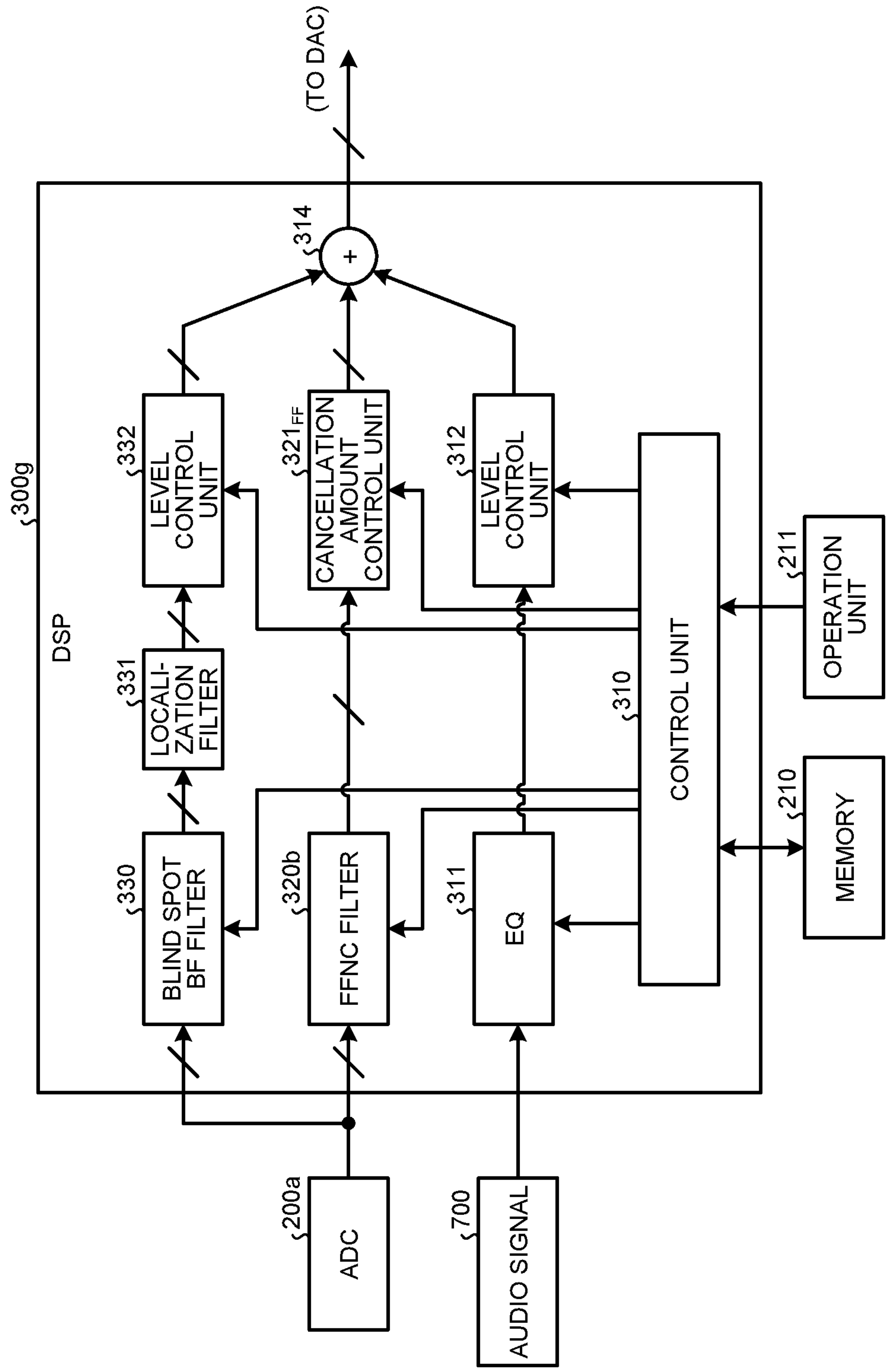
FIG. 30B is a functional block diagram of an example for explaining functions of the DSP according to the sixth embodiment.

FIG. 30B is a functional block diagram of an example for explaining the functions of the DSP 300*g* according to the sixth embodiment. The configuration illustrated in FIG. 30B is different from the configuration illustrated in FIG. 13B described above in that a blind spot beamforming (BF) filter 330, a localization filter 331, and a level control unit 332 are added.

The output of the ADC 200*a* is input to the FFNC filter 320*b* and the blind spot BF filter 330. Since the process after the output of the ADC 200*a* is input to the FFNC filter 320*b* and the process on the audio signal 700 are similar to the processes described with reference to FIG. 13B, the description thereof is omitted here.

The blind spot BF filter 330 performs beamforming based on sound signals based on sounds collected by the FF microphones 100$L_{cent}$, 100$L_{fwd}$, and 100$L_{rr}$ and the FF microphones 100$R_{cent}$, 100$R_{fwd}$, and 100$R_{rr}$ input from the ADC 200*a*, and detects noise coming from a direction (from behind, from right side, etc.) that is a blind spot of the user wearing the headphone 53. The blind spot BF filter 330 generates a sound signal (referred to as a noise enhancement signal) for outputting detected noise from a driver disposed at a position corresponding to a direction from which the noise arrives among the drivers 140$L_{cnt}$ and 140$L_{fwd}$ and the driver 140$L_{rr}$, and the drivers 140$R_{cnt}$ and 140$R_{fwd}$ and the driver 140$R_{rr}$.

The noise enhancement signal output from the blind spot BF filter 330 is input to the localization filter 331. The localization filter 331 has a function (such as localization adjustment) for allowing the user to naturally hear the noise enhancement signal generated by the blind spot BF filter 330. The level control unit 332 controls the level of the noise enhancement signal output from the localization filter 331, for example, by an instruction from the control unit 310 according to a user operation on the operation unit 211. The noise enhancement signal output from the level control unit 332 is input to the adder 314, synthesized with the noise canceling signal and the audio signal 700, to output to the DAC 201.

Note that the range determined as the blind spot by the blind spot BF filter 330 may be set by the user. For example, the blind spot BF filter 330 sets a range to be determined as a blind spot in accordance with an instruction from the control unit 310 according to a user operation on the operation unit 211. The setting range of the blind spot can be set in any direction as long as a plurality of FF microphones is disposed outward on each of the housings 520L and 520R of the headphone 53. In a case where the blind spot BF is set not only in the blind spot direction but also in all directions, it is possible to provide the user with a natural external sound as if the user is not wearing headphone.

That is, when sound from all directions is collected by beamforming and reproduced from the driver by executing the blind spot BF, it is possible to provide the user with the external sound as if the user is not wearing the headphone even though the user is wearing the headphone. For example, by setting the function of the blind spot BF of the headphone to be enabled during walking, the user can go out with a sense of security while wearing the headphone. In addition, in a case where walking is stopped, the blind spot BF function is canceled, and the noise cancellation function is automatically enabled, for example. As a result, the user can be immersed in music or the like reproduced by the headphone in the noise-cancelling state.

Figure 31:
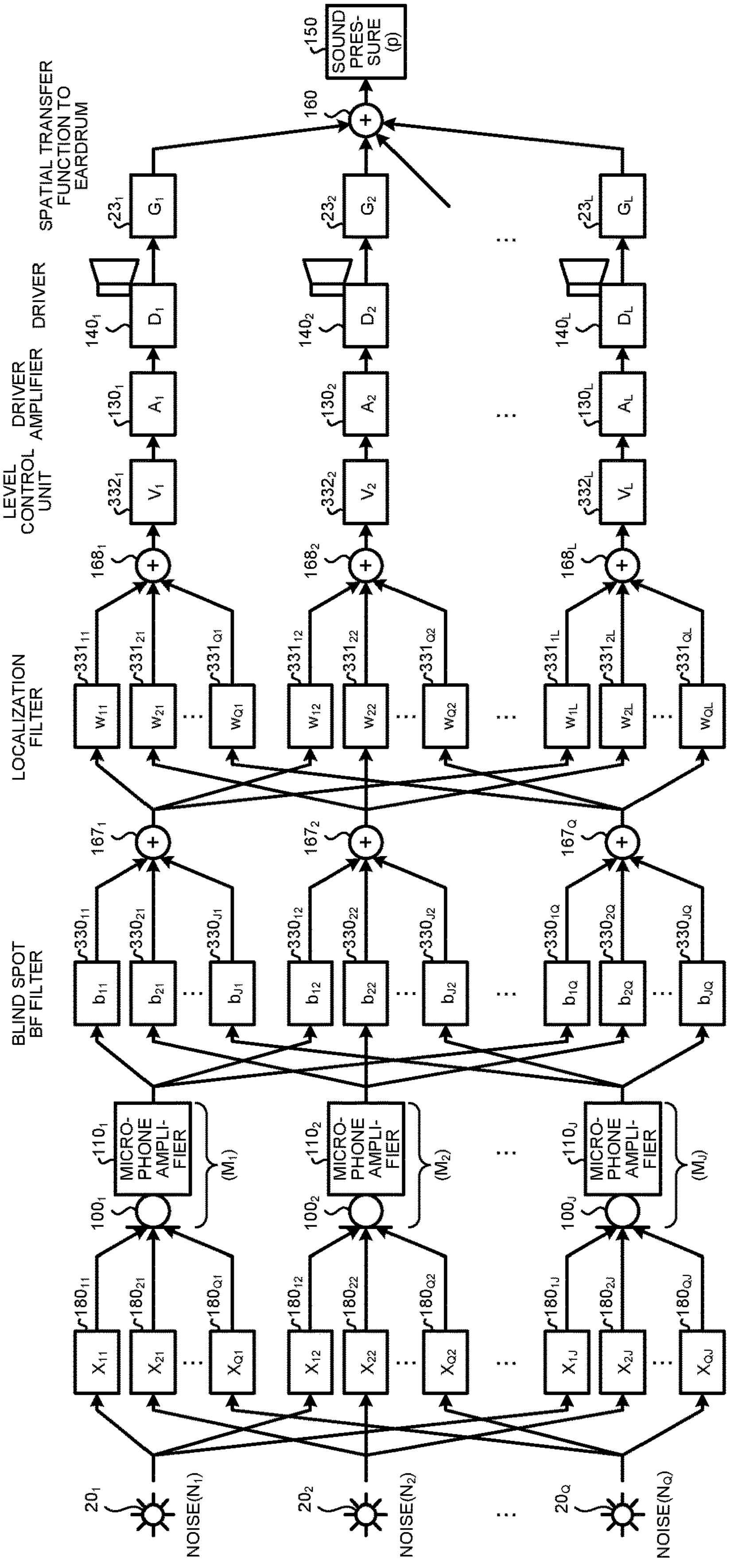
FIG. 31 is a diagram illustrating a configuration of an acoustic output device according to the sixth embodiment using a transfer function.

FIG. 31 is a diagram illustrating a configuration of an acoustic output device according to the sixth embodiment using a transfer function. Note that FIG. 31 illustrates a block of a transfer function of a portion related to beamforming according to the housing 520R. Furthermore, in FIG. 31, the respective noises 20$_1$, 20$_2$, . . . , and 20$_Q$ from the directions "1", "2", . . . , and "Q" can be enhanced by beamforming.

Noises 20$_1$, 20$_2$, . . . , and 20$_Q$ having characteristics "$N_1$", "$N_2$", . . . , and "$N_Q$", respectively, are collected by the FF microphone 100$_1$ via spaces 180$_{11}$, 180$_{21}$, . . . , and 180$_{Q1}$ which are spatial transfer functions $X_{11}$, $X_{21}$, . . . , and $X_{Q1}$, respectively. The noises 20$_1$, 20$_2$, . . . , and 20$_Q$ are collected by the FF microphone 100$_2$ via spaces 180$_{12}$, 180$_{22}$, . . . , and 180$_{Q2}$ which are spatial transfer functions $X_{12}$, $X_{22}$, . . . , and $X_{Q2}$, respectively. Thereafter, similarly, the noises 20$_1$, 20$_2$, . . . , and 20$_Q$ are collected by the FF microphone 100$_J$ via spaces 180$_{1J}$, 180$_{2J}$, . . . , and 180$_{QJ}$ which are spatial transfer functions $X_{1J}$, $X_{2J}$, . . . , and $X_{QJ}$, respectively.

The sound signals output from the FF microphones 100$_1$, 100$_2$, . . . , and 100$_J$ are input to the microphone amplifiers 110$_1$, 110$_2$, . . . , and 110$_J$, respectively. Here, a set of the FF microphone 100$_1$ and the microphone amplifier 110$_1$, a set of the FF microphone 100$_2$ and the microphone amplifier 110$_2$, . . . , and a set of the FF microphone 100$_J$ and the microphone amplifier 110$_J$ have transfer functions $M_1$, $M_2$, . . . , and $M_J$, respectively.

The sound signals output from the microphone amplifiers 110$_1$, 110$_2$, . . . , and 110$_J$ are input to the blind spot BF filters 330$_{11}$ to 330$_{J1}$, 330$_{12}$ to 330$_{J2}$, . . . , and 330$_{1Q}$ to 330$_{JQ}$ of the transfer functions $b_{11}$ to $b_{J1}$, $b_{12}$ to $b_{J2}$, . . . , and $b_{1Q}$ to $b_{JQ}$, respectively. These blind spot BF filters 330$_{11}$ to 330$_{J1}$, 330$_{12}$ to 330$_{J2}$, . . . , and 330$_{1Q}$ to 330$_{JQ}$ are included in the blind spot BF filter 330 in FIG. 30B.

More specifically, the output of the microphone amplifier 110$_1$ is input to the blind spot BF filters 330$_{11}$, 330$_{12}$, . . . , and 330$_{1Q}$. The output of the microphone amplifier 110$_2$ is input to the blind spot BF filters 330$_{21}$, 330$_{22}$, . . . , and 330$_{2Q}$. Hereinafter, similarly, the output of the microphone amplifier 110$_J$ is input to the blind spot BF filters 330$_{J1}$, 330$_{J2}$, . . . , and 330$_{JQ}$.

The noise enhancement signals generated by the blind spot BF filters 330$_{11}$, 330$_{21}$, . . . , and 330$_{J1}$ are synthesized by an adder 167$_1$ and input to the localization filters 331$_{11}$, 331$_{12}$, . . . , and 331$_{1L}$ which are the transfer functions $w_{11}$, $w_{12}$, . . . , and $w_{1L}$. The noise enhancement signals generated by the blind spot BF filters 330$_{12}$, 330$_{22}$, . . . , and 330$_{J2}$ are synthesized by an adder 167$_2$ and input to the localization filters 331$_{21}$, 331$_{22}$, . . . , and 331$_{2L}$ which are the transfer functions $w_{21}$, $w_{22}$, . . . , and $w_{2L}$. Similarly, the noise enhancement signals generated by the blind spot BF filters 330$_{1Q}$, 330$_{2Q}$, . . . , and 330$_{JQ}$ are synthesized by the adder 167$_Q$ and input to the localization filters 331$_{Q1}$, 331$_{Q2}$, . . . , and 331$_{QL}$ which are the transfer functions $w_{Q1}$, $w_{Q2}$, . . . , and $w_{QL}$.

Note that the localization filters 331$_{11}$, 331$_{21}$, . . . , and 331$_{QL}$ are included in the localization filter 331 in FIG. 30B.

The noise enhancement signals output from the localization filters 331$_{11}$, 331$_{21}$, . . . , and 331$_{Q1}$ are synthesized by an adder 168$_1$, and localization is adjusted. The noise enhancement signals output from the localization filters 331$_{12}$, 331$_{22}$, . . . , and 331$_{Q2}$ are synthesized by the adder 168$_2$, and localization is adjusted. Similarly, the noise enhancement signals output from the localization filters 331$_{1L}$, 331$_{2L}$, . . . , and 331$_{QL}$ are synthesized by an adder 168$_L$, and localization is adjusted. The levels of the noise enhancement signals in which localization has been adjusted are adjusted by the respective level control units 332$_1$, 332$_2$, . . . , and 332$_L$ included in the level control unit 332 in FIG. 30B. The noise enhancement signals level-adjusted by the level control units 332$_1$, 332$_2$, . . . , and 332$_L$ are supplied to the driver amplifiers 130$_1$, 130$_2$, . . . , and 130$_L$, and reproduced as noise enhancement sounds by the drivers $140_1$, $140_2$, . . . , and $140_L$, respectively.

The respective noise enhancement signals reproduced by the drivers $140_1$, $140_2$, . . . , and $140_L$ are synthesized by the addition unit 160 in the housing 520R via the spaces $23_1$, $23_2$, . . . , and $23_L$ in the housing 520R which are the spatial transfer functions $G_1$, $G_2$, . . . , and $G_L$, respectively, and reach the position of the eardrum 61 as the sound pressure 150 of the sound pressure p.

The noise canceling process described in the first to fourth embodiments can be executed independently of the noise enhancement process according to the sixth embodiment. For example, by combining the configuration by the noise canceling of the multi-microphone/multi-driver FF method according to the second embodiment described with reference to FIG. 14 and the configuration illustrated in FIG. 31, the noise from other than the blind spot can be canceled, and the noise in the blind spot direction can be reproduced, so that the safety can be secured when the user uses the headphone outdoors.

(7-1. Modification of Sixth Embodiment)

Next, the modification of the sixth embodiment will be described. A modification of the sixth embodiment is an example in which enhancement of speech sound of a user by beamforming using a plurality of FF microphones and position enhancement of a conversation counterpart who has a conversation with the user via communication using a plurality of drivers are performed.

In recent years, telework for working at home has been implemented with the spread of video conferencing and voice call applications. When a voice call conference with a plurality of participants is held at the time of telework, a headset including a microphone positioned at the mouth and a driver worn on one of the left and right ears is often used. In this normal headset, since the voice signal of the speaker is reproduced from one driver, it may be difficult to instantaneously determine who is currently speaking. In this case, there may be a situation in which the progress of the meeting is hindered or the content of the statement does not come in. Furthermore, since a microphone that collects a voice signal of speech is at the mouth, the user wearing the microphone may feel a sense of pressure.

Therefore, in the modification of the sixth embodiment, by using multi-microphone/multi-driver headphone, the voice signals of a plurality of speakers are disposed like an object sound source and reproduced from the corresponding driver. This makes it easy to instantaneously determine who is speaking now. In addition, by directing the beam to the mouth of the wearing user by the beamforming using the multi-microphone, the voice uttered by the wearing user can be clearly collected.

Figure 32A:
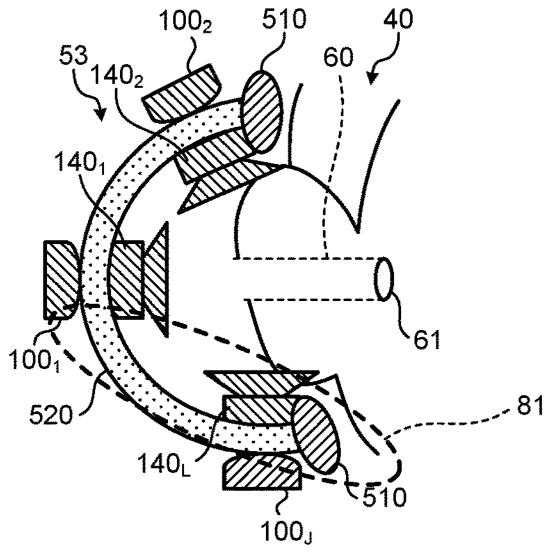
FIGS. 32A, 32B, and 32C are schematic diagrams for explaining a voice call according to a modification of the sixth embodiment.
Figure 32B:
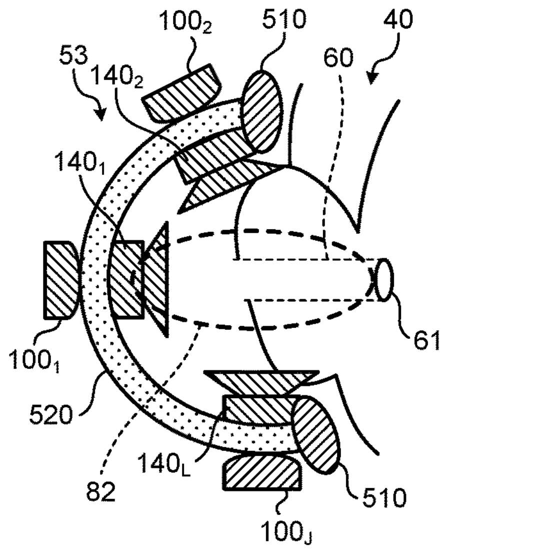
Figure 32C:
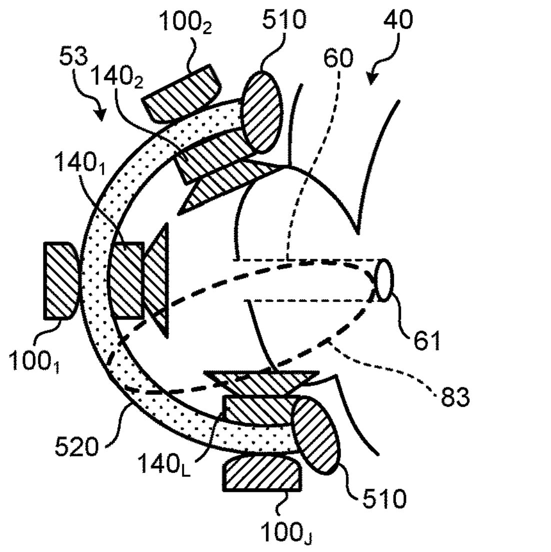

FIGS. 32A, 32B, and 32C are schematic diagrams for explaining a voice call according to a modification of the sixth embodiment. In the example of FIGS. 32A, 32B, and 32C, the headphone 53 that is a multi-microphone/multi-driver FF method noise canceling headphone is used. Note that the headphone 53 illustrated in FIG. 32 are assumed to have drivers further mounted at front and rear positions when viewed from the user in the housing 520 (not illustrated). Furthermore, in the following description, with respect to a user wearing the headphone 53, another user who has a conversation or the like with the user via communication is referred to as a speaker.

FIG. 32A schematically illustrates an example in which a voice signal by a voice generated by the user is enhanced by beamforming 81 directed to the mouth of the user using, for example, the FF microphones 1001 and 100J. This beamforming 81 toward the user's mouth is referred to as mouth beamforming (BF).

On the other hand, FIGS. 32B and 32C schematically illustrate an example of controlling localization of a voice by a speaker who has a conversation via communication. FIG. 32B is an example in which the call voice of speaker A is reproduced by the driver 1401 disposed on the center portion of the housing 520 right of the user. The reproduction sound 82 by the driver 1401 reaches the position of the eardrum 61. Furthermore, for example, by controlling all the drivers provided on the housings 520 of both ears, the call voice of speaker A can be heard from in front of the user.

FIG. 32C is an example in which the call voice of speaker B is reproduced by drivers 1401 and 140L of the housing 520 right of the user. The reproduction sound 83 reproduced by the drivers 1401 and 140L is synthesized in the space inside the housing 520 and reaches the position of the eardrum 61. For example, the volume and the phase of the reproduction sound reproduced by respective drivers provided on each of the left and right housings 520 of the headphone 53 of the user are controlled to be predetermined values, so that the call voice of speaker B can be heard from diagonally front right of the user.

Figure 33A:
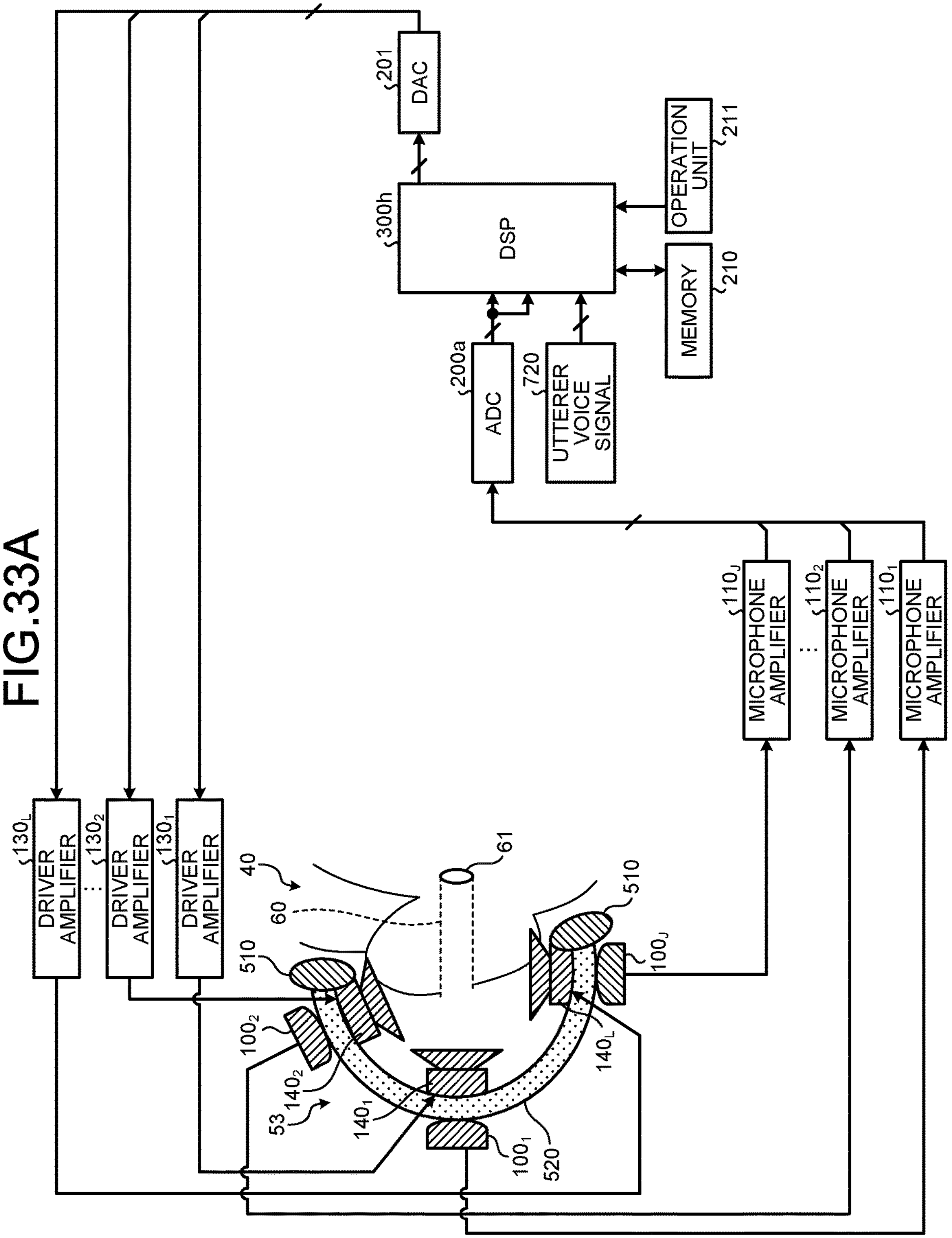
FIG. 33A is a schematic diagram schematically illustrating a configuration of an example of an acoustic output device according to a modification of the sixth embodiment.

FIG. 33A is a schematic diagram schematically illustrating a configuration of an example of an acoustic output device according to a modification of the sixth embodiment. The configuration illustrated in FIG. 33A is different from the configuration illustrated in FIG. 30A described above in that a DSP **300*h* is used instead of the DSP 300*g*, and an utterer voice signal 720 by the utterance of the user wearing the headphone 53, instead of the audio signal 700, is input to the DSP 300*h***.

Figure 33B:
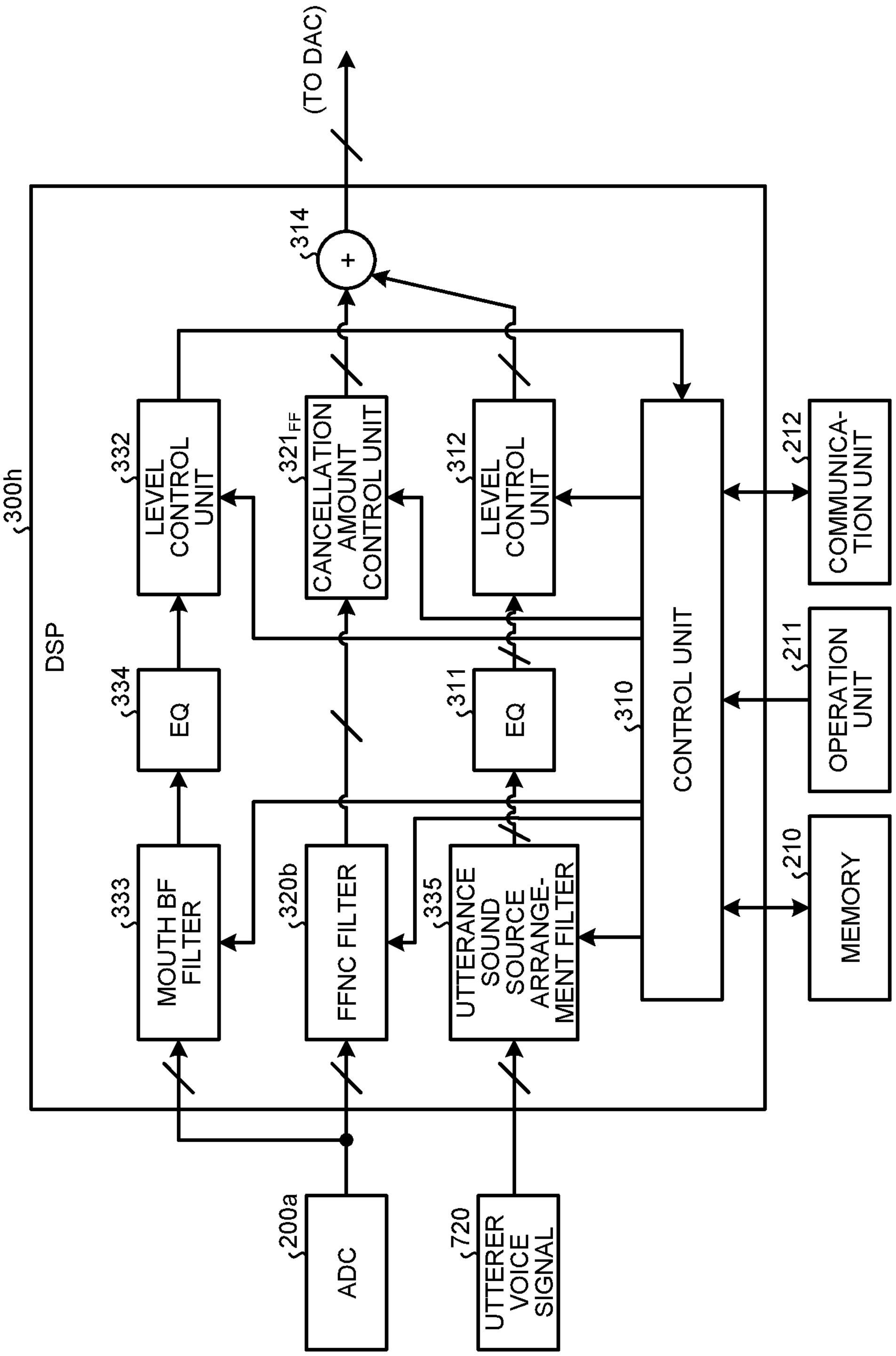
FIG. 33B is a block diagram illustrating a configuration of an example of a DSP according to a modification of the sixth embodiment.

FIG. 33B is a block diagram illustrating a configuration of an example of the DSP **300*h* according to a modification of the sixth embodiment. The configuration of the DSP 300*h* illustrated in FIG. 33B is different from the configuration of the DSP 300*g* illustrated in FIG. 30B in that a mouth BF filter 333 and an EQ 334 are provided instead of the blind spot BF filter 330 and the localization filter 331, and an utterance sound source arrangement filter 335 is provided. Furthermore, the configuration of the DSP 300*h* illustrated in FIG. 33B is different from that of the DSP 300*g* in that the output of the level control unit 332 is supplied to the control unit 310 without being supplied to the adder 314**.

Furthermore, in the DSP **300*h* illustrated in FIG. 33B, a communication unit 212 is connected to the control unit 310. The communication unit 212 communicates with an external device by wireless communication or wired communication under the control of the control unit 310**. Bluetooth (registered trademark) or the like can be applied as the wireless communication. As the wired communication, communication via a Universal Serial Bus (USB) cable or the like is considered.

In FIG. 33B, the utterer voice signal 720 is a voice signal acquired from speakers A and B or the like by communication by the communication unit 212, for example. The utterer voice signal 720 is input to the utterance sound source arrangement filter 335. The utterance sound source arrangement for determining from where the utterance can be heard by the speaker of the communication counterpart is instructed by the user operating the operation unit 211, for example. In response to this instruction, the control unit 310 reads, from the memory 210, a filter coefficient adjusted as if the utterance of the speaker can be heard from the instructed position, and writes the filter coefficient in the utterance sound source arrangement filter 335.

Localization and the like of the utterer voice signal 720 are set by the utterance sound source arrangement filter 335 in which the filter coefficient is written in this manner, and the utterer voice signal is passed to the adder 314 via the EQ 311 and the level control unit 312.

The mouth BF filter 333 has a function equivalent to that of the blind spot BF filter 330 described above. That is, the mouth BF filter 333 performs beamforming based on voice signals based on sound signals collected by the FF microphones $\mathbf{100}_1$, $\mathbf{100}_2$, . . . , and $\mathbf{100}_J$ of the housings 520 on the left and right sides and input from the ADC 200*a*, and selectively acquires a voice signal by a sound coming from the mouth portion of the user wearing the headphone 53. The voice signal output from the mouth BF filter 333 is subjected to sound quality adjustment by the EQ 334 and passed to the control unit 310 via the level control unit 332. The control unit 310 transmits the voice signal passed from the level control unit 332 to the other party's reproduction device by, for example, communication by the communication unit 212. The EQ 334 enhances, for example, a frequency band of a human voice and cuts off an extra frequency band such as the low-frequency and the high-frequency.

The adder 314 synthesizes the noise canceling signal passed from the cancellation amount control unit $\mathbf{321}_{FF}$ and the utterer voice signal 720 passed from the level control unit 312 to output the synthesized signal to the DAC 201.

As described above, in the modification of the sixth embodiment, the acquisition of the utterance sound of the user by the beamforming and the reproduction of the utterer voice signal 720 whose arrangement is appropriately set by the utterance sound source arrangement filter 335 can be executed simultaneously with the noise canceling by the FF method. Therefore, it is possible to concentrate on the voice signal by the utterances of the speakers A and B, and it is possible to easily hear the utterances of the speakers A and B.

8. Seventh Embodiment

Next, the seventh embodiment of the present disclosure will be described. The seventh embodiment is an example in which, in a headphone provided with a plurality of drivers and a plurality of FB microphones inside housing 520, an individual difference in a user wearing the headphone is corrected.

More specifically, in the acoustic characteristics in the housing in the state where the user wears the headphone, the sounds reproduced by respective drivers are collected by respective FB microphones, and the acoustic characteristics (in-ear characteristics) in the housing are measured based on the collected sound. Then, various parameters affecting the in-ear characteristics are corrected based on the measurement result.

For example, in the case of the noise canceling of the multi-microphone/multi-driver FB method, it can be seen from Expression (11) described above that, in the noise canceling of the FB method using the FB microphone, the transfer function H from the driver to the FB microphone position contributes to the canceling performance. The transfer function H is often different between when the FBNC filter is designed and when the FBNC filter is actually used by the user. Furthermore, and changes depending on individual differences of the user and the wearing state of the headphone. Therefore, it is difficult to provide noise canceling by the optimal FB method.

Therefore, it is possible to measure the in-ear characteristic T for each user by disposing a plurality of microphones inside the headphone housing and reproducing a measurement signals from respective drivers. As the measurement signal here, a sinusoidal wave, a random noise, a music signal, a time stretched pulse (TSP) signal, or the like can be applied.

Figure 34A:
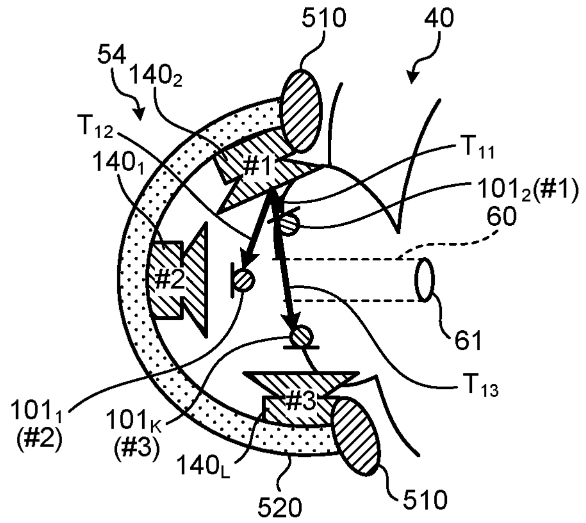
FIGS. 34A, 34B, and 34C are schematic diagrams schematically illustrating an example of a method of measuring an in-ear characteristic T according to the seventh embodiment.
Figure 34B:
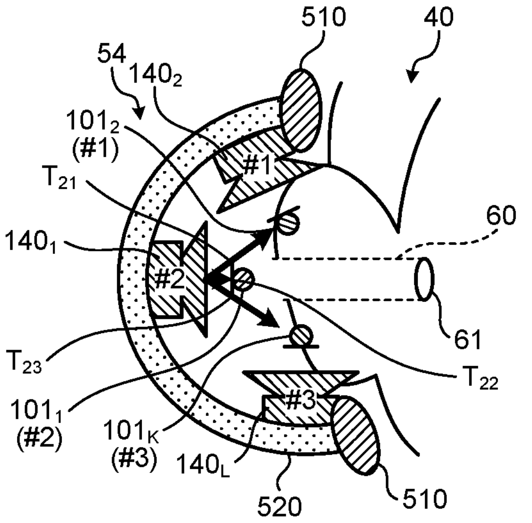
Figure 34C:
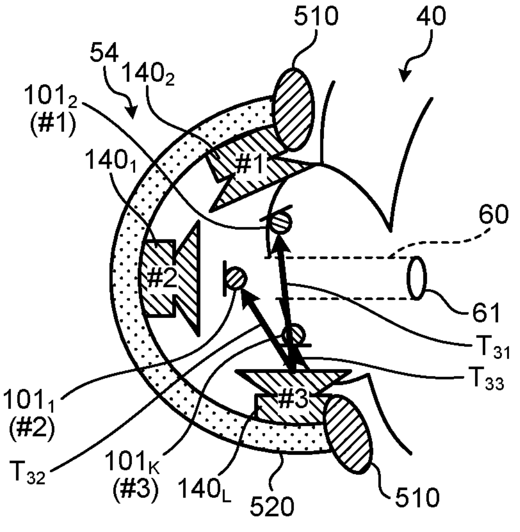

FIGS. 34A, 34B, and 34C are schematic diagrams schematically illustrating an example of a method of measuring the in-ear characteristic T according to the seventh embodiment. Here, the headphone 54 including a plurality of (three in this case) drivers 1401, 1402, and 140L inside the housing 520 and a plurality of (three in this example) FB microphones 1011, 1012, and 101K provided inside the housing 520 relative to the drivers 1401, 1402, and 140L illustrated in FIG. 18 will be described as an example.

In addition, in FIGS. 34A, 34B, and 34C, for the sake of explanation, the driver 1402 is referred to as a driver #1, the driver 1401 is referred to as a driver #2, and the driver 140L is referred to as a driver #3. For the sake of explanation, the FB microphone 1011 is referred to as an FB microphone #2, the FB microphone 1012 is referred to as an FB microphone #1, and the FB microphone 101K is referred to as an FB microphone #3.

For example, as illustrated in FIG. 34A, first, the measurement signal is reproduced by the driver #1, the reproduction sound is collected by the FB microphones #1, #2, and #3, and the in-ear characteristics T11, T12, and T13 are measured based on the collected sounds. Next, as illustrated in FIG. 34B, the measured sound is reproduced by the driver #2, the reproduction sound is collected by the FB microphones #1, #2, and #3, and the in-ear characteristics T21, T22, and T23 are measured based on the collected sounds. Finally, as illustrated in FIG. 34C, the measured sound is reproduced by the driver #3, the reproduction sound is collected by the FB microphones #1, #2, and #3, and the in-ear characteristics T31, T32, and T33 are measured based on the collected sounds.

As described above, when the three drivers #1, #2, and #3 and the three FB microphones #1, #2, and #3 are provided in the housing 520, the in-ear characteristics $T_{11}$ to $T_{13}$, the in-ear characteristics $T_{21}$ to $T_{23}$, and the in-ear characteristics $T_{31}$ to $T_{33}$ between nine points can be measured by combination. The individual difference due to the user wearing the headphone 53 can be corrected by correcting the in-ear characteristics $T_{11}$ to $T_{13}$, $T_{21}$ to $T_{23}$, and the in-ear characteristics $T_{31}$ to $T_{33}$ so as to approach the transfer function H at the time of designing the FBNC filter 320*c*.

Figure 35:
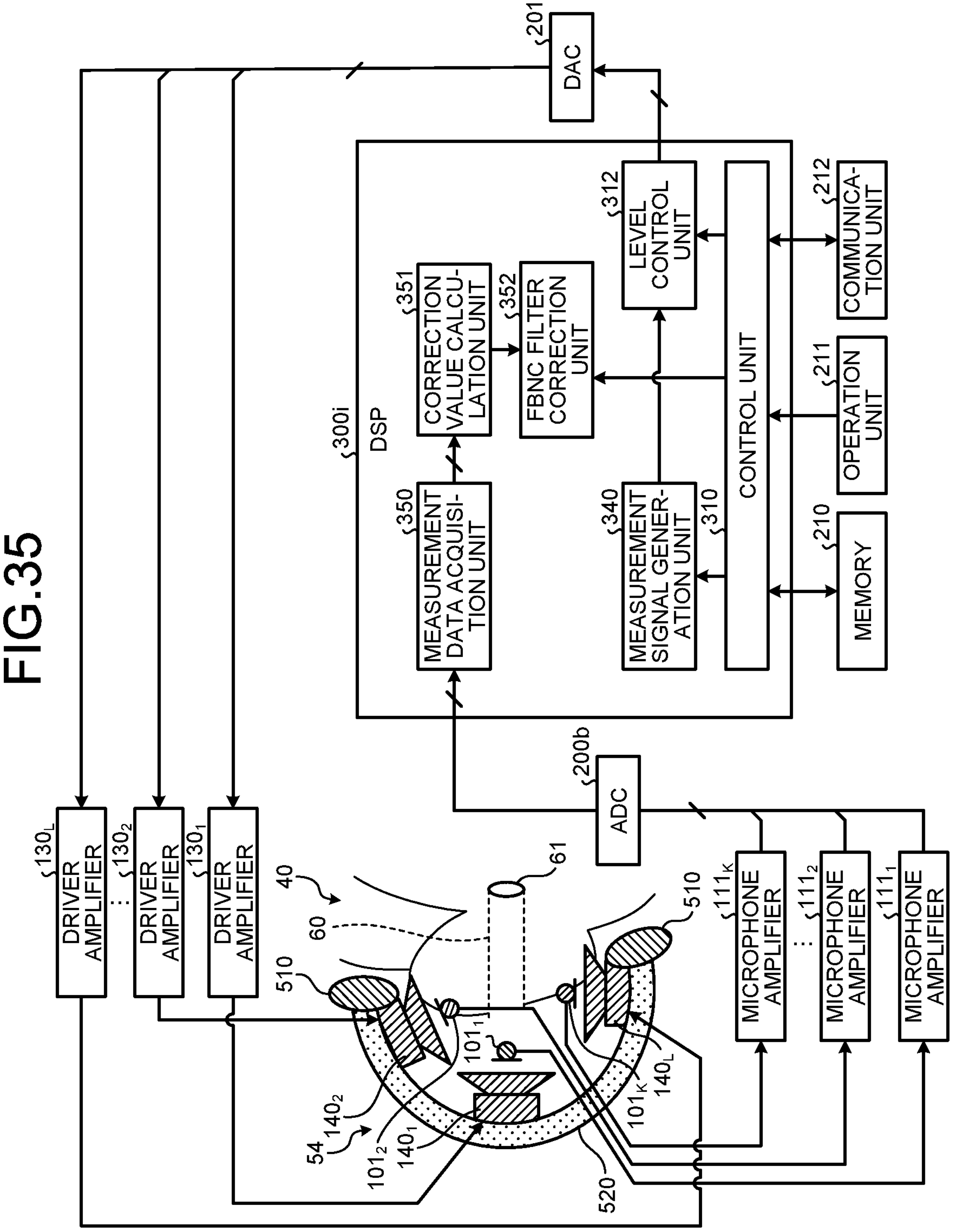
FIG. 35 is a schematic diagram schematically illustrating a configuration of an example of an acoustic output device according to the seventh embodiment.

FIG. 35 is a schematic diagram schematically illustrating a configuration of an example of an acoustic output device according to the seventh embodiment. Since the configuration illustrated in FIG. 35 is the same as the configuration of FIG. 19A described above except for a DSP 300*i*, description of units other than the DSP 300*i* will be omitted.

Note that, in FIG. 35, a part deeply related to the measurement of the in-ear characteristic T is extracted and illustrated, and the configuration related to the reproduction of the audio signal 700 and the like is appropriately omitted. That is, the DSP 300*i* includes, for example, the FBNC filter 320*c* and the cancellation amount control unit $\mathbf{321}_{FB}$ illustrated in FIG. 19B. Furthermore, the DSP 300*i* further includes, for example, the EQ 311 and the level control unit 312 illustrated in FIG. 19B.

In addition, the memory 210, the operation unit 211, and the communication unit 212 are connected to the DSP 300*i*.

The DSP 300*i* includes a control unit 310, a measurement signal generation unit 340, a level control unit 312, a measurement data acquisition unit 350, a correction value calculation unit 351, and an FBNC filter correction unit 352.

The measurement signal generation unit 340 generates a measurement signal for measuring the in-ear characteristic T. As described above, a sinusoidal wave, a random noise, a music signal, a TSP signal, or the like can be applied as the measurement signal. The control unit 310 instructs the measurement signal generation unit 340 to generate and outputs the measurement signal, for example, in accordance with a user operation on the operation unit 211. The measurement signal generation unit 340 generates and outputs the measurement signal according to this instruction. The measurement signal generation unit 340 reads, for example, measurement signal information for generating a measurement signal such as waveform data stored in advance in the memory 210 to generate the measurement signal.

The measurement signal output from the measurement signal generation unit 340 is adjusted to a predetermined level by the level control unit 312 and passed to the DAC 201. The DAC 201 converts the passed digital measurement signal into an analog measurement signal and supplies the analog measurement signal to each of the driver amplifiers $\mathbf{130}_1$, $\mathbf{130}_2$, and $\mathbf{103}_L$. The driver amplifiers $\mathbf{130}_1$, $\mathbf{130}_2$, and $\mathbf{130}_L$ drive the drivers $\mathbf{140}_1$, $\mathbf{140}_2$, and $\mathbf{140}_L$, respectively, to reproduce measurement signals.

At this time, the control unit 310 can control, for example, the driver amplifiers $\mathbf{130}_1$, $\mathbf{130}_2$, and $\mathbf{130}_L$ to select by which of the drivers $\mathbf{140}_1$, $\mathbf{140}_2$, and $\mathbf{140}_L$ the measurement signal is reproduced.

The measurement sound obtained by reproducing the measurement signal by the driver $\mathbf{140}_1$, $\mathbf{140}_2$, or $\mathbf{140}_L$ is collected by the FB microphones $\mathbf{101}_1$, $\mathbf{101}_2$, and $\mathbf{101}_K$, and the measurement sound signals collected are input as the ADC 200*b* via the microphone amplifiers $\mathbf{111}_1$, $\mathbf{111}_2$, and $\mathbf{111}_K$. The ADC 200*b* converts each of the measurement sound signals input from the microphone amplifiers $\mathbf{111}_1$, $\mathbf{111}_2$, and $\mathbf{111}_K$ into a digital measurement sound signal to output the digital measurement sound signal.

Each measurement sound signal output from the ADC 200*b* is acquired by the measurement data acquisition unit 350 and passed to the correction value calculation unit 351. The correction value calculation unit 351 obtains the in-ear characteristic T based on each measurement sound signal acquired by the measurement data acquisition unit 350. The correction value calculation unit 351 calculates an FBNC filter correction value for correcting the FBNC filter 320*c* (not illustrated) based on the obtained in-ear characteristics T. For example, the correction value calculation unit 351 calculates FBNC filter correction values for correcting the filter coefficients $-\beta_{11}$ to $-\beta_{KL}$ of the FBNC filters $\mathbf{121}_{11}$ to $\mathbf{121}_{KL}$ illustrated in FIG. 21. The correction value calculation unit 351 passes the calculated FBNC filter correction values to the FBNC filter correction unit 352.

The FBNC filter correction unit 352 corrects each parameter such as the filter coefficient $-\beta$ of the FBNC filter 320*c* based on the FBNC filter correction value passed from the correction value calculation unit 351. Each parameter of the corrected FBNC filter 320*c* is stored in the memory 210 via the control unit 310.

The memory 210 can store a plurality of parameters of the FBNC filter 320*c*. For example, the measurement can be performed for each user who uses the headphone 53 or for each use environment (usage place, presence or absence of hat or glasses, hairstyle, and the like) of a certain user, and the parameters can be stored. The user can designate a parameter depending on the situation when using the headphone 53 by a user operation on the operation unit 211. The control unit 310 writes the designated parameter into the FBNC filter 320*c*.

Figure 36:
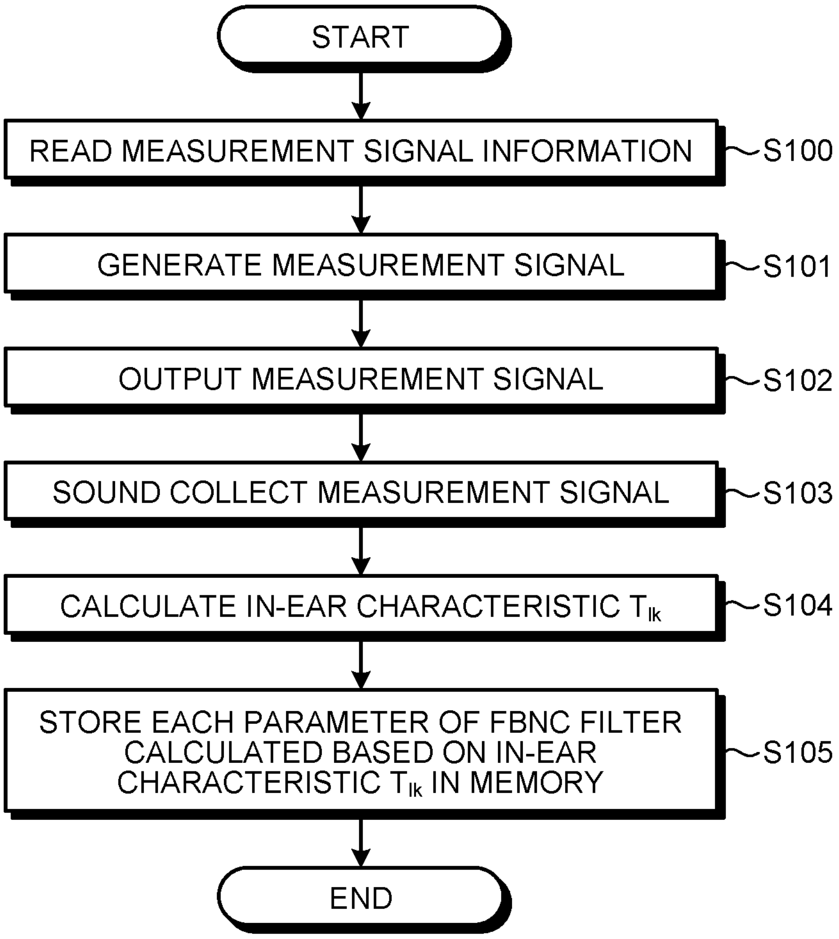
FIG. 36 is a flowchart illustrating an example of measurement processing according to the seventh embodiment.

FIG. 36 is a flowchart illustrating an example of measurement processing according to the seventh embodiment. For example, when a measurement start instruction is issued by the control unit 310, the measurement signal generation unit 340 reads the measurement signal information from the memory 210 in step S100. In the next step S101, the measurement signal generation unit 340 generates a measurement signal based on the measurement signal information read in step S100.

In the next step S102, the measurement signal generation unit 340 outputs the measurement signal generated in step S101. The measurement signal output from the measurement signal generation unit 340 is supplied to the driver amplifiers $\mathbf{130}_1$, $\mathbf{130}_2$, and $\mathbf{130}_L$ via the level control unit 312 and the DAC 201, and reproduced as a measurement sound signal.

In the next step S103, the FB microphones $\mathbf{101}_1$, $\mathbf{101}_2$, and $\mathbf{101}_K$ collect the measurement sound obtained by reproducing the measurement sound signal by the driver amplifier $\mathbf{130}_1$, $\mathbf{130}_2$, or $\mathbf{130}_L$. The measurement sound signals based on the measurement sounds collected by the FB microphones $\mathbf{101}_1$, $\mathbf{101}_2$, and $\mathbf{101}_K$ are acquired by the measurement data acquisition unit 350 and passed to the correction value calculation unit 351.

In step S104, the correction value calculation unit 351 calculates the in-ear characteristic $T_{lk}$ based on each measurement sound signal passed from the measurement data acquisition unit 350. Here, the in-ear characteristic $T_{lk}$ is a transfer function from the 1-th driver among the drivers $\mathbf{140}_1$, $\mathbf{140}_2$, and $\mathbf{140}_L$ to the k-th FB microphone among the FB microphones $\mathbf{101}_1$, $\mathbf{101}_2$, and $\mathbf{101}_K$. For example, the processing of steps S102 to S104 described above is repeatedly executed while switching the driver that reproduces the measurement sound among the drivers $\mathbf{140}_1$, $\mathbf{140}_2$, and $\mathbf{140}_L$.

When the measurement by the combination of the drivers $\mathbf{140}_1$, $\mathbf{140}_2$, and $\mathbf{140}_L$ and the FB microphones $\mathbf{101}_1$, $\mathbf{101}_2$, and $\mathbf{101}_k$ is completed and each in-ear characteristic $T_{lk}$ is calculated, the process proceeds to step S105. In step S105, the control unit 310 calculates an FBNC filter correction value for correcting the FBNC filter 320*c* based on each in-ear characteristic $T_{lk}$ calculated by the correction value calculation unit 351 in step S104 to store each parameter of the FBNC filter 320*c* corrected by the calculated FBNC filter correction value in the memory 210.

As described above, in the seventh embodiment, the in-ear characteristics T are calculated using the plurality of drivers $\mathbf{140}_1$, $\mathbf{140}_2$, and $\mathbf{140}_L$ and the plurality of FB microphones $\mathbf{101}_1$, $\mathbf{101}_2$, and $\mathbf{101}_K$ provided in the housing 520, and each parameter of the FBNC filter 320*c* is corrected based on the calculation result. Therefore, the performance of noise canceling by the FB method can be improved.

(8-1. First Modification of Seventh Embodiment)

Next, the first modification of the seventh embodiment will be described. The first modification of the seventh embodiment is different from the above-described seventh embodiment in that the equalizer for correcting the sound signal is corrected based on the measured in-ear characteristic T.

Figure 37:
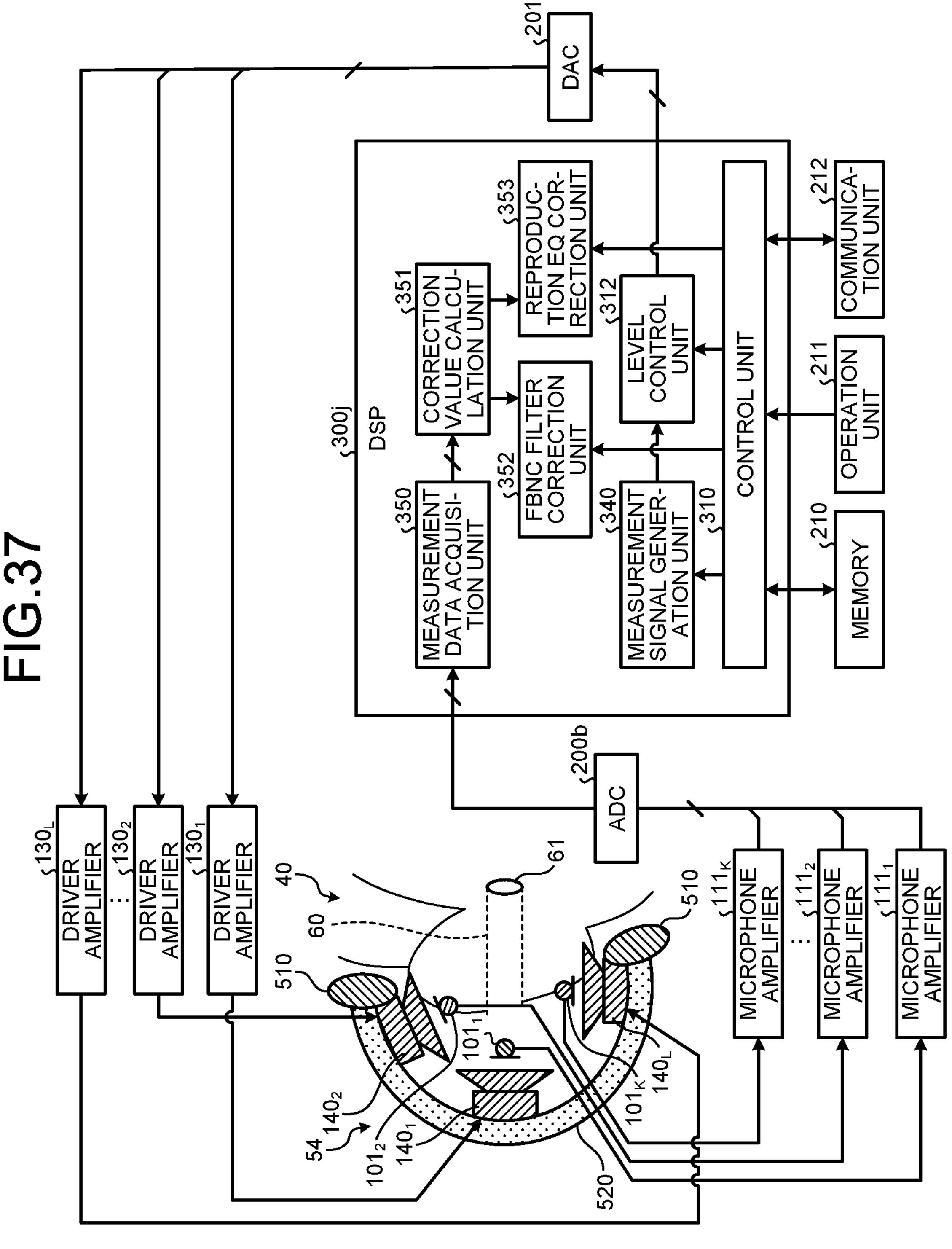
FIG. 37 is a schematic diagram schematically illustrating a configuration of an example of an acoustic output device according to a first modification of the seventh embodiment.

FIG. 37 is a schematic diagram schematically illustrating a configuration of an example of an acoustic output device according to the first modification of the seventh embodiment. Since the configuration illustrated in FIG. 37 is the same as the configuration of FIG. 35 described above except for a DSP 300*j*, description of units other than the DSP 300*j* will be omitted.

Note that, in FIG. 37, a part deeply related to the measurement of the in-ear characteristic T is extracted and illustrated, and the configuration related to the reproduction of the audio signal 700 and the like is appropriately omitted. That is, the DSP **300*j* includes, for example, the FBNC filter 320*c* and the cancellation amount control unit $\mathbf{321}_{FB}$ illustrated in FIG. 19B. Furthermore, the DSP 300*j* further includes, for example, the EQ 311 and a level control unit 312 illustrated in FIG. 19**B.

In FIG. 37, the DSP **300*j* is different from the above-described DSP 300*i* in that a reproduction EQ correction unit 353 is added. The correction value calculation unit 351 calculates an FBNC filter correction value for correcting the FBNC filter 320*c* (not illustrated) and calculates an EQ correction value for correcting the EQ 311 (not illustrated) based on each measurement sound signal acquired by the measurement data acquisition unit 350**.

The EQ correction value calculated by the correction value calculation unit 351 is passed to the reproduction EQ correction unit 353. The reproduction EQ correction unit 353 corrects each parameter of the EQ 311 (not illustrated) based on the passed EQ correction value. Each parameter of the corrected EQ 311 is stored in the memory 210, for example.

As described above, by correcting each parameter of the EQ 311 for correcting the audio signal 700 based on the measured in-ear characteristic T, the characteristic of the audio signal 700 reproduced by the headphone 54 can be optimized according to the individual characteristic (ear shape or the like). As a result, for example, in low-frequency correction of the audio signal 700 or the like, an effect of improving sound quality according to individual differences or individual wearing states can be expected.

(8-2. Second Modification of Seventh Embodiment)

Next, the second modification of the seventh embodiment will be described. The second modification of the seventh embodiment is an example in which the plurality of drivers $\mathbf{140}_1$ to $\mathbf{140}_L$ and the plurality of FB microphones $\mathbf{101}_1$ to $\mathbf{101}_K$ are provided inside the housing 520 illustrated in FIG. 22, and in the headphone 55 in which the plurality of FF microphones $\mathbf{100}_1$ to $\mathbf{100}_J$ is provided toward the outside of the housing 520, the parameters of the FBNC filter **320*c* and the EQ 311 are corrected, and the parameters of the FFNC filter 320*b*** are corrected.

Figure 38:
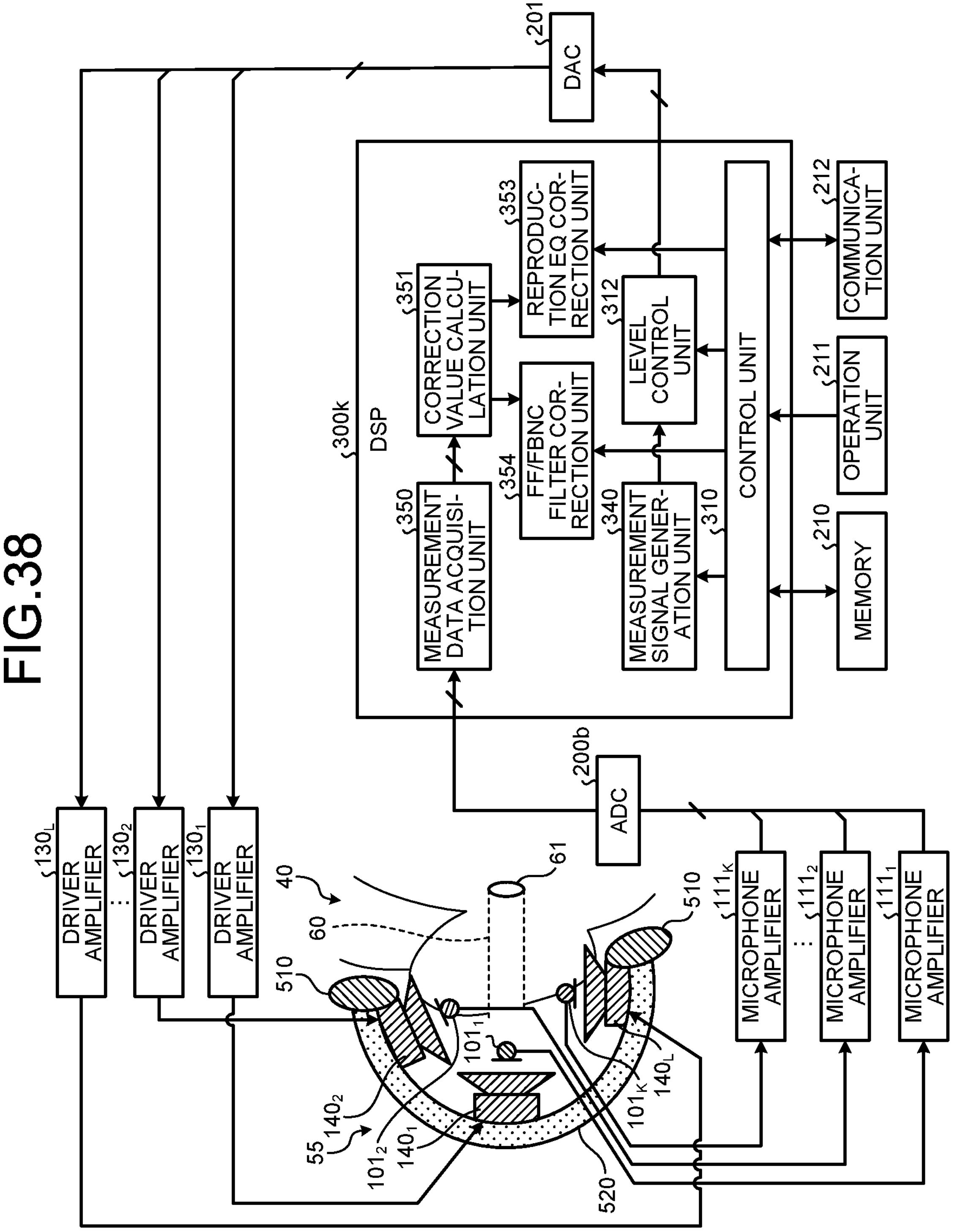
FIG. 38 is a schematic diagram schematically illustrating a configuration of an example of an acoustic output device according to a second modification of the seventh embodiment.

FIG. 38 is a schematic diagram schematically illustrating a configuration of an example of an acoustic output device according to the second modification of the seventh embodiment. In FIG. 38, the plurality of FF microphones $\mathbf{100}_1$ to $\mathbf{100}_J$ included in the headphone 55 is not illustrated in order to avoid complexity.

The measurement sound obtained by reproducing the measurement signal by the driver $\mathbf{140}_1$, $\mathbf{140}_2$, or $\mathbf{140}_L$ is collected by the FB microphones $\mathbf{101}_1$, $\mathbf{101}_2$, and $\mathbf{101}_K$, and the measurement sound signals collected are input as the ADC **200*b* via the microphone amplifiers $\mathbf{111}_1$, $\mathbf{111}_2$, and $\mathbf{111}_K$. The ADC 200*b*** converts each of the measurement sound signals input from the microphone amplifiers $\mathbf{111}_1$, $\mathbf{111}_2$, and $\mathbf{111}_K$ into a digital measurement sound signal to output the digital measurement sound signal.

Each measurement sound signal output from the ADC **200*b* is input to a DSP 300*k*, acquired by the measurement data acquisition unit 350, and passed to the correction value calculation unit 351. The correction value calculation unit 351 obtains the in-ear characteristic T based on each measurement sound signal acquired by the measurement data acquisition unit 350. The correction value calculation unit 351 calculates an FBNC filter correction value for correcting the FBNC filter 320*c* (not illustrated) and an FFNC filter correction value for correcting the FFNC filter 320*b* (not illustrated) based on the obtained in-ear characteristic T. The correction value calculation unit 351 passes the calculated FBNC filter correction value and FFNC filter to an FF/FBNC filter correction unit 354**.

The FF/FBNC filter correction unit 354 corrects each parameter such as the filter coefficient −β of the FBNC filter **320*c* based on the FBNC filter correction value passed from the correction value calculation unit 351. In addition, the FF/FBNC filter correction unit 354 corrects each parameter such as the filter coefficient α of the FFNC filter 320*b* based on the FFNC filter correction value passed from the correction value calculation unit 351. Each parameter of the corrected FFNC filter 320*b* and FBNC filter 320*c* is stored in the memory 210 via the control unit 310**.

Here, the noise canceling by the FF method requires the spatial transfer function G of the space from the driver to the eardrum position as can be seen from the above-described Expression (2). The same applies to the noise canceling by the multi-driver FF method. The spatial transfer function G at the time of designing the FFNC filter **320*b*** is different from the spatial transfer function G in a state where the headphone is actually worn by the user, and further, the shape of the ear is different between users, so that the spatial transfer function G varies. This makes it difficult to provide the user with optimal canceling performance.

As described with reference to FIGS. 34A, 34B, and 34C, in a case where the three drivers 1401, 1402, and 140L and the three FB microphones 1011, 1012, and 101K are provided inside the housing 520, the in-ear characteristics T of the user can be measured between nine points. By obtaining the correction coefficient C that minimizes the error between the in-ear characteristic T and the spatial transfer function G as the reference in-ear characteristic at the time of designing the FFNC filter and reflecting the correction coefficient C in each parameter of the FFNC filter **320*b***, improvement of the canceling performance can be expected.

Figure 39:
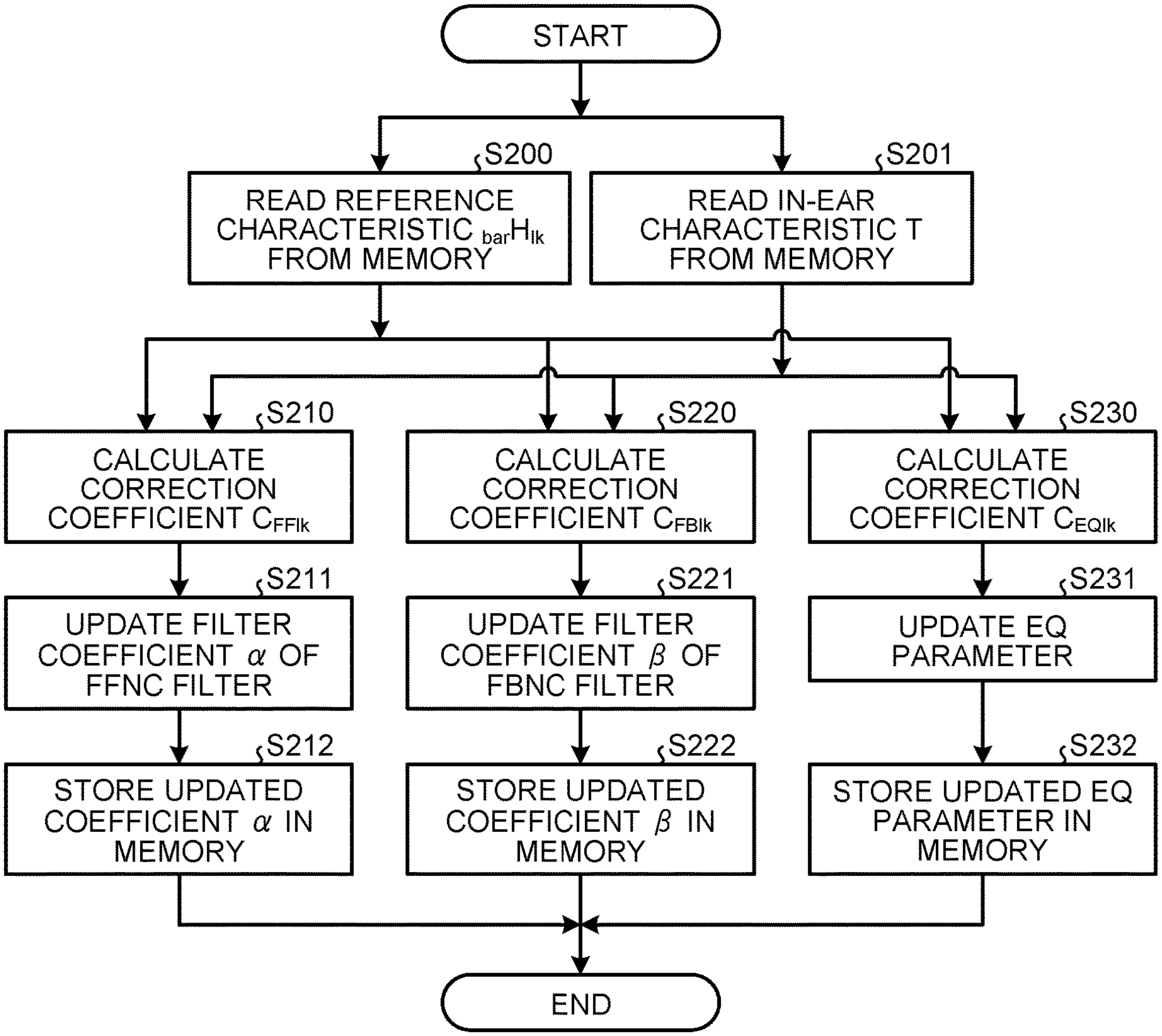
FIG. 39 is a flowchart illustrating an example of correction value calculation processing according to a second modification of the seventh embodiment.

FIG. 39 is a flowchart illustrating an example of correction value calculation processing according to the second modification of the seventh embodiment. In step S200, the correction value calculation unit 351 reads a reference characteristic ${}_{bar}H_{lk}$ stored in advance in the memory 210, for example. Note that "${}_{bar}$" indicates a symbol "~ (tilde)" disposed above next character (in this case, "H"). At the same time, the correction value calculation unit 351 reads the in-ear characteristics $T_{lk}$ stored in the memory 210 at the time of the previous measurement, for example, from the memory 210.

The processing of steps S210 to S212, the processing of steps S220 to S222, and the processing of steps S230 to S232 may be executed in parallel or sequentially.

In step S210, the correction value calculation unit 351 calculates a correction coefficient $C_{FFlk}$ for correcting each parameter of the FFNC filter **320*b* based on the reference characteristic ${}_{bar}H_{lk}$ and the in-ear characteristic $T_{lk}$. The correction value calculation unit 351 passes the calculated correction coefficient $C_{FFlk}$ to the FF/FBNC filter correction unit 354. In the next step S211, the FF/FBNC filter correction unit 354 updates the filter coefficient α of the FFNC filter 320*b* based on the correction coefficient $C_{FFlk}$. In the next step S212, the control unit 310 stores the updated filter coefficient α in the memory 210**.

In step S220, the correction value calculation unit 351 calculates a correction coefficient $C_{FBlk}$ for correcting each parameter of the FBNC filter **320*c* based on the reference characteristic ${}_{bar}H_{lk}$ and the in-ear characteristic $T_{lk}$. The correction value calculation unit 351 passes the calculated correction coefficient $C_{FBlk}$ to the FF/FBNC filter correction unit 354. In the next step S221, the FF/FBNC filter correction unit 354 updates the filter coefficient β of the FBNC filter 320***c* based on the correction coefficient $C_{FBlk}$. In the next step S222, the control unit 310 stores the updated filter coefficient β in the memory 210.

In step S230, the correction value calculation unit 351 calculates a correction coefficient $C_{EQlk}$ for correcting each parameter of the EQ 311 for reproduction of the audio signal 700 based on the reference characteristic $_{bar}H_{lk}$ and the in-ear characteristic $T_{lk}$. The correction value calculation unit 351 passes the calculated correction coefficient $C_{EQlk}$ to the reproduction EQ correction unit 353. In the next step S231, the reproduction EQ correction unit 353 updates each parameter of the EQ 311 based on the correction coefficient $C_{EQlk}$. In the next step S232, the control unit 310 stores each parameter of the updated EQ 311 in the memory 210.

For example, when the headphone 55 reproduces the audio signal 700 or the like, the control unit 310 applies the parameters of the filter coefficients α and β and the EQ 311 stored in the memory 210 to the FFNC filter 320*b*, the FBNC filter 320*c*, and the EQ 311, respectively. As a result, the user wearing the headphone 55 can listen to, for example, the reproduction sound of the audio signal 700 in which the noise is canceled in a state of matching the characteristic of the user with the sound quality corrected in accordance with the characteristic of the user by the EQ 311.

(8-3. Third Modification of Seventh Embodiment)

Next, the third modification of the seventh embodiment will be described. The third modification of the seventh embodiment is an example in which, in a headphone provided with a plurality of drivers and a plurality of FB microphones inside a housing 520, determination of a wearing condition (referred to as wearing determination) when the user wears the headphone is made.

Note that, here, the description will be given assuming that the configuration illustrated in FIG. 35 is applied as the configuration of the acoustic output device.

In the noise canceling headphone, the wearability of the headphone has a great influence on the effect of noise canceling. For example, when the wearability of the headphone is poor and there is a large gap between the head 40 of the user wearing the headphone and the ear pad 510, external noise may leak into from the gap, and the noise canceling effect may be weakened. As a simple example, from FIG. 1 and Expression (2) described above, the wearability of the headphone is extremely important because it affects the leakage noise in which the noise leaks into the housing of the headphone through the space of the spatial transfer function F and the spatial transfer function G from the driver to the eardrum position.

For example, in the headphone 54 in which the plurality of drivers 140$_1$ to 140$_L$ and the plurality of FB microphones 101$_1$ to 101$_K$ are disposed in the housing 520 described with reference to FIG. 18, the drivers 140$_1$ to 140$_L$ reproduce the measurement signals. The FB microphones 101$_1$ to 101$_K$ collects the measurement sounds obtained by reproducing the measurement signals, and the in-ear characteristics $T_{lk}$ calculated based on the measurement sound signals output from the FB microphones 101$_1$ to 101$_K$ are analyzed, whereby the details of the condition of wearing the headphone 54 can be determined.

Figure 40A:
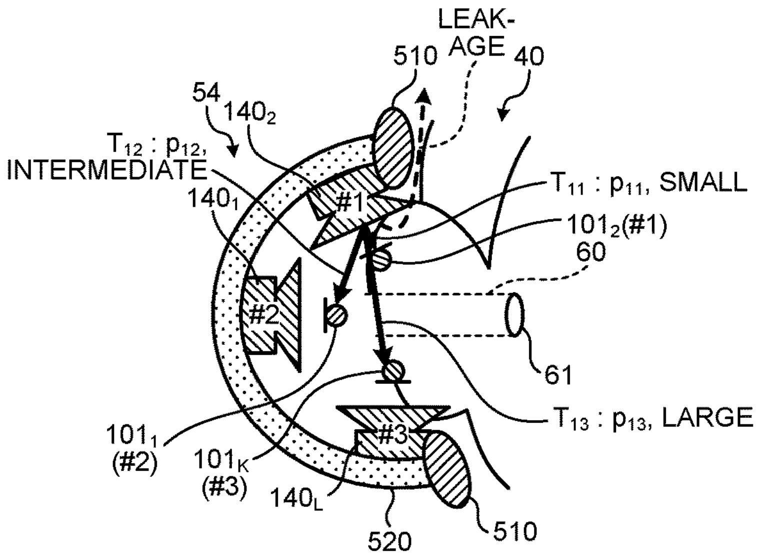
FIGS. 40A, 40B, and 40C are schematic diagrams for explaining wearing determination according to a third modification of the seventh embodiment.
Figure 40B:
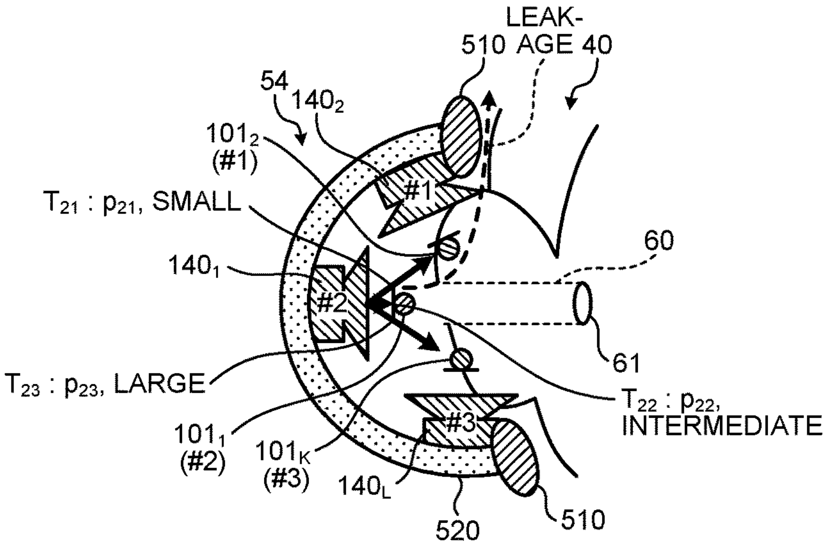
Figure 40C:
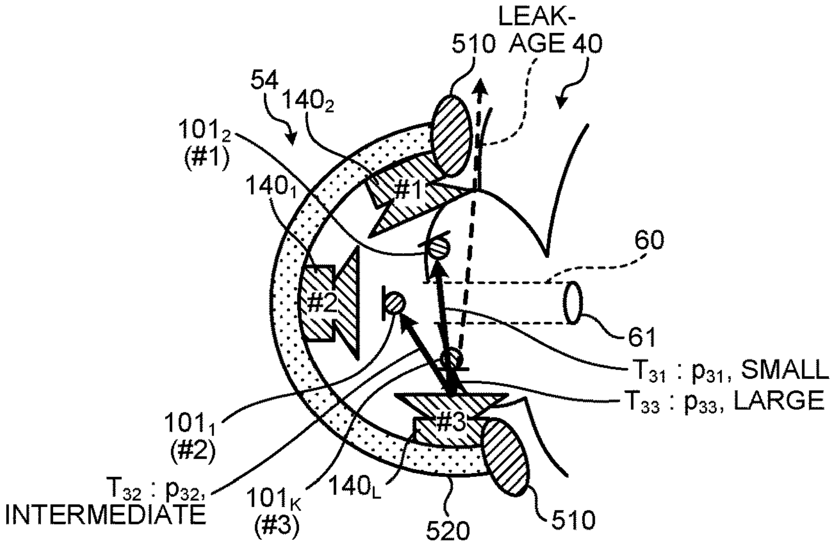

FIGS. 40A, 40B, and 40C are schematic diagrams for explaining wearing determination according to the third modification of the seventh embodiment. The example of FIGS. 40A, 40B, and 40C illustrate a state in which the wearability of the headphone 54 worn on the head 40 by the user is poor, and a gap is formed between the head 40 and the ear pad 510 on the upper side of the housing 520. In this state, the drivers 1401 to 140L of the headphone 54 reproduces the measurement signals one by one, and the FB microphones 1011 to 101K collect the measurement sounds obtained by reproducing the measurement signals, thereby detecting the position where the noise has leaked.

In FIGS. 40A, 40B, and 40C, for the sake of explanation, the driver 1402 is referred to as a driver #1, the driver 1401 is referred to as a driver #2, and the driver 140L is referred to as a driver #3. For the sake of explanation, the FB microphone 1011 is referred to as an FB microphone #2, the FB microphone 1012 is referred to as an FB microphone #1, and the FB microphone 101K is referred to as an FB microphone #3.

FIG. 40A illustrates an example in which the measurement signal is reproduced by the driver #1. In this case, the reproduced measurement sound leaks out in the direction opposite to the wavefront direction of the measurement sound by the driver #1. When the low-frequency power of the measurement sound collected by each of the FB microphones #1 to #3 is analyzed, it is found that the power p13 from the driver #1 to the FB microphone #3 is the largest, and the power p11 from the driver #1 to the FB microphone #1 is the smallest. Power p12 from the driver #1 to the FB microphone #2 is intermediate between the two powers.

FIG. 40B illustrates an example in which the measurement signal is reproduced by the driver #2. In this case, the reproduced measurement sound leaks out in a direction obliquely upward with respect to the wavefront direction of the measurement sound by the driver #2. When the low-frequency power of the measurement sound collected by each of the FB microphones #1 to #3 is analyzed, it is found that the power p23 from the driver #2 to the FB microphone #3 is the largest, and the power p21 from the driver #2 to the FB microphone #1 is the smallest. Power p22 from the driver #2 to the FB microphone #2 is intermediate between the two powers.

FIG. 40C illustrates an example in which the measurement signal is reproduced by the driver #3. In this case, the reproduced measurement sound leaks upward with respect to the wavefront direction of the measurement sound by the driver #3. When the low-frequency power of the measurement sound collected by each of the FB microphones #1 to #3 is analyzed, it is found that the power p33 from the driver #3 to the FB microphone #3 is the largest, and the power p31 from the driver #3 to the FB microphone #1 is the smallest. Power p32 from the driver #3 to the FB microphone #2 is intermediate between the two powers.

From the above, it can be seen that the power $p_{11}$ from the driver #1 to the FB microphone #1, the power $p_{21}$ from the driver #2 to the FB microphone #1, and the power $p_{31}$ from the driver #3 to the FB microphone #1 are small, and it can be determined that the wearing condition of the headphone 54 in the vicinity of the ear upper portion is poor.

Figure 41A:
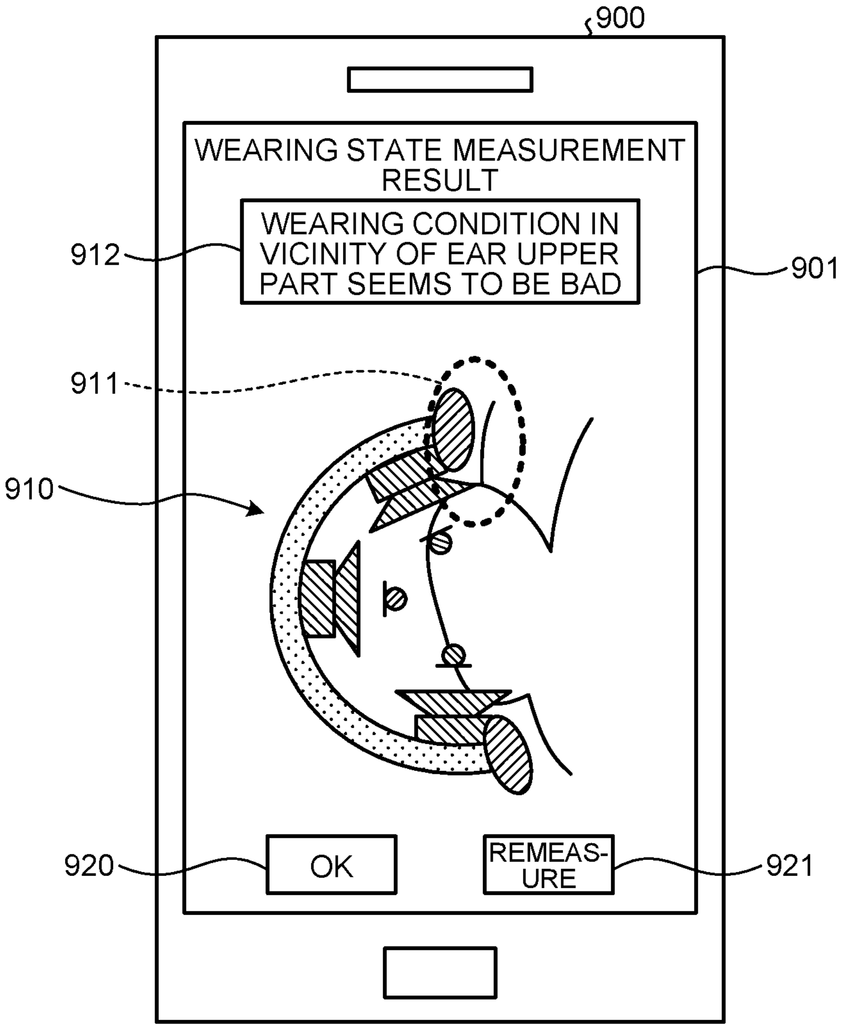
FIG. 41A is a diagram illustrating an example of a notification method for notifying the user of the condition of wearing the headphone applicable to the eighth embodiment.
Figure 41B:
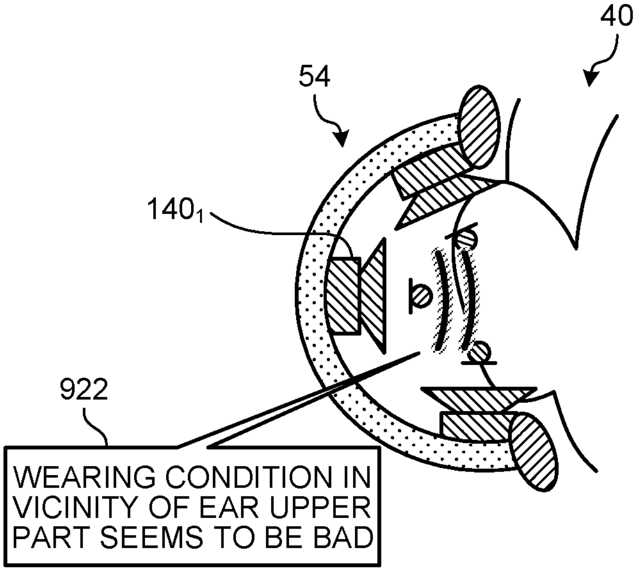
FIG. 41B is a diagram illustrating an example of a notification method for notifying the user of the condition of wearing the headphone applicable to the eighth embodiment.

FIGS. 41A and 41B are diagrams illustrating an example of a notification method that is applicable to the eighth embodiment and notifies the user wearing the headphone 54 of the condition of wearing the headphone 54 determined as described above.

FIG. 41A illustrates an example of making notification of the result of the wearing determination using a portable terminal device 900 such as a smartphone or a tablet personal computer. For example, the terminal device 900 has an application program corresponding to the determination result notification in advance.

Note that a general configuration as a communicable information processing device can be applied to the terminal device 900, and the terminal device includes, for example, a central processing unit (CPU), a read only memory (ROM), a random access memory (RAM), a storage device such as a flash memory, a communication interface (I/F) for performing wireless communication, an input device that receives a user operation, and a display device, and the CPU controls the entire operation according to a program stored in the storage device. The terminal device 900 is not limited thereto, and may be a device dedicated to the headphone 54. The above-described application program is supplied from an external network or the like via the communication I/F, for example, and is installed in the terminal device 900.

The control unit 310 notifies the terminal device 900 of the determination result of the wearing condition obtained as described above by communication of the communication unit 212. The terminal device 900 displays a screen for displaying notification contents on a display 901 of the terminal device 900 by the above-described application program. In this example, a state in which the headphone is worn on the head is schematically illustrated in a region 910 of the display 901, and a portion having a poor wearing condition is highlighted by a frame line 911. Further, a message 912 specifically indicating at which portion the wearing condition is bad ("The wearing condition at the ear upper portion seems bad") is further displayed on the display 901.

Note that, in this example, buttons 920 and 921 are disposed at the lower part of the display 901. The button 920 is, for example, a button for ending the display of the determination result. Furthermore, the button 921 is a button for instructing the headphone 54 to perform re-measurement in order to determine the wearing condition again. The terminal device 900 transmits a re-measurement instruction to the headphone 54 in response to the operation on the button 921. This instruction is received by the communication unit 212 in the headphone 54 and passed to the control unit 310. The control unit 310 controls each unit of the headphone 54 according to the passed instruction, and executes re-measurement and wearing determination.

FIG. 41B is an example of making notification of the result of the wearing determination by the audio reproduced by the headphone 54. In the example of FIG. 41B, a voice message 922 ("The wearing condition at the ear upper portion seems bad") indicating the wearing determination result is reproduced by the driver $\mathbf{140}_1$.

For example, the control unit 310 generates the voice message 922 by voice data indicating the determination result of the wearing condition obtained as described above. For example, a message indicating an assumed wearing determination result is stored in the memory 210 in advance. The control unit 310 reads a message according to the determination result of the wearing condition from the memory 210, converts the read message into voice data using, for example, a known reading technique, and generates the voice message 922. The present invention is not limited thereto, and a message may be stored in the memory 210 as voice data.

The control unit 310 supplies the generated voice message 922 to each of the driver amplifiers $\mathbf{130}_1$ to $\mathbf{130}_L$ via the DAC 201, and causes the drivers $\mathbf{140}_1$ to $\mathbf{140}_L$ to reproduce the voice message. In this case, the voice message 922 may be reproduced by at least one of the drivers $\mathbf{140}_1$ to $\mathbf{140}_L$. It is also possible to reproduce the voice message 922 from a driver close to the position where the wearing condition is determined to be bad among the drivers $\mathbf{140}_1$ to $\mathbf{140}_L$.

Here, in a case where only one FB microphone is provided in the housing 520, it is difficult to identify a portion with a poor wearing condition. In the third modification of the seventh embodiment, since the plurality of FB microphones $\mathbf{101}_1$ to $\mathbf{101}_K$ is provided in the housing 520, it is possible to determine the wearing state in detail.

9. Eighth Embodiment

Next, the eighth embodiment of the present disclosure will be described. The eighth embodiment is an example in which the function according to each of the above-described embodiments can be set as an operation mode in accordance with a user operation.

Among the functions described in each embodiment, the functions that can be set as the operation mode are, for example, as follows.

(1) Noise canceling function by the FF method, the FB method, or the Dual method. The functions correspond to the first to fourth embodiments.

(2) Reproduction function with high realistic feeling by 3D audio signal (object sound source). This is a function corresponding to the fifth embodiment and is a function that can be realized by the multi-driver headphone.

(3) Sound collection and reproduction function of noise in a specific direction. This is a function corresponding to the sixth embodiment, and is a function that can be realized by the multi-FF microphone/multi-driver headphone.

(4) Beamforming function on mouth This is a function corresponding to a modification of the sixth embodiment, and is a function that can be realized by the multi-FF microphone/multi-driver headphone.

(5) Beamforming function on blind spot This is a function corresponding to the sixth embodiment, and is a function that can be realized by the multi-FF microphone/multi-driver headphone.

(6) Function of correcting individual difference at the time of wearing. This is a function corresponding to the seventh embodiment and the first and second modifications thereof, and is a function that can be realized by the multi-FB microphone/multi-driver headphone.

(7) Wearing determination function. This is a function corresponding to the third modification of the seventh embodiment, and is a function that can be realized by the multi-FB microphone/multi-driver headphone.

Figure 42:
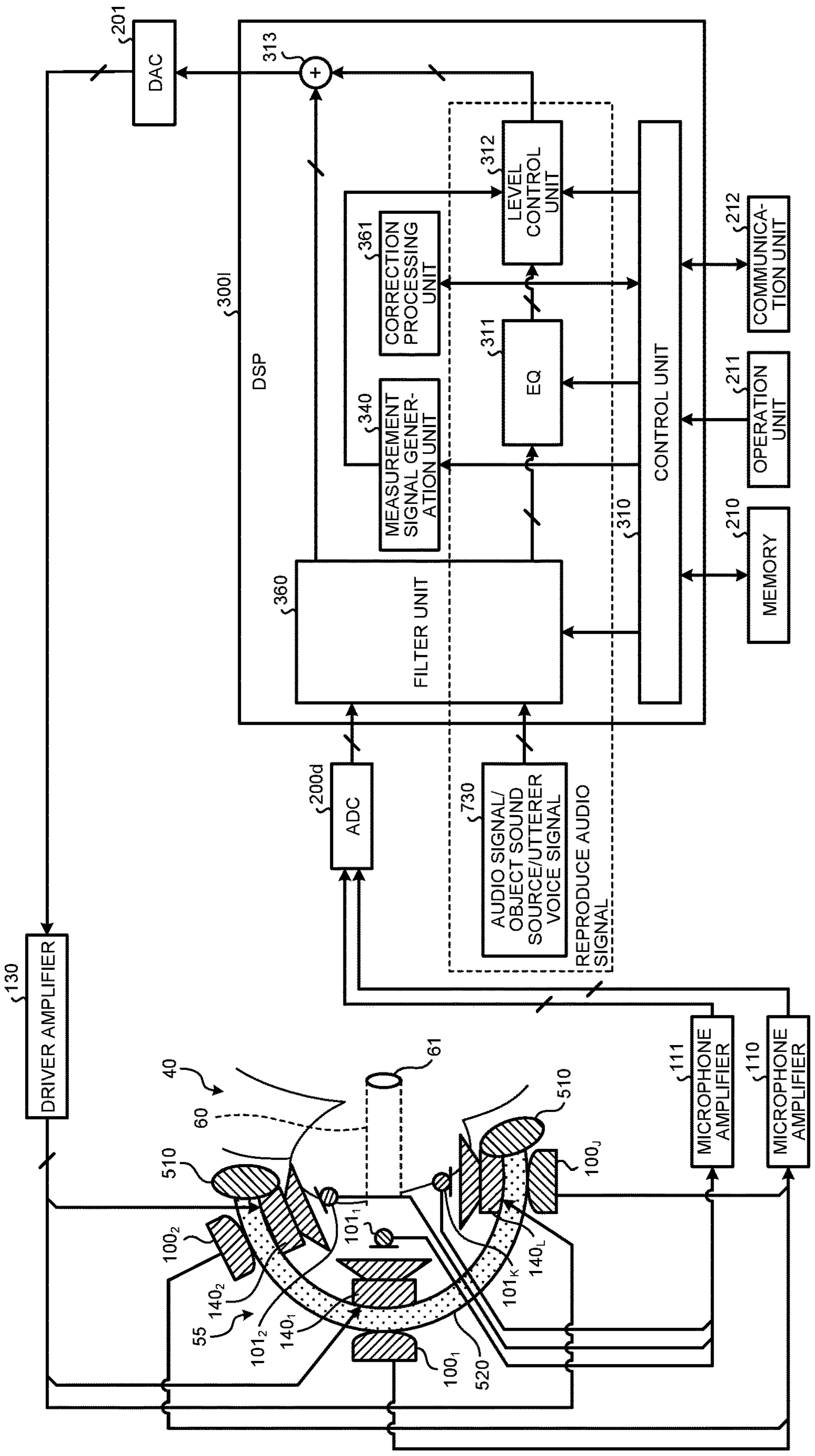
FIG. 42 is a schematic diagram illustrating a configuration of an example of an acoustic output device according to the eighth embodiment.

FIG. 42 is a schematic diagram illustrating a configuration of an example of an acoustic output device according to the eighth embodiment. The configuration illustrated in FIG. 42 enables execution of each of the functions (1) to (7) described above. The headphone 55 have been described with reference to FIG. 22, and the plurality of FF microphones $\mathbf{100}_1$ to $\mathbf{100}_J$ are provided toward on the outer portion of the housing 520, and the plurality of drivers $\mathbf{140}_1$ to $\mathbf{140}_L$ and the plurality of FB microphones $\mathbf{101}_1$ to $\mathbf{101}_K$ are provided inside the housing 520.

FIG. 42 collectively illustrates the microphone amplifiers $\mathbf{110}_1$ to $\mathbf{110}_J$ corresponding to the FF microphones $\mathbf{100}_1$ to $\mathbf{100}_J$, respectively, as the microphone amplifier 110 and the microphone amplifiers $\mathbf{111}_1$ to $\mathbf{111}_K$ corresponding to the FB microphones $\mathbf{101}_1$ to $\mathbf{101}_K$, respectively, as the microphone amplifier 111. Similarly, the figure collectively illustrates the driver amplifiers $\mathbf{130}_1$ to $\mathbf{130}_L$ corresponding to the drivers $\mathbf{140}_1$ to $\mathbf{140}_L$, respectively, as the driver amplifier 130.

An ADC 200*d* converts each sound signal supplied from the microphone amplifiers 110 and 111 into a digital sound signal and inputs the digital sound signal to a DSP 300*l*.

The DSP **300*l* includes a control unit 310, an EQ 311, a level control unit 312, a measurement signal generation unit 340, a filter unit 360, a correction processing unit 361, and an adder 313**.

The filter unit 360 includes the above-described filters (the FFNC filter **320*b*, the FBNC filter 320*c*, the blind spot BF filter 330, the localization filter 331, and the mouth BF filter 333). Furthermore, the filter unit 360 includes the EQ 334, the level control unit 332, the cancellation amount control units $\mathbf{321}_{FF}$ and $\mathbf{321}_{FB}$. Furthermore, the filter unit 360 includes the localization filter 170 that sets localization of the object sound source 710. Under the control of the control unit 310, the filter unit 360** can be configured by these functions independently or in predetermined combination.

The correction processing unit 361 includes the measurement data acquisition unit 350, the correction value calculation unit 351, the FF/FBNC filter correction unit 354, and the reproduction EQ correction unit 353. Under the control of the control unit 310, the correction processing unit 361 can be configured by these functions independently or in predetermined combination.

Here, the EQ 311, the level control unit 312, and part of the filter unit 360 (for example, the localization filter 170) implement a function of reproducing an audio signal, and execute a process on an input signal 730 including the audio signal 700, the object sound source 710, and the utterer voice signal 720.

Figure 43:
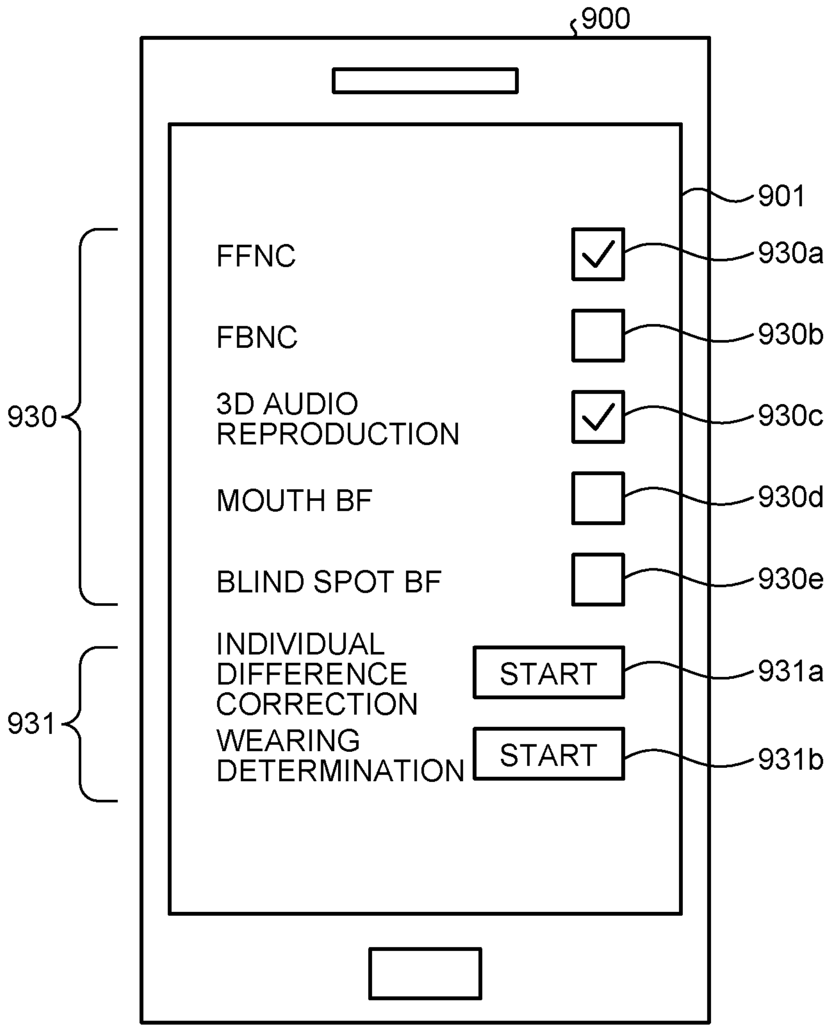
FIG. 43 is a schematic diagram illustrating an example of a function setting screen that is display on a display of a terminal device and can be applied to the eighth embodiment.

In the eighth embodiment, the functions (1) to (7) described above can be set from the terminal device 900 communicable by the communication unit 212. FIG. 43 is a schematic diagram illustrating an example of a function setting screen that can be applied to the eighth embodiment and is displayed on the display 901 of the terminal device 900. The function setting screen is displayed on the display 901 when an application program installed in the terminal device 900 is executed.

In FIG. 43, a region 930 of the display 901 is a region for performing setting at the time of reproduction of the audio signal 700 or the object sound source 710 by the headphone 55, noise cancellation, or the like. Furthermore, the region 931 is a region for performing a measurement process using the measurement signal in the headphone 55.

In the example of FIG. 43, check boxes **930*a* to 930*e* on which the input is performed by performing an operation of adding a return mark in a frame are provided in the region 930. By adding a return mark in the check box 930*a*, execution of noise canceling by the FF method is set. By adding a return mark in the check box 930*b*, execution of noise canceling by the FB method is set. By adding a return mark in the check box 930*c*, reproduction of the 3D audio signal (object sound source 710) is set. By adding a return mark in the check box 930*d*, execution of mouth beamforming (BF) is set. In addition, by adding a return mark in the check box 930*e*, execution of blind spot beamforming (BF) is set. It is possible to add a plurality of return marks in the check boxes 930*a* to 930*e*** at the same time.

In addition, buttons **931*a* and 931*b* on which the input is performed according to the operation are provided in the region 931. The button 931*a* is a button for instructing execution of correction of an individual difference of the user according to the seventh embodiment or the first and second modifications of the seventh embodiment. In response to the operation of the button 931*a*, the measurement sound signal is reproduced in the headphone 55, and the measurement of the in-ear characteristic T is started. The button 931*b* is a button for instructing execution of the wearing determination of the headphone 55 according to the third modification of the seventh embodiment. In response to the operation of the button 931*b*, the measurement sound signal is reproduced in the headphone 55, and the leakage of the reproduction sound to the outside of the housing 520** is measured.

The terminal device 900 transmits, to the headphone 55, an instruction corresponding to the input to the check boxes **930*a* to 930*e* and the operation of the buttons 931*a* and 931*b*. In the headphone 55, this instruction is received by the communication unit 212 and passed to the control unit 310. The control unit 310 controls the filter unit 360, the measurement signal generation unit 340, the correction processing unit 361**, and the like according to the passed instruction to causes them to execute the instruction operation.

As described above, in the eighth embodiment, since the execution of each function in the headphone 55 can be instructed from the terminal device 900, the user can easily set executing respective functions of the headphone 55 independently or in combination.

10. Ninth Embodiment

Next, the ninth embodiment of the present disclosure will be described. The ninth embodiment is an example in which in a headphone provided with a plurality of drivers $\mathbf{140}_1$ to $\mathbf{140}_L$ inside a housing 520, one or more of the drivers $\mathbf{140}_1$ to $\mathbf{140}_L$ are operated and used as a microphone.

It is known that a dynamic-type driver (speaker) can be used as a microphone. This is because the mechanism of electricity, vibration, and sound radiation of the dynamic-type driver and the mechanism of sound incidence, vibration, and electricity of the microphone are simply opposite.

Figure 44A:
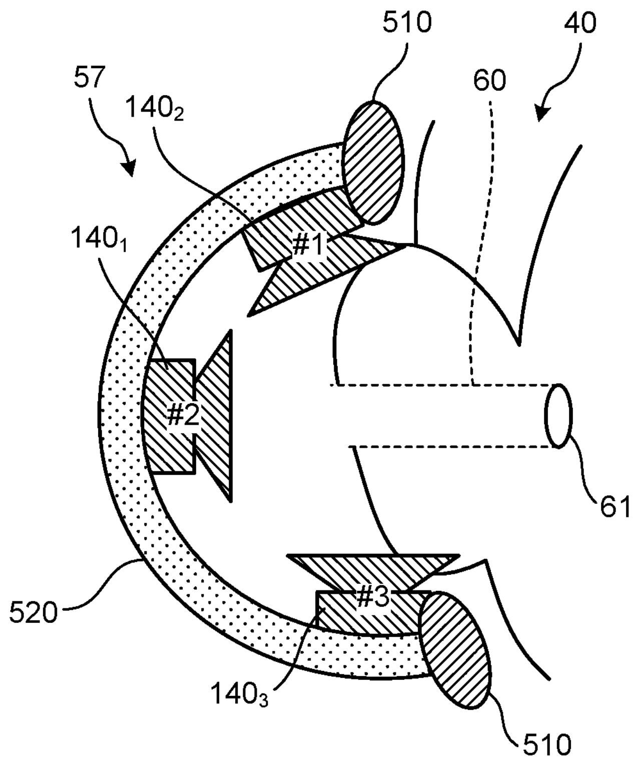
FIG. 44A is a schematic diagram schematically illustrating an example in which a driver is used as a microphone according to the ninth embodiment.
Figure 44B:
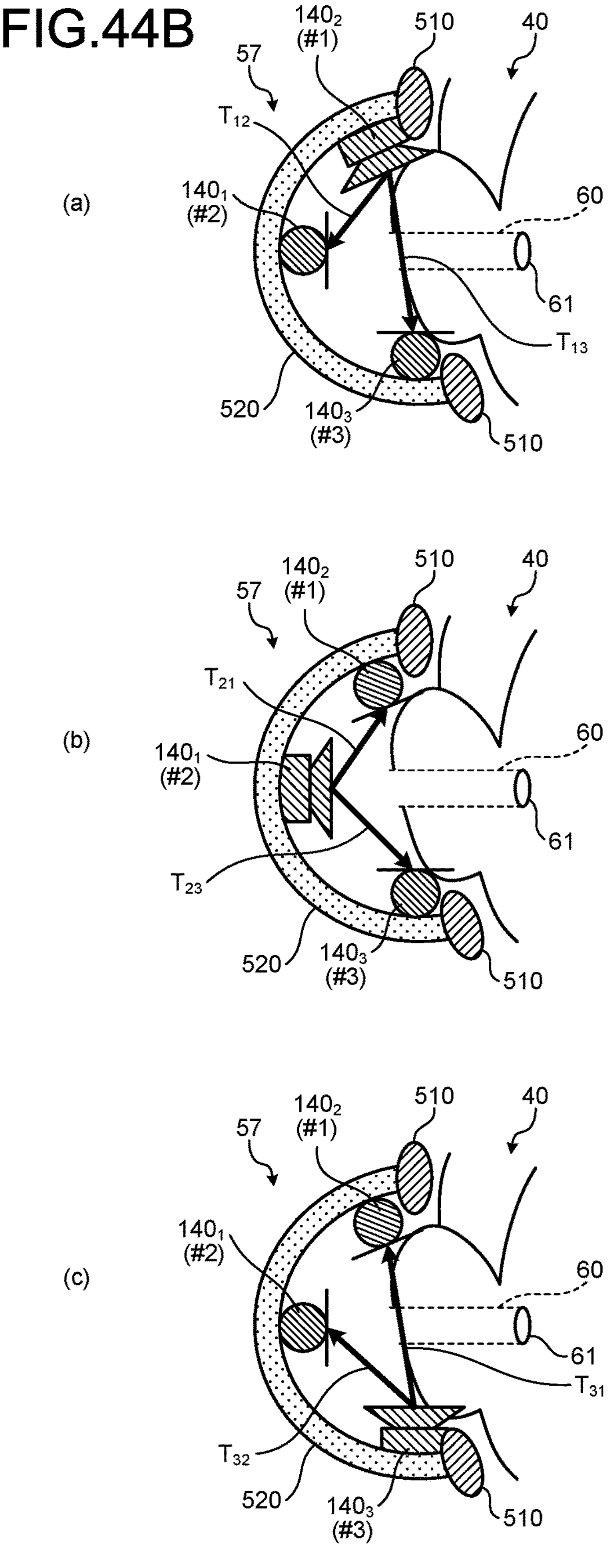
FIG. 44B is a schematic diagram schematically illustrating an example in which a driver is used as a microphone according to the ninth embodiment.

FIGS. 44A and 44B are schematic diagrams schematically illustrating an example in which a driver is used as a microphone according to the ninth embodiment.

FIG. 44A is a schematic diagram schematically illustrating a vertical cross section of an appearance of an example of a multi-driver headphone applicable to the ninth embodiment and provided with a plurality of drivers inside the housing 520. A headphone 57 illustrated in FIG. 44A is provided with a plurality of (three in this example) drivers $\mathbf{140}_1$, $\mathbf{140}_2$, and $\mathbf{140}_3$ inside the housing 520.

Note that FIGS. 44A and 44B illustrate the driver $\mathbf{140}_1$ as a driver #1, the driver $\mathbf{140}_2$ as a driver #2, and the driver $\mathbf{140}_3$ as a driver #3 for the sake of explanation.

FIG. 44B is a diagram schematically illustrating an example in which one of the three drivers $\mathbf{140}_1$ to $\mathbf{140}_3$ provided in the housing 520 is used to have an original function as a driver (speaker) and the other two are used as microphones. In this case, for example, a measurement signal is reproduced by a driver used as an original function, and measurement sounds obtained by reproducing the measurement signals are collected by two drivers used as microphones.

In the section (a) of FIG. 44B, the measurement signal is reproduced by the driver #1, and the reproduced measurement sound is collected by using the drivers #2 and #3 as microphones. Based on the measurement sound signal obtained by collecting the measurement sound by the drivers #2 and #3, it is possible to calculate the in-ear characteristics $T_{12}$ from the driver #1 to the driver #2 and the in-ear characteristics $T_{13}$ from the driver #1 to the driver #3.

In the section (b) of FIG. 44B, the measurement signal is reproduced by driver #2, and the reproduced measurement sound is collected by the drivers #1 and #3 as microphones. Based on the measurement sound signals obtained by collecting the measurement sounds by the drivers #1 and #3, it is possible to calculate the in-ear characteristics $T_{21}$ from the driver #2 to the driver #1 and the in-ear characteristics $T_{23}$ from the driver #2 to the driver #3.

Further, in the section (c) of FIG. 44B, the measurement signal is reproduced by the driver #3, and the reproduced measurement sound is collected by the drivers #1 and #2 as microphones. Based on the measurement sound signals obtained by collecting the measurement sounds by the drivers #1 and #2, it is possible to calculate the in-ear characteristics $T_{31}$ from the driver #3 to the driver #1 and the in-ear characteristics $T_{32}$ from the driver #3 to the driver #2.

Based on the calculated in-ear characteristics $T_{12}$, $T_{13}$, $T_{21}$, $T_{23}$, $T_{31}$, and $T_{32}$, for example, it is possible to execute correction of individual differences according to the above-described seventh embodiment and the first and second modifications thereof. In addition, it is also possible to execute the wearing determination according to the third modification of the seventh embodiment by further measuring the power of the collected measurement sounds.

Figure 45:
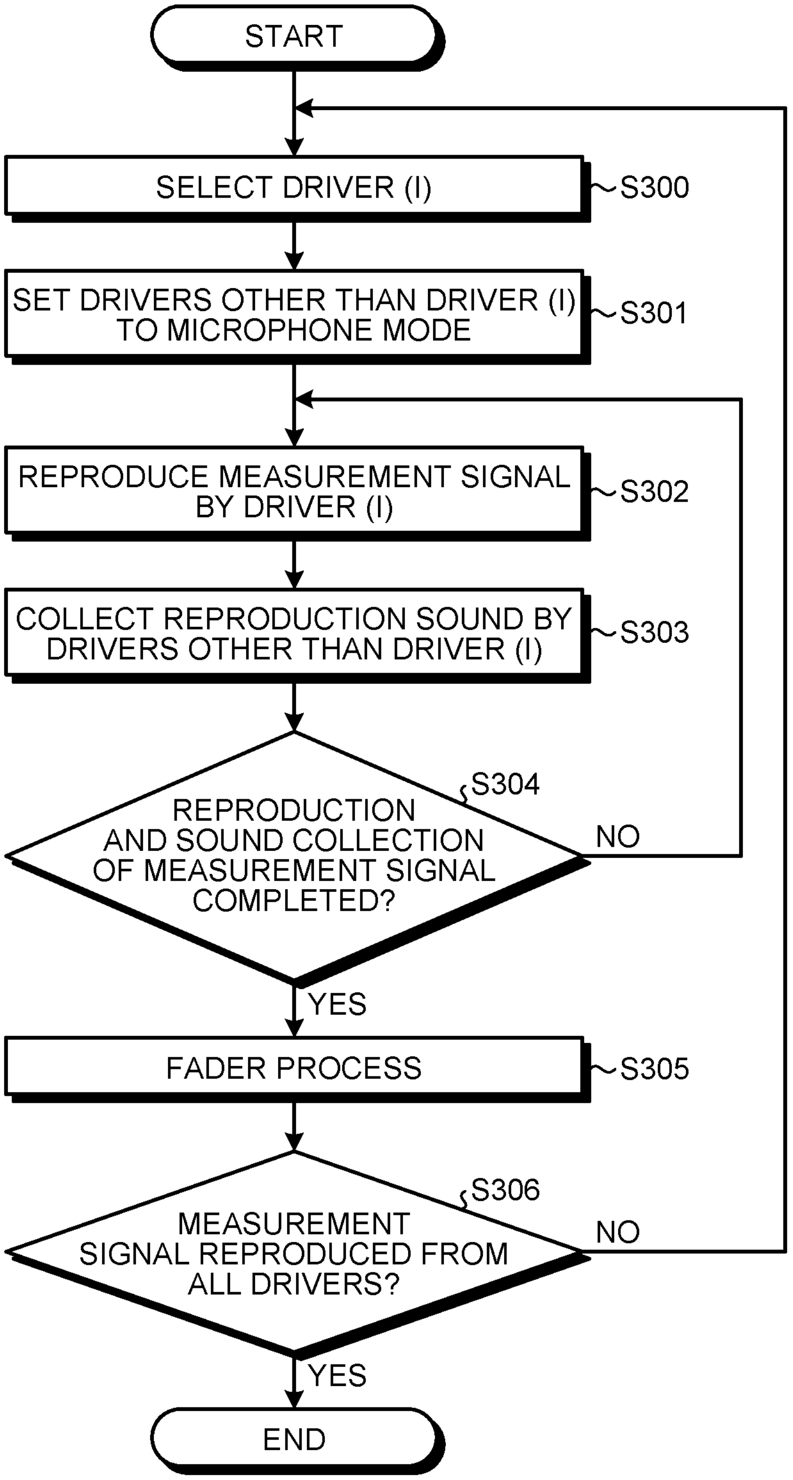
FIG. 45 is a flowchart illustrating an example of processing of a measuring an in-ear characteristic T using a driver as a microphone according to the ninth embodiment.

FIG. 45 is a flowchart illustrating an example of processing of measuring an in-ear characteristic T using a driver as a microphone according to the ninth embodiment. The processing according to this flowchart is started in a state where the user wears the headphone 57.

Note that, here, L drivers are provided in the housing 520, and the driver (l) indicates a driver sequentially selected in a loop from the L drivers. Whether to use the driver as a microphone is controlled by a driver amplifier corresponding to the driver according to an instruction by the control unit 310. Furthermore, here, the configuration of FIG. 35 in the seventh embodiment is applied as the acoustic output device. Furthermore, in a case where the driver is used as a microphone, a signal output by sound collection from the driver is supplied to the DSP 300*i* via the microphone amplifiers $\mathbf{111}_1$ to $\mathbf{111}_K$ and the ADC 200*b*.

In step S300, the control unit 310 selects the driver (l) used as an original function from the L drivers. In the next step S301, the control unit 310 sets drivers other than the driver (l) selected in step S300 among the L drivers to the microphone mode available as the microphone.

In the next step S302, the control unit 310 instructs the measurement signal generation unit 340 to generate and output the measurement signal, and causes the driver (l) set in step S300 to reproduce the measurement signal. In the next step S303, the drivers other than the driver (l) among the L drivers collect the measurement sound obtained by reproducing the measurement signal by the driver (l). Each measurement sound signal obtained by collecting and outputting the measurement sounds by the drivers other than the driver (l) is supplied to the DSP 300*i*. The DSP 300*i* calculates, for example, the in-ear characteristic T based on each supplied measurement sound signal.

In the next step S304, the control unit 310 determines whether the reproduction of the measurement signal by the driver (l) and the sound collection of the reproduced measurement sounds by other drivers have been completed. When determining that they have not been completed (step S304, "No"), the control unit 310 returns the process to step S302.

When determining that they have been completed (step S304, "Yes"), the control unit 310 shifts the process to step S305. In step S305, the control unit 310 performs a fader process on the measurement sound obtained by reproducing the measurement sound signal. For example, the control unit 310 causes the level control unit 312 to attenuate the level of the measurement signal output from the measurement signal generation unit 340 in a predetermined time and fade out the reproduction sound. As a result, it is possible to avoid a situation in which the reproduction sound is suddenly interrupted, and it is possible to suppress the discomfort of the user wearing the headphone 57.

In the next step S306, the control unit 310 determines whether all the drivers in the housing 520 have reproduced the measurement signals. When determining that all the drivers in the housing 520 have reproduced the measurement signals (step S306, "Yes"), the control unit 310 ends a series of processes according to this flowchart.

On the other hand, when determining that all the drivers in the housing 520 have not reproduced the measurement signals, that is, there is a driver that has not reproduced the measurement signal among the L drivers in the housing 520 (step S306, "No"), the control unit 310 returns the process to step S300. Then, the control unit 310 selects the driver (l) that reproduces the measurement signal from among the drivers that have not reproduced the measurement signal among the L drivers in the housing 520 (step S300), and executes the process in and after step S301.

According to the ninth embodiment, the measurement of the in-ear characteristic T and the like are executed using some drivers among the plurality of drivers in the housing 520 as microphones. As a result, a space in the housing 520 can be reduced as compared with a case where a plurality of microphones is disposed on the housing 520, so that the headphone can be downsized. In addition, since a plurality of microphones is not provided in the housing 520, cost can be reduced.

Further, the effects described in the present identification are merely examples and are not limited, and other effects may be present.

The present technology may also be configured as below.

(1) An acoustic output device comprising:
- a housing;
- one or more outward microphones provided on the housing toward an outside of the housing; and
- two or more drivers that are provided inside the housing and each of which generates an acoustic control sound based on an acoustic control signal.

(2) The acoustic output device according to the above (1), wherein
- the two or more drivers include a first driver and a second driver, wherein
- the first driver is disposed so that a sound wave to be emitted travels in a first direction, and wherein
- the second driver is disposed so that a sound wave to be emitted travels in a second direction different from the first direction.

(3) The acoustic output device according to the above (2), further comprising:
- a signal processing unit that generates the acoustic control signal, wherein
- the signal processing unit includes a first filter that generates the acoustic control signal based on a sound collected by a first microphone included in the one or more outward microphones.

(4) The acoustic output device according to the above (3), wherein
- the signal processing unit
- further includes a second filter that generates the acoustic control signal based on a sound collected by a second microphone included in the one or more outward microphones.

(5) The acoustic output device according to the above (4), wherein the first microphone is provided on the housing so as to collect a sound in a third direction, and wherein the second microphone is provided so as to collect a sound in a fourth direction different from the third direction.

(6) The acoustic output device according to the above (5), wherein the signal processing unit generates a first acoustic control signal for the first driver to generate the acoustic control sound and a second acoustic control signal for the second driver to generate the acoustic control sound based on respective sounds collected by the first microphone and the second microphone.

(7) The acoustic output device according to any one of the above (3) to (6), further comprising:

one or more internal microphones provided inside the housing, wherein the signal processing unit further includes a third filter that generates the acoustic control signal based on a sound collected by a third microphone included in the one or more internal microphones.

(8) The acoustic output device according to the above (7), wherein the signal processing unit further includes a fourth filter that generates the acoustic control signal based on a sound collected by a fourth microphone included in the one or more internal microphones.

(9) The acoustic output device according to the above (8), wherein the third microphone is provided so as to collect a sound in a fifth direction inside the housing, and wherein the fourth microphone is provided to collect sound in a sixth direction different from the fifth direction inside the housing.

(10) The acoustic output device according to the above (9), wherein the signal processing unit generates a third acoustic control signal for the first driver to generate the acoustic control sound and a fourth acoustic control signal for the second driver to generate the acoustic control sound based on a sound collected by the third microphone and a sound collected by the fourth microphone, respectively.

(11) The acoustic output device according to the above (10), wherein the signal processing unit sets localization of an enhancement sound based on a sound collected by each of the outward microphones included in the housing worn on each of a left side and a right side of a listener, and generates an output signal, of the enhancement sound, by each of the two or more drivers included in the housing worn on each of the left side and the right side of the listener, based on the set localization.

(12) The acoustic output device according to any one of the above (7) to (11), wherein the signal processing unit measures an in-ear characteristic of a listener based on sounds obtained by collecting, by the one or more internal microphones, sounds generated by the two or more drivers in a state where the listener wears the housing.

(13) The acoustic output device according to the above (12), wherein the signal processing unit uses at least one driver of the two or more drivers as a microphone, uses the microphone instead of the one or more internal microphones, and measures an in-ear characteristic of the listener.

(14) The acoustic output device according to the above (12), wherein the signal processing unit determines a condition in which the listener wears the housing according to the measured in-ear characteristic.

(15) The acoustic output device according to the above (13), wherein the signal processing unit determines a condition in which the listener wears the housing according to the measured in-ear characteristic using the microphone using a driver instead of the one or more internal microphones.

(16) The acoustic output device according to the above (14) or (15), further including a communication unit that communicates with a terminal device, wherein the signal processing unit transmits a determination result of the wearing condition to the terminal device by the communication unit.

(17) The acoustic output device according to any one of the above (3) to (16), further comprising:

a communication unit that communicates with a terminal device, wherein in the signal processing unit, a function to be executed in accordance with an instruction received from the terminal device by the communication unit is set.

(18) The acoustic output device according to any one of the above (3) to (17), wherein the signal processing unit causes each of the two or more drivers to reproduce an object sound source, and generates an output signal when each of the two or more drivers reproduces the object sound source based on meta information added to the object sound source.

(19) The acoustic output device according to any one of the above (1) to (18), wherein the acoustic control sound includes a noise canceling sound that cancels a sound leaking from an outside of the housing into the housing.

(20) The acoustic output device according to any one of the above (1) to (19), wherein the acoustic control sound includes an enhancement sound that enhances a sound generated in a specific direction in an outside of the housing.

(21) A method of controlling an acoustic output device, the method comprising:

a processor causing each of two or more drivers provided inside a housing on which one or more microphones are provided toward an outside to generate an acoustic control sound based on an acoustic control signal.

REFERENCE SIGNS LIST

20, 20L, 20R, 20C$_{rr}$, 20$_1$, 20$_2$, 20$_Q$ NOISE

20$_{BIG}$ HIGH SOUND PRESSURE NOISE

21, 21$_1$, 21$_2$, 21$_J$, 22, 23, 23$_1$, 23$_2$, 23$_L$, 24, 24$_1$, 24$_2$, 24$_K$, 25, 25$_1$, 25$_2$, 25$_L$, 25$_{11}$, 25$_{21}$, 25$_{L1}$, 25$_{12}$, 25$_{22}$, 25$_{L2}$,

25$_{1K}$, 25$_{2K}$, 25$_{LK}$, 180$_{11}$, 180$_{21}$, 180$_{Q1}$, 180$_{12}$, 180$_{22}$, 180$_{Q2}$, 180$_{1J}$, 180$_{2J}$, 180$_{QJ}$ SPACE
40 HEAD
50, 51, 52, 53, 54, 55, 56, 57 HEADPHONE
60 EAR CANAL
61 EARDRUM
80L, 80R, 80L$_{rr}$, 80R$_{rr}$, 81 BEAMFORMING
82, 83 REPRODUCTION SOUND
100, 100$_{1}$, 100$_{2}$, 100$_{J}$, 100L$_{fwd}$, 100L$_{cent}$, 100L$_{rr}$, 100R$_{fwd}$, 100R$_{cent}$, 100R$_{rr}$ FF MICROPHONE
101, 101$_{1}$, 101$_{2}$, 101$_{K}$ FB MICROPHONE
110, 110$_{1}$, 110$_{2}$, 110$_{J}$, 111, 111$_{1}$, 111$_{2}$, 111$_{K}$ MICROPHONE AMPLIFIER
120, 120$_{1}$, 120$_{2}$, 120$_{L}$, 120$_{11}$, 120$_{21}$, 120$_{J1}$, 120$_{12}$, 120$_{22}$, 120$_{J2}$, 120$_{1L}$, 120$_{2L}$, 120$_{JL}$, 320*a*, 320*b* FFNC FILTER
121, 121$_{11}$, 121$_{1}$, 121$_{2}$, 121$_{L}$, 121$_{12}$, 121$_{1L}$, 121$_{21}$, 121$_{22}$, 121$_{2L}$, 121$_{K1}$, 121$_{K2}$, 121$_{KL}$, 320*c* FBNC FILTER
130, 130$_{1}$, 130$_{2}$, 130$_{L}$, 130*a*, 130*b*, 130*c* DRIVER AMPLIFIER
140, 140$_{1}$, 140$_{2}$, 140$_{3}$, 140$_{L}$, 140$_{tw}$, 140$_{mid}$, 140$_{wf}$, 140*a*, 140*b*, 140*c*, 140L$_{fwd}$, 140L$_{cnt}$, 140L$_{rr}$, 140R$_{fwd}$, 140R$_{cnt}$, 140R$_{rr}$ DRIVER
150 SOUND PRESSURE
160, 162, 163, 163$_{1}$, 163$_{2}$, 163$_{K}$ ADDITION UNIT
161$_{1}$, 161$_{2}$, 161$_{L}$, 164$_{1}$, 164$_{2}$, 164$_{L}$, 165$_{1}$, 165$_{2}$, 165$_{L}$, 166$_{1}$, 166$_{2}$, 166$_{L}$, 167$_{1}$, 167$_{2}$, 167$_{Q}$, 168$_{1}$, 168$_{2}$, 168$_{L}$, 313, 314 ADDER
170, 170$_{1}$, 170$_{2}$, 170$_{3}$, 170$_{11}$, 170$_{12}$, 170$_{13}$, 170$_{21}$, 170$_{22}$, 170$_{23}$, 170$_{31}$, 170$_{32}$, 170$_{33}$, 170$_{N1}$, 170$_{N2}$, 170$_{1L}$, 170$_{2L}$, 170$_{NL}$, 331, 331$_{11}$, 331$_{21}$, 331$_{Q1}$, 331$_{12}$, 331$_{22}$, 331$_{Q2}$, 331$_{1L}$, 331$_{2L}$, 331$_{QL}$ LOCALIZATION FILTER
180$_{1}$, 180$_{2}$, 180$_{L}$ GAIN ADJUSTMENT UNIT
200, 200*a*, 200*b*, 200*c*, 200*d* ADC
201 DAC
210 MEMORY
211 OPERATION UNIT
212 COMMUNICATION UNIT
300*a*, 300*b*, 300*c*, 300*d*, 300*e*, 300*f*, 300*g*, 300*h*, 300*i*, 300*j*, 300*k*, 300*l* DSP
310 CONTROL UNIT
311, 334 EQ
312, 332, 332$_{1}$, 332$_{2}$, 332$_{L}$ LEVEL CONTROL UNIT
321$_{FF}$, 321$_{FB}$ CANCELLATION AMOUNT CONTROL UNIT
330, 330$_{11}$, 330$_{21}$, 330$_{J1}$, 330$_{12}$, 330$_{22}$, 330$_{J2}$, 330$_{1Q}$, 330$_{2Q}$, 330$_{JQ}$ BLIND SPOT BF FILTER
333 MOUTH BF FILTER
335 UTTERANCE SOUND SOURCE ARRANGEMENT FILTER
340 MEASUREMENT SIGNAL GENERATION UNIT
350 MEASUREMENT DATA ACQUISITION UNIT
351 CORRECTION VALUE CALCULATION UNIT
352 FBNC FILTER CORRECTION UNIT
353 REPRODUCTION EQ CORRECTION UNIT
354 FF/FBNC FILTER CORRECTION UNIT
360 FILTER UNIT
361 CORRECTION PROCESSING UNIT
400, 401, 402, 403, 404, 405, 406, 407, 407', 408, 409, 410 WAVEFRONT
510 EAR PAD
520, 520L, 520R HOUSING
530 HEADBAND
600$_{1}$, 600$_{2}$, 600$_{3}$, 600$_{N}$, 710 OBJECT SOUND SOURCE
601$_{1}$, 601$_{2}$, 601$_{3}$ REPRODUCTION SOUND
700 AUDIO SIGNAL
720 UTTERER VOICE SIGNAL
730 INPUT SIGNAL

900 TERMINAL DEVICE
901 DISPLAY
910, 930, 931 REGION
911 FRAME LINE
912 MESSAGE
920, 921, 931*a*, 931*b* BUTTON
922 VOICE MESSAGE
930, 931 REGION
930*a*, 930*b*, 930*c*, 930*d*, 930*e* CHECK BOX

The invention claimed is:

1. An acoustic output device, comprising:
a housing;
one or more outward microphones on the housing, wherein
the one or more outward microphones are toward an outer portion of the housing;
a plurality of drivers inside the housing, wherein
a first driver of the plurality of drivers is configured to generate a first sound based on a wearing state of the housing, and
the housing is associated with a listener;
one or more internal microphones inside the housing, wherein
a first internal microphone of the one or more internal microphones is configured to collect the first sound generated by the first driver; and
circuitry is configured to:
measure in-ear characteristic of the listener based on the first sound collected by the first internal microphone;
select a second driver of the plurality of drivers as a microphone, wherein
the second driver is configured to collect the first sound generated by the first driver, and
the second driver is at a different position from the first driver;
measure the in-ear characteristic of the listener based on the first sound collected by the second driver; and
generate, based on the first sound collected by the first internal microphone, a first acoustic control signal to control the first driver to reproduce an object sound source, wherein
the reproduction of the object sound source is based on meta information of the object sound source, and
the first driver is further configured to generate a first acoustic control sound based on the first acoustic control signal.

2. The acoustic output device according to claim 1, wherein
a third driver of the plurality of drivers is configured to emit a first sound wave in a first direction of an ear canal of the listener,
the listener is associated with the acoustic output device,
a fourth driver of the plurality of drivers is configured to emit a second sound wave in a second direction,
the second direction is different from the first direction, and
the second direction is in an oblique direction with respect to the ear canal.

3. The acoustic output device according to claim 2, wherein
a first outward microphone of the one or more outward microphones is configured to collect a second sound, and the circuitry includes a first filter configured to generate the first acoustic control signal for the first driver based on the second sound collected by the first outward microphone.

4. The acoustic output device according to claim 3, wherein a second outward microphone of the one or more outward microphones is configured to collect a third sound, and the circuitry further includes a second filter configured to generate a second acoustic control signal for the second driver based on the third sound collected by the second outward microphone.

5. The acoustic output device according to claim 4, wherein the first outward microphone is further configured to collect the second sound in a third direction, the second outward microphone is further configured to collect the third sound in a fourth direction, and the fourth direction is different from the third direction.

6. The acoustic output device according to claim 5, wherein the first driver is further configured to generate the first acoustic control sound based on the first acoustic control signal and the second sound collected by the first outward microphone, and the second driver is further configured to generate a second acoustic control sound based on the second acoustic control signal and the third sound collected by the second outward microphone.

7. The acoustic output device according to claim 3, wherein a second internal microphone of the one or more internal microphones is configured to collect a third sound, and the circuitry further includes a second filter configured to generate a second acoustic control signal for the second driver based on the third sound collected by the second internal microphone.

8. The acoustic output device according to claim 7, wherein a third internal microphone of the one or more internal microphones is configured to collect a fourth sound, and the circuitry further includes a third filter configured to generate a third acoustic control signal for the third driver based on the fourth sound collected by the third internal microphone.

9. The acoustic output device according to claim 8, wherein the second internal microphone is further configured to collect the third sound in a fifth direction inside the housing, the third internal microphone is further configured to collect the fourth sound in a sixth direction inside the housing, and the sixth direction is different from the fifth direction.

10. The acoustic output device according to claim 9, wherein the first driver is further configured to generate the first acoustic control sound based on the first acoustic control signal and the first sound collected by the first internal microphone, and the second driver is further configured to generate a second acoustic control sound based on the second acoustic control signal and the third sound collected by the second internal microphone.

11. The acoustic output device according to claim 10, wherein each of the one or more outward microphones is wearable on each of a left side of the listener and a right side of the listener, the each of the one or more outward microphones is further configured to collect a specific sound, the circuitry is further configured to set localization of an enhancement sound based on the specific sound collected by the each of the one or more outward microphones, and each of the plurality of drivers is further configured to generate an output signal of the enhancement sound based on the localization.

12. The acoustic output device according to claim 3, wherein the circuitry is further configured to:

control communication with a terminal device; and execute a function based on the communication with the terminal device and an instruction from the terminal device.

13. The acoustic output device according to claim 1, wherein the circuitry is further configured to determine, based on the measured in-ear characteristic of the listener, a condition that indicates the wearing state of the housing.

14. The acoustic output device according to claim 1, wherein the first acoustic control sound includes a noise canceling sound to cancel a sound leaked from an outside of the housing into the housing.

15. The acoustic output device according to claim 1, wherein the first acoustic control sound includes an enhancement sound to enhance a sound generated in a specific direction of outside of the housing.

16. A method, comprising:

in an acoustic output device that includes a housing, one or more outward microphones on the housing, one or more internal microphones inside the housing, a plurality of drivers inside the housing, and circuitry:

generating, by a first driver of the plurality of drivers, a first sound based on a wearing state of the housing, wherein the housing is associated with a listener, and the one or more outward microphones are toward an outer portion of the housing;

collecting, by a first internal microphone of the one or more internal microphones, the first sound generated by the first driver;

measuring, by the circuitry, in-ear characteristic of the listener based on the first sound collected by the first internal microphone;

selecting, by the circuitry, a second driver of the plurality of drivers as a microphone;

collecting, by the second driver, the first sound generated by the first driver, wherein the second driver is at a different position from the first driver;

measuring, by the circuitry, the in-ear characteristic of the listener based on the first sound collected by the second driver;

generating, by the circuitry, based on the first sound collected by the first internal microphone, a first acoustic control signal to control the first driver to reproduce an object sound source, wherein the reproduction of the object sound source is based on meta information of the object sound source; and generating, by the first driver, a first acoustic control sound based on the first acoustic control signal.

17. An acoustic output device, comprising:

a housing;

one or more outward microphones on the housing, wherein the one or more outward microphones are toward an outer portion of the housing;

a plurality of drivers inside the housing, wherein a first driver of the plurality of drivers is configured to generate a first sound based on a wearing state of the housing, the housing is associated with a listener, the plurality of drivers includes a second driver, and the second driver is at a different position than the first driver;

one or more internal microphones inside the housing, wherein a first internal microphone of the one or more internal microphones is configured to collect the first sound generated by the first driver; and circuitry is configured to:

measure in-ear characteristic of the listener based on the first sound collected by the first internal microphone; and generate, based on the first sound collected by the first internal microphone, a first acoustic control signal, wherein the first driver is further configured to generate a first acoustic control sound based on the first acoustic control signal.

* * * * *